US012780007B2

(12) United States Patent
Ceesay

(10) Patent No.: US 12,780,007 B2
(45) Date of Patent: Nov. 3, 2026

(54) GENERATING ENERGY FROM VEHICLES MOVEMENTS

(71) Applicant: Kaab Ceesay, Bronx, NY (US)

(72) Inventor: Kaab Ceesay, Bronx, NY (US)

(73) Assignee: Kaab Ceesay, Bronx, NY (US)

( * ) Notice: Subject to any disclaimer, the term of this patent is extended or adjusted under 35 U.S.C. 154(b) by 11 days.

(21) Appl. No.: 19/024,892

(22) Filed: Jan. 16, 2025

(65) Prior Publication Data

US 2026/0200332 A1 Jul. 16, 2026

(51) Int. Cl.
*F03D 3/00* (2006.01)
*B60L 8/00* (2006.01)
*F03D 3/04* (2006.01)

(52) U.S. Cl.
CPC ............ *B60L 8/006* (2013.01); *F03D 3/0409* (2013.01); *F05B 2220/7068* (2013.01); *F05B 2240/941* (2013.01)

(58) Field of Classification Search
CPC .......... B60L 8/006; F03D 3/0409; F03D 9/32; F05B 2220/7068; F05B 2240/941
See application file for complete search history.

(56) References Cited

U.S. PATENT DOCUMENTS 3,556,239 A * 1/1971 Spahn .................... B60K 17/04 180/2.2
7,434,636 B2 * 10/2008 Sutherland .............. F03D 13/10 180/2.2
2011/0291420 A1 * 12/2011 Gu ......................... B60K 16/00 74/DIG. 9
2013/0127393 A1 * 5/2013 Garcia .................. H02J 7/1415 290/55
2015/0240786 A1 * 8/2015 Dietzel ................... F03D 15/10 290/44

* cited by examiner

*Primary Examiner* — C. Gon

(57) ABSTRACT

Little adjustments and changes are made to a vehicle's designs to accommodate for wind turbines installed on the vehicles. The vehicle, the wind turbines and the shields are seamlessly combined, to increase their effective power and bring about the much-needed improvements needed to generate energy from the vehicle's movements. The uniqueness of this invention is in how it makes little adjustments and improvements to the different parts involved and put them together seamlessly to effectively work together and increase their combined power, efficiency, effectiveness etc., to get vehicles to generate energy from their own movements, all while allowing the vehicles to remain aesthetically pleasing. Wherein the vehicle designs, shapes, frame and body itself plays a major role in the process, by dedicating more of the vehicle space and areas for having the wind turbines.

3 Claims, 36 Drawing Sheets

GENERATING ENERGY FROM VEHICLES MOVEMENTS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
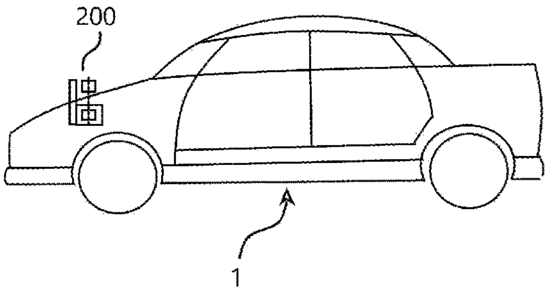

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

TECHNICAL FIELD OF THE INVENTION

This innovation is related to coupling energy generating devices, systems or vertical axis wind turbine systems operating or being used to generate energy on the vertical or horizontal plane to transportation vehicles for generating energy from the vehicles forward motion. Specifically, the improved design, integration and configuration of both the transportation vehicles and the vertical axis wind turbines and how they are all put together. A transportation vehicles body is designed, shaped and contoured to house in part or full an energy generating devices (such as vertical axis wind turbine operating or being used to generate energy on the vertical or horizontal plane) by itself or with aid of a shield or half shield, in a way that when the device is operational (being used to generate energy) the blade section, the shield, the half shield or a single blade opening facing the wind is in the path of the wind or the air or outside the vehicle body or above the surfaces while the remainder of the system or the device is inside the vehicle body. The system rely on combination of systems, ways, methods and setups for it workings including but not limited to the vehicle design, the vehicle elevation, the vehicle contour, the vehicle contour curves, the vehicle contour and elevation with width and height difference, the vehicle extension, the addition of (n-shape bump, u-shape groove) to the vehicles, the fairing or fairings, the devices, the vertical axis wind turbines, the types, the devices positions, the shields etc. The transportation vehicles have different elevation, contours, designs, opening and closing functions and positions to accommodate for the above systems. A single transportation vehicle is able to have one or more devices, vertical axis wind turbines, shields, mounting ways, positions, styles, designs, methods, systems, setups etc. These systems, methods or setups are mostly aimed at new transportation vehicle designs, yet lots of its functions are able to work on current vehicles as well, especially the EVs with front trunk space and vehicle types that are upgradable. The systems, methods or setups are compatible and work with or on most transportation vehicles, especially when they are fast moving such as planes, ships, boats, trucks, buses, trains, cars, vans, etc.

BACKGROUND OF THE INVENTION

This invention is an improvement of my previous works and patents, a. multiple folded blade vertical axis wind turbine patent number U.S. Pat. No. 11,614,073, b. effective method to attach a vertical axis wind turbine to EVs and charge it while driving patent number U.S. Pat. No. 12,297,802 B2, c. Increasing any vertical axis wind turbine efficiency patent number U.S. Pat. No. 12,305,617 B2. This invention will enjoy the benefits of all those previous works and patents as well as the new improvements and discoveries shown and claimed in this patent. Here it all comes together seamlessly, and connects for the much-needed improvement, implementation and adaptations for current and future transportation vehicles. This invention is for all types and forms of transportation vehicles, from undersea vehicles to flying vehicles and many types in between, although not all are depicted in the drawings or the figures. With or without little adjustments, slight modifications, some reorientation etc., done to the transportation vehicle's, the systems, the methods or the setups are able and capable of working with many different types of transportation vehicles. Wherein the transportation vehicle designs, shapes, frame, body etc., itself plays a major role in housing, carrying and using the energy generating devices, the vertical axis wind turbine as well as the energy generating methods, systems, mechanisms and processes by dedicating more of the transportation vehicle space and areas whether it be on the outside, the surfaces, inside or combination of one or more of the areas and spaces to seamlessly add the energy generating devices, the vertical axis wind turbines to transportation vehicles in a way, that will allow a transportation vehicles to produce more energy from the vehicle forward movements. This invention is are able to utilize the spaces in front, inside, on the sides, on the surface, above, behind, under, etc., or on the fairings, and on the transportation vehicles to house, carry and use energy generating devices or vertical axis wind turbines for harvesting energy from the movement of the transportation vehicle. These are the places or areas on a transportation vehicle where the same amount of wind will touch or pass through with or without the addition of the vertical axis wind turbines, the shields, the half shield, the opening, the cutouts or the fairing etc., systems, methods or setups. These new improvements are designed in a way that, most of the systems, the vertical axis wind turbine, the shield, the blade section or a single blade presence or appearance to the viewer is mainly noticed on the transportation vehicle when the system is operating or being used to generate energy and not noticed when the system is not operating or not being used to generate energy. There are also instances where the system is fixed, and its presence is always noticed by the viewer. These methods or systems are designed to be part of the transportation vehicle body or structure to play a major role in the vehicle's operations except when it coupled a transportation vehicle fairing. When the systems are coupled to the vehicle fairings it still plays a major role in the vehicle operation, it is just not part of the vehicle structure or the body. Most of the systems are inside the transportation vehicle structural and body. Some parts of the system are outside of the transportational vehicle surface, mainly the parts outside the vehicle structure and body or surfaces are the blade section, the half shield, the shield or a single blade. The systems are capable of being movable or fixed. When movable, a system or part of a system is moved from its housing position inside the vehicle (to save energy), to its operating position on the vehicle surface or outside the vehicle structure and body. The genius of this invention is that it dedicate more of the transportation vehicle structure and body to housing the vertical axis wind turbines and to make the vertical axis wind turbines part of the vehicle just like how electric vehicles dedicate more of the car body to housing the batteries for the vehicle operation compared to internal combustion engine vehicles which only dedicated a small space for a small battery. Therefore, with more battery space, the batteries have now played a major role in electric vehicles operations. The same method or way is applied here also, with more space dedicated to housing energy generating devices, the vertical axis wind turbines and its functions, will allow the vertical axis wind turbines to play a major role in the transportation vehicle operations as well make it grid-free and energy independent. After the energy is generated, it is able to be collected, stored or used in many ways. It is able to be collected by voltage regulators (VRs), voltage stabilizer or tap changers, converters, capacitors, transformers etc., and other known or soon to be discovered methods. It is able to directly power the transportation vehicle or indirectly power it through a battery, by first storing the energy into the batteries. This invention is mostly focused on or concerned about the energy generating step, face, method, system or process etc. What is done with the energy generated will depend mostly on the transportation vehicle types, designs, use or purpose etc. This invention is able to or trying to bring transportation vehicle energy needs under the control of the user, make it self-sustaining, which will reduce cost as well, increase reliability and be positive in many ways, etc.

Existing art: A transportation vehicle, a shield, a half shield, fairings, a vertical axis wind turbine operating on the vertical or horizontal plane etc., are coupled with many different parts. Such as the blades, Joints, motors, pole, tube, cylinder, apparatus, bearings, rods, pins, cylinders, welded parts, coil windings, nuts, bolts and how the multiple blades connect to the bearing or cylinder that rotate around the pole will use the same techniques that have been around for many hundreds of years. My design is different because of the way it puts different parts, designs, devices, systems, methods or setups etc., together to bring about better efficiency. The combinations of the systems in this application, however, are relatively new. I am not aware of any design that uses this technique to the best of my knowledge.

Current Art: List of the Disadvantages of the Current Art

1) Not enough space or areas in or on the transportation vehicle is allocated for having enough vertical axis wind turbines or energy generating devices, systems for us to generate enough energy from transportation vehicle movements.
2) Lack of commitment; Transportation vehicle designs are not committed to fully employing the system because it might not be profitable.
3) The system might not necessarily be a necessity for Western countries, cities or first world cities because they have stable and reliable energy grids.
4) Not enough research and testing was done.

BRIEF SUMMARY OF THE INVENTION

The purpose of this invention is to get transportation vehicles to generate energy from its own movements, as well as to bring the energy needs of transportation vehicles under the user control, to eliminate the need for long charging time, to make transportation Vehicles energy neutral, self-sustaining, grid free etc. These systems, methods or combinations of systems are designed to be effective, adaptable, compact, efficient, sustainable, reliable, etc., and come in different sizes, shapes, designs, configurations etc. So it can be installed in many different places and areas of different types of transportation vehicles, like Electric Cars, Trucks, Ships, Boats etc. This systems, this methods or combinations of this systems are able to achieve this claims because of the unique design of the systems, the methods or combinations of the systems, which makes little changes or adjustments to a transportation vehicle designs to accommodate the energy generating devices, the vertical axis wind turbines installed on the vehicle and put all parts together seamlessly to combine their effective power together to work together and bring about the much needed improvement, needed to make the transportation vehicles green, self-sustaining, electric grid free etc. The uniqueness of this invention is in how it makes little adjustments and improvements to the different parts involved and put them together seamlessly to effectively work together and increase their combined power, efficiency, effectiveness etc., to get transportation vehicles to generate more energy from their own movements.

BRIEF DESCRIPTION OF THE SEVERAL VIEWS OF THE DRAWING(S)

Note: For simplicity of the illustration transportation vehicle details, vertical axis wind turbine details, shield details, nuts, bolts, welded areas, coupled areas and attached area's etc., are not depicted as they are known to those who are skilled in this art. When they are shown is purely for illustration purposes, and not intended to capture all embodiments of the invention disclosed.

FIG. 1. Shows a transparent view of a vertical axis wind turbine operating on the vertical plane and a shield at an operating position in front of a normal front transportation vehicle, wherein only the blade section and the shield is above the surface.

Figure 2:
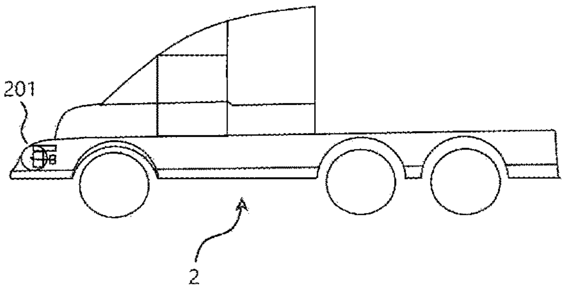

FIG. 2. Shows a transparent view of a vertical axis wind turbine operating on the vertical plane and a shield at a housing position in front of a transportation vehicle with a circular or barrel shaped base to blend with the front design.

Figure 3:
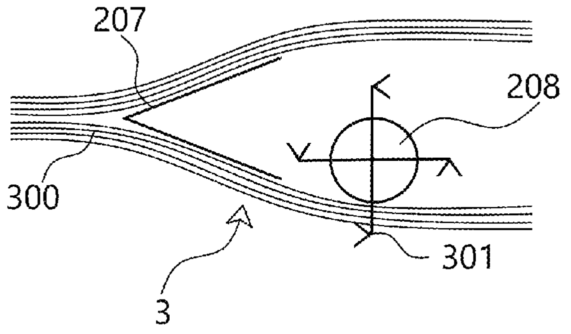

FIG. 3. Shows a top view of the shield in front of the vertical axis wind turbine operating on the vertical plane.

Figure 4:
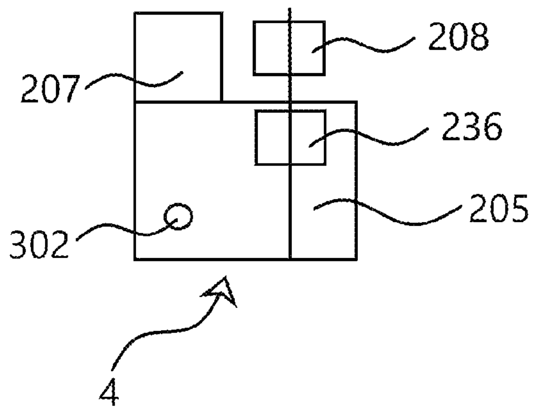

FIG. 4. Shows a separate view of the movable or rotatable portion or base shape with the shield in front of the vertical axis wind turbine operating on the vertical plane as one unit at an operating position. It also shows the pivot point of movable or rotatable or portion or base.

Figure 5:
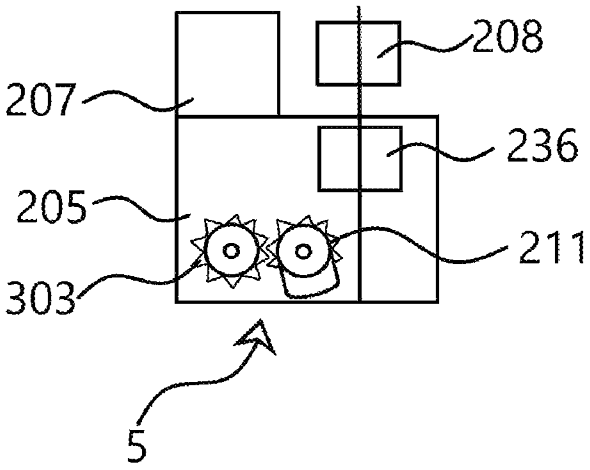

FIG. 5. Shows a separate view of the movable or rotatable or portion or base shape with the shield in front of the vertical axis wind turbine operating on the vertical plane as one unit at the operating position, and with addition of pivot gear connected to a motor also having a gear.

Figure 6:
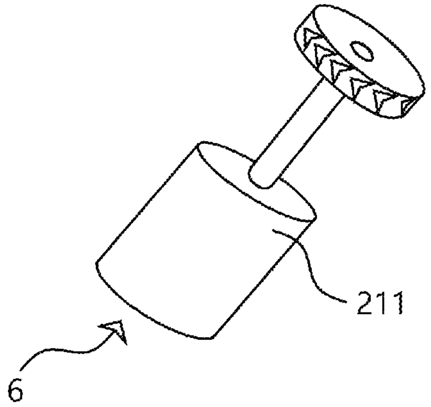

FIG. 6. Shows a close in view of the motor including the motor gear.

Figure 7:
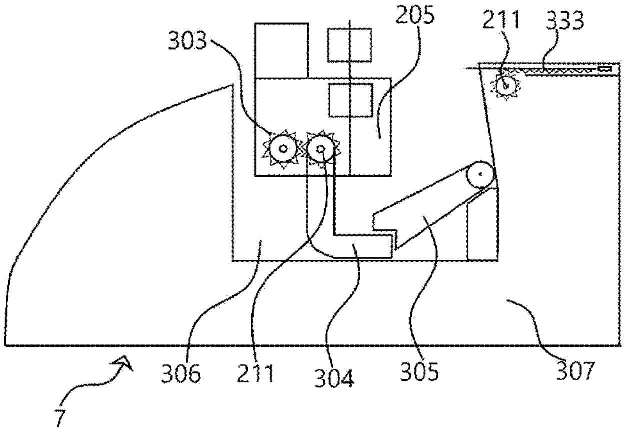

FIG. 7. Shows a moving mechanism of the movable or rotatable or portion or base shape with the shield, the vertical axis wind turbine operating on the vertical plane and pivot point gear connected to a motor gear and locking mechanism.

Figure 8:
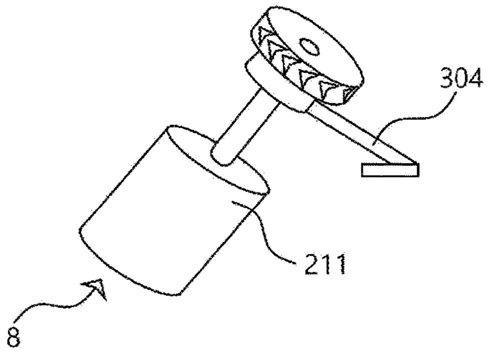

FIG. 8. Shows a close in detail view of a customized or modified motor used in FIG. 7.

Figure 9:
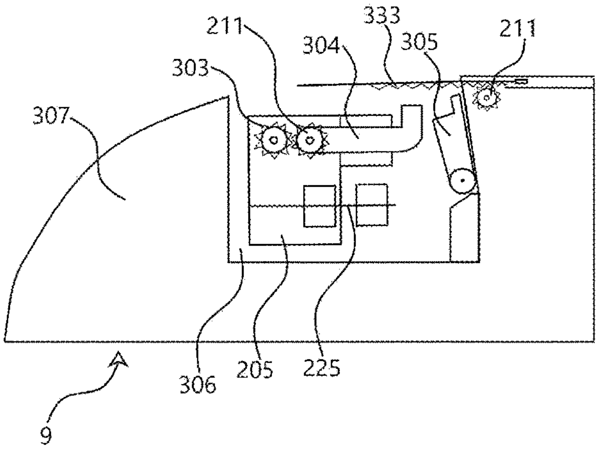

FIG. 9. Shows the detailed view of the setup of FIG. 7, at the housing position.

Figure 10:
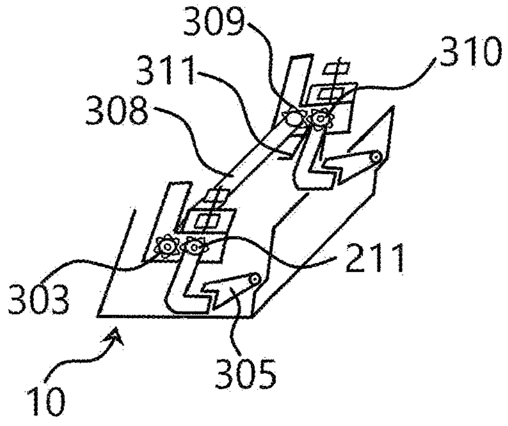

FIG. 10. Shows a multiple interconnected setup of FIG. 7.

Figure 11:
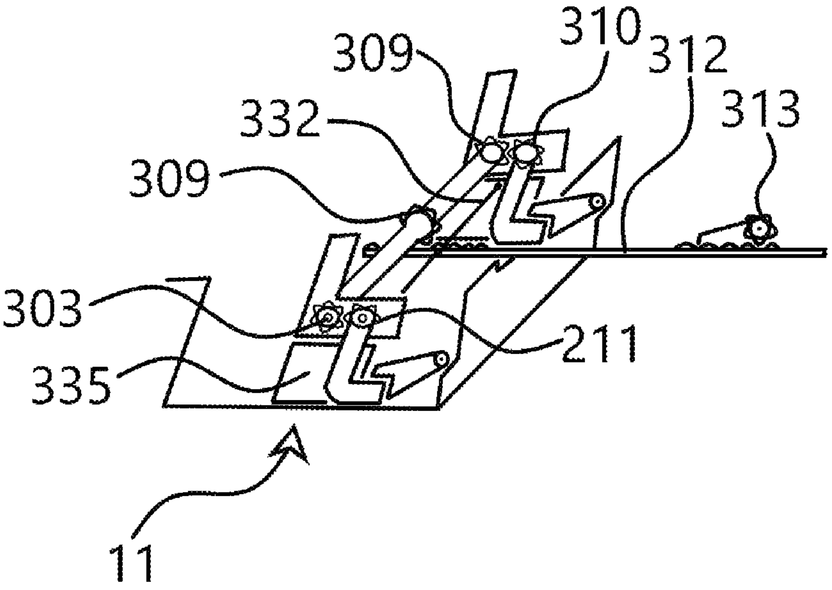

FIG. 11. Shows a multiple interconnected setup of FIG. 7, with extra locking mechanism.

Figure 12:
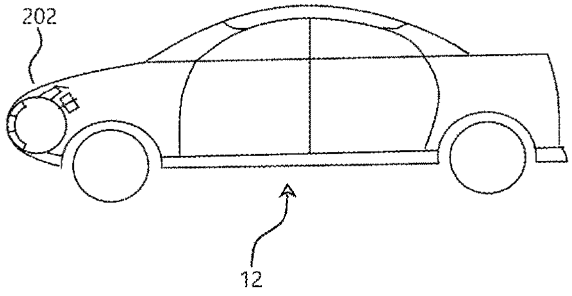

FIG. 12. Shows a transparent view of a vertical axis wind turbine operating on the vertical plane and a shield at a housing position in front of another transportation vehicle with a circular or barrel shape base.

Figure 13:
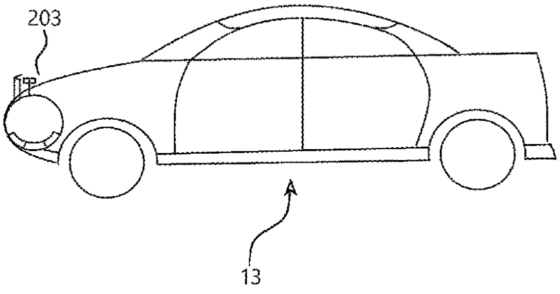

FIG. 13. Shows a transparent view of a vertical axis wind turbine operating on the vertical plane and a shield at an operating position in front of the transportation vehicle of FIG. 12, with a circular or barrel shape base in front, wherein only the blade section and the shield is above the surface.

Figure 14:
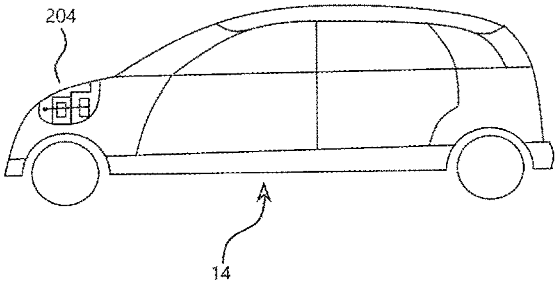

FIG. 14. Shows a transparent view of a vertical axis wind turbine operating on the vertical plane and a shield at a housing position in front of another normal front transportation vehicle.

Figure 15:
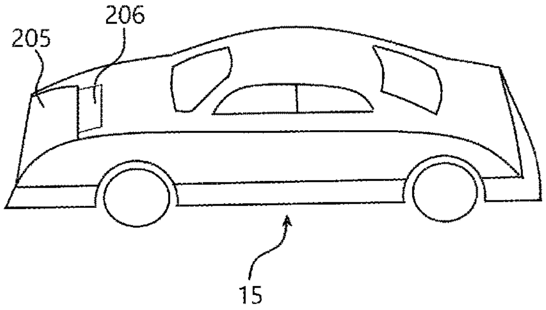

FIG. 15. Shows a plain top view of the transportation vehicle with a circular or barrel shaped based front at an housing position with an addition of a rectangle.

Figure 16:
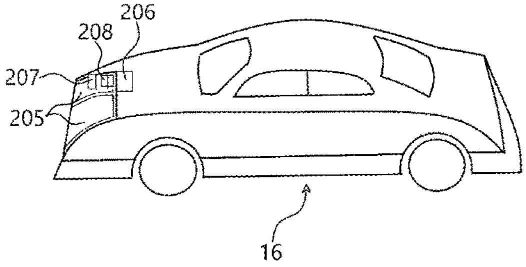

FIG. 16. Shows a top view of a transportation vehicle with a circular or barrel shapes based front, a vertical axis wind turbine operating on the vertical plane and a shield with addition of a rectangle. It also shows that only the blade section and the shield is above the surface.

Figure 17:
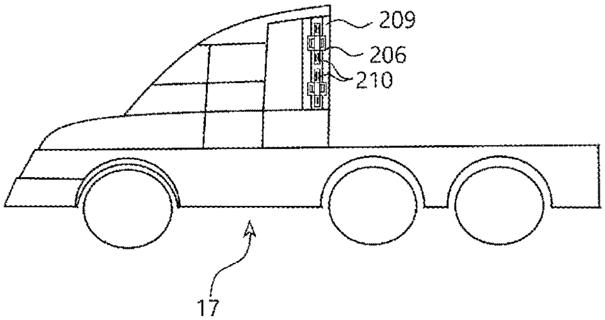

FIG. 17. Shows a transparent view of vertical axis wind turbine operating on the horizontal plane of FIG. 140 at an operating position on the side of a normal side transportation vehicle, wherein most of the vertical axis wind turbine is below the surface of the transportation vehicle except a single blade of the blade section.

Figure 18:
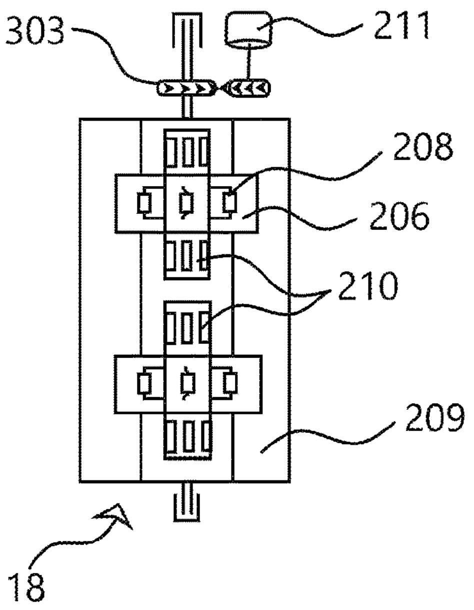

FIG. 18. Shows a zoom in view of the movable or rotatable portion, base shape or container of FIG. 17.

Figure 19:
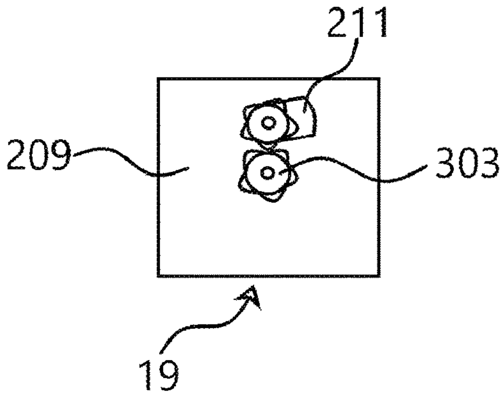

FIG. 19. Shows a top view of FIG. 18.

Figure 20:
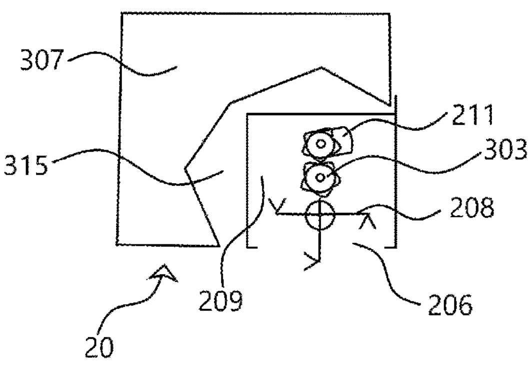

FIG. 20. Shows a detailed top view of FIG. 18.

Figure 21:
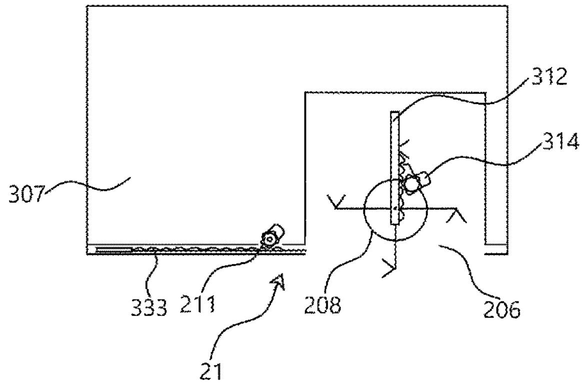

FIG. 21. Shows a detailed top view of FIG. 18, wherein the movable or rotatable portion is fixed and only the vertical axis wind turbine systems are moved to being used to generate energy position and back to the housing positions.

Figure 22:
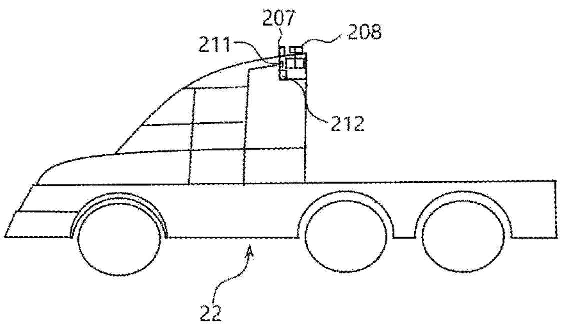

FIG. 22. Shows a transparent view of a vertical axis wind turbine operating on the vertical plane and a shield at an operating position on top of a normal transportation vehicle roof, wherein only the blade section and the shield is above the surface.

Figure 23:
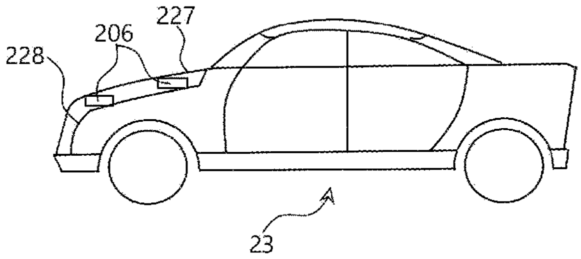

FIG. 23. Shows a normal transportation vehicle front with a second line drawn under the main line that outlining the transportation vehicle, also with two rectangular shapes on its side at different heights. The rectangles are openings or cutouts.

Figure 24:
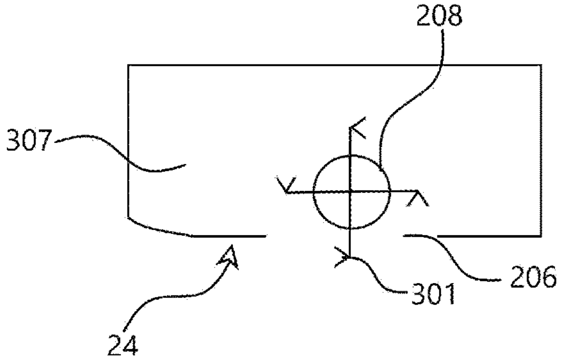

FIG. 24. Shows a detailed top view of FIG. 23.

Figure 25:
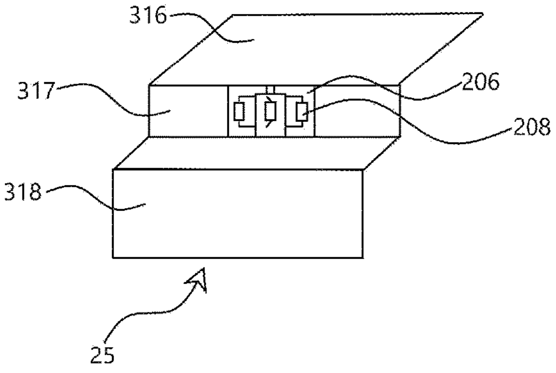

FIG. 25. Shows a detailed sides view of FIG. 24.

Figure 26:
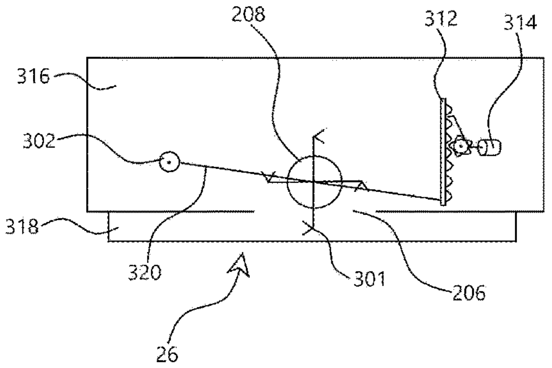

FIG. 26. Shows a detailed top view of both FIGS. 24 and 25 moving mechanisms.

Figure 27:
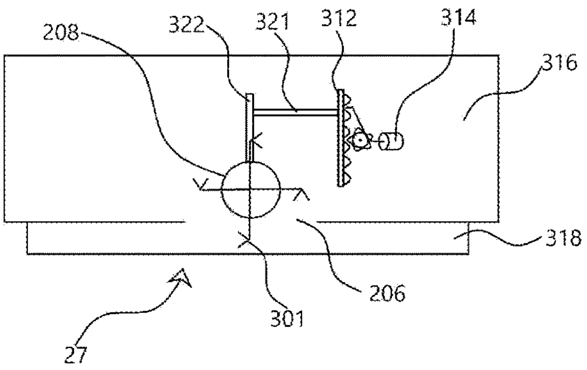

FIG. 27. Shows a detailed top view of both FIGS. 24 and 25 with a different moving mechanism.

Figure 28:
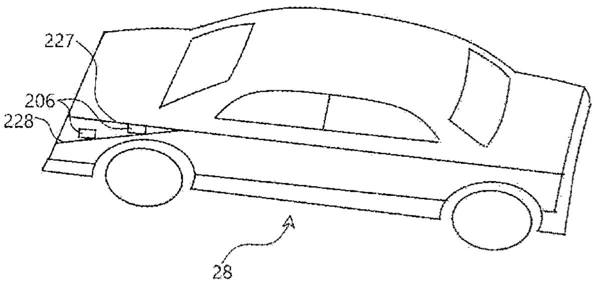

FIG. 28. Shows a top view of another normal transportation vehicle front similar to that of FIG. 23 with a different second line drawn under the main line that outlining the transportation vehicle. It also shows the two rectangular shapes on the side at different heights.

Figure 29:
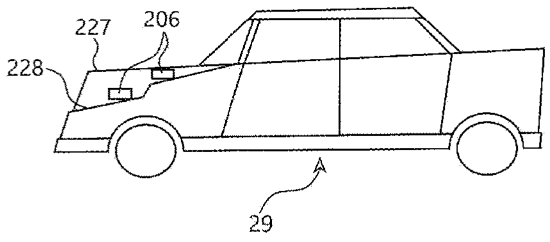

FIG. 29. Shows a side view of another normal transportation vehicle front similar to that of FIG. 23 with a different second contour, curve line drawn under the main line that outlining the transportation vehicle. It also shows the two rectangular shapes on the side at different heights.

Figure 30:
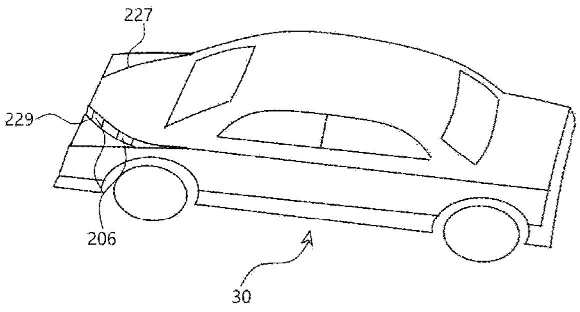

FIG. 30. Shows a top view of another normal transportation vehicle front similar to that of FIG. 28 with a contoured curve in upper front. Showing that the contoured curve in upper is less in width than the rest of the transportation vehicle. The curve is both curved in and angled as it gradually decreases or increases in width.

Figure 31:
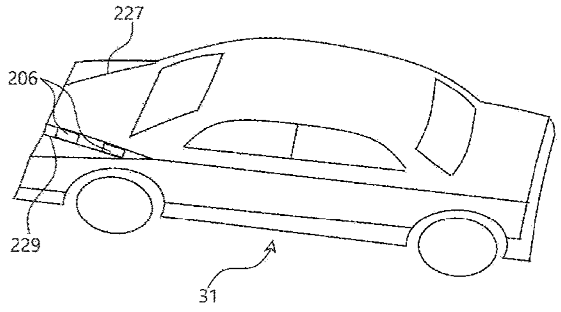

FIG. 31. Shows a top view of another normal transportation vehicle front similar to that of FIG. 30 with a straight contoured curve in upper front. Showing that the straight contour curve in upper is less in width than the rest of the transportation vehicle. The curve is both curved in and straight as it gradually decreases or increases in angle and width. This is also to show that the shape is able to have many different designs or shapes, it does not have to be particular.

Figure 32:
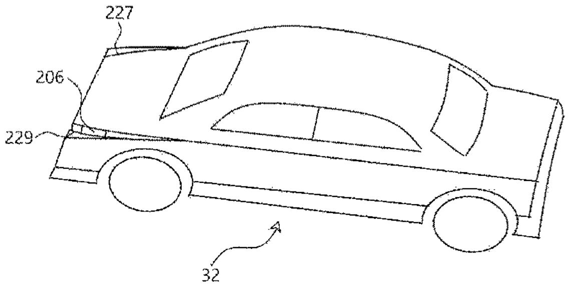

FIG. 32. Shows a top view of another normal transportation vehicle front similar to that of FIG. 30 with a sallow contour curve in upper front. Showing that the sallow contour curve in upper is less in width than the rest of the transportation vehicle. The sallow curve is angled and gradually decreases or increases in angle and width. This is also to show that the design or shape is able to be many different shapes, it does not have to be particular.

Figure 33:
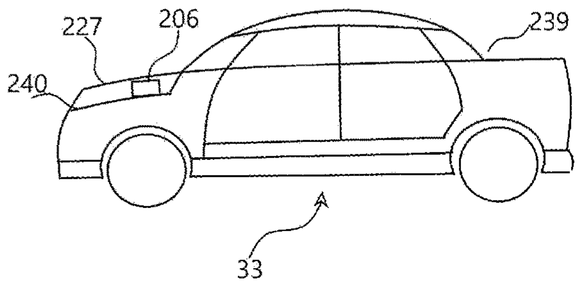

FIG. 33. Shows a side view of a transportation vehicle which has the same side view as FIGS. 30, 31, and 32. They all look the same when viewing from the side.

Figure 34:
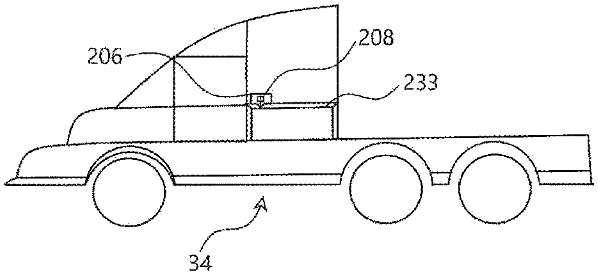

FIG. 34. Shows a side view of the contour curve out (a bump on the side) side of a normal side transportation vehicle. Where the curve out or bump represents an increase in the width of that area of a transportations vehicle and show that area is wider than the rest of the transportation vehicle. It shows the blade section. It shows the opening or a cut out on the side or the surface of the transportation vehicle.

Figure 35:
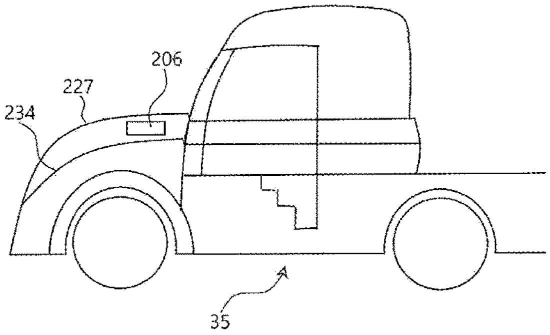

FIG. 35. Shows an opening or a cut out on the side transportation vehicle. It shows the second line under the main front line outlining the transportation vehicle to show that the area between the two lines is narrower than the rest of the transportation vehicle. It shows a rectangle as the opening or the cut out.

Figure 36:
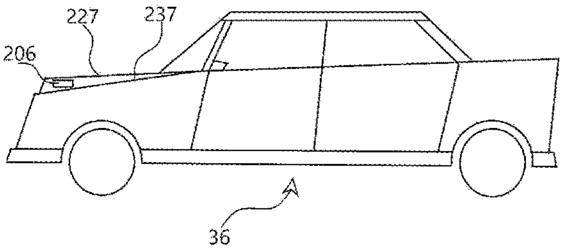

FIG. 36. Shows an opening or a cut out on the side transportation vehicle. It shows the second line under the main front line outlining the transportation vehicle to show that the top part is narrow in width and less in length than the rest of the transportation vehicle. It shows the opening or the cut out on the side of the surface.

Figure 37:
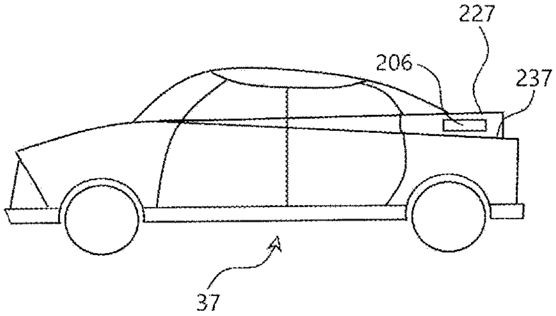

FIG. 37. Shows an opening or a cut out on the side method of another transportation vehicle on the back section. It shows the second line under the main back line outlining the vehicle to show that the area between the two lines is narrow in width and less in length than the rest of the transportation vehicle. It shows the opening or the cut out.

Figure 38:
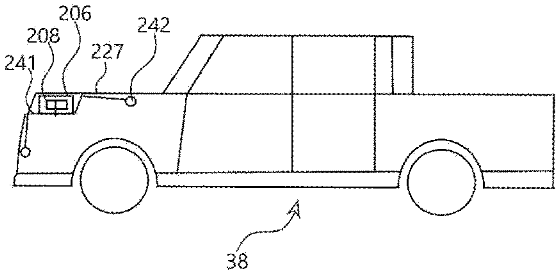

FIG. 38. Shows an opening or a cut out method on the side of another transportation vehicle on the front section. It shows the main outline of the transportation vehicle. It also shows another line under the main front line outlining the vehicle to show that that part is narrower in width than the rest of the transportation vehicle, except here the second line does not run the entire length of the front. It stops short to show that not all the front is narrower than the rest of the vehicle. Only a small section of the front is narrower than the rest of the vehicle. It shows a blade section. It shows a rectangle as an opening or a cut out on the side or the surface of the transportation vehicle. It also shows a line on the top and bottom section extending from the narrow section to a small circle.

Figure 39:
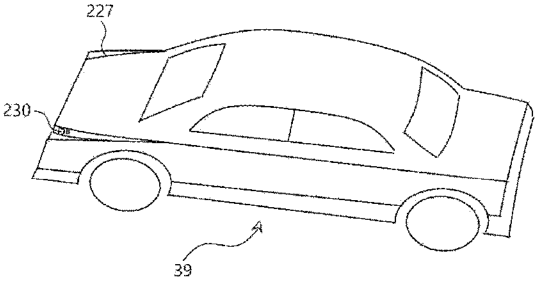

FIG. 39. Shows a top view of a normal transportation vehicle front similar to that of FIG. 32 with a sallow contour curve in upper front. Showing that the sallow contour curve in upper part is less in width than the rest of the transportation vehicle. The sallow curve is angled as it gradually decreases or increases in width. It also shows an addition of a half shield which makes an acute angle with the transportation vehicle sides or surface in a way that a single blade is left not covered or shield by the shield to spin the generator as the wind pushes against the blades.

Figure 40:
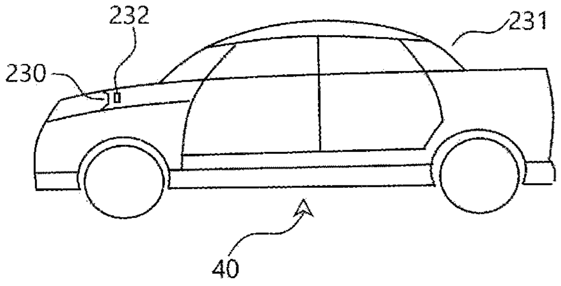

FIG. 40. Shows a side view of FIG. 39. With a second line drawn under the main front line outlining the shape of the transportation vehicle showing that the upper is less in width than the rest of the transportation vehicle. It shows a small rectangle on the side as a single blade of the vertical axis wind turbine blade section. It also shows an addition of a half shield which makes an acute angle with the transportation vehicle sides or surface in front of the small rectangle.

Figure 41:
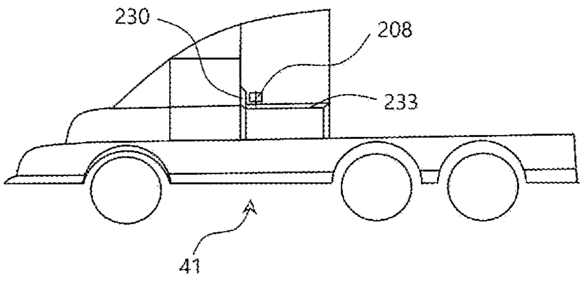

FIG. 41. Shows a side view of contour curve out (a bump on the side) side of another normal side transportation vehicle. Where the curve out or bump represents an increase in the width of the transportations vehicle. To show that area is wider than the rest of the transportation vehicle sides and surfaces. It shows a rectangle with a vertical line in the center as a representation of the vertical axis wind turbine blade section. It also shows the half shield in front of the blade section.

Figure 42:
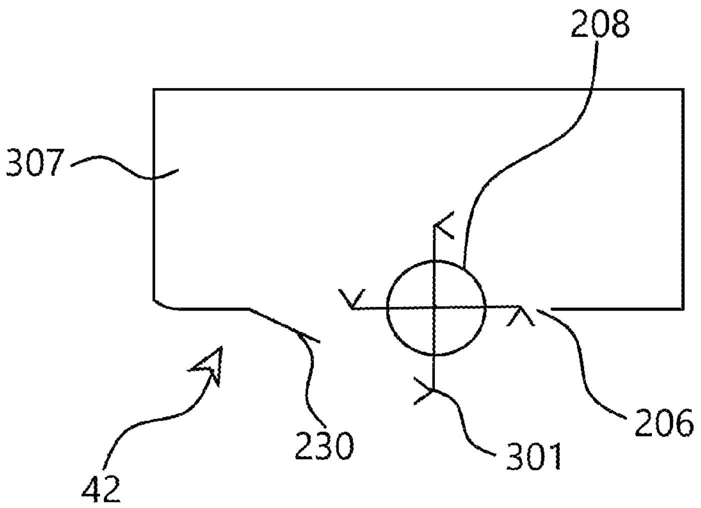

FIG. 42. Shows a detailed top view of FIGS. 39-41.

Figure 43:
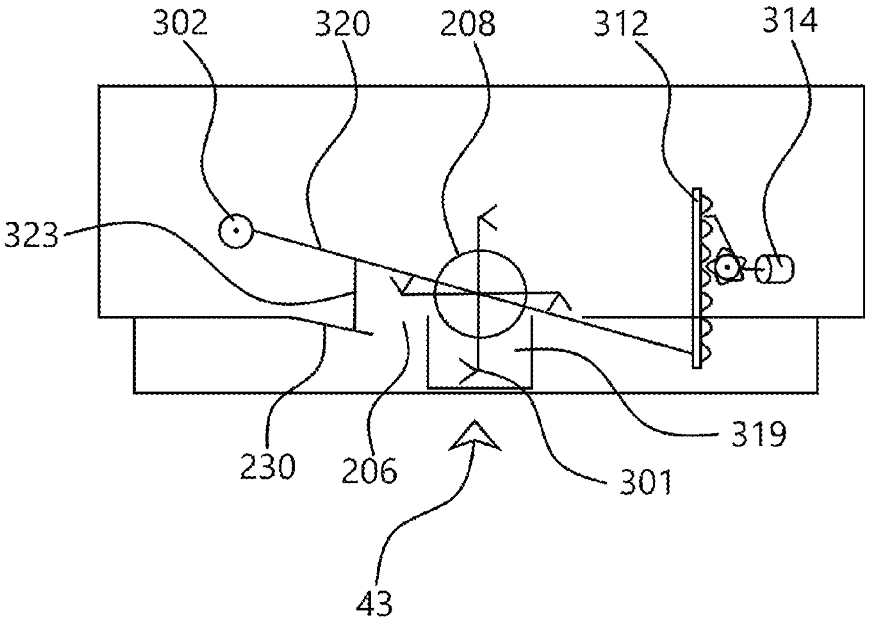

FIG. 43. Shows a detailed top view of FIG. 42 moving mechanisms.

Figure 44:
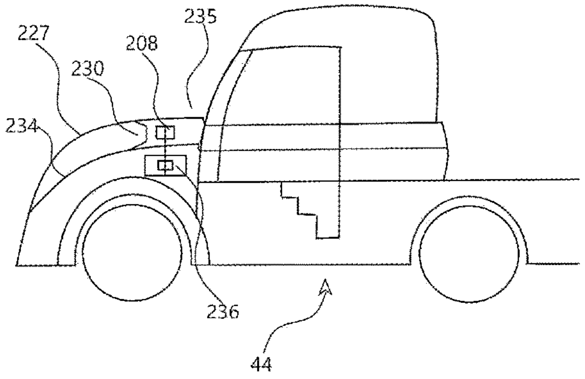

FIG. 44. Shows a transparent view of the system on FIG. 39 on a different transportation vehicle. It shows a normal or a main outline of the transportation vehicle. It also shows another line under the main front line outlining the vehicle to show that the top part is narrower than the rest of the transportation vehicle surface or sides. It shows a simple view of the whole vertical axis wind turbine and the half shield.

Figure 45:
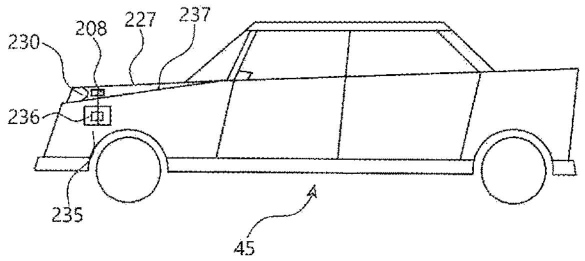

FIG. 45. Is just a transparent view of the system of FIG. 39. It shows the main outline of the transportation vehicle. It also shows another line under the main front line outlining the vehicle to show that the top part is narrower than the rest of the transportation vehicle. It shows the whole vertical axis wind turbine and the half shield.

Figure 46:
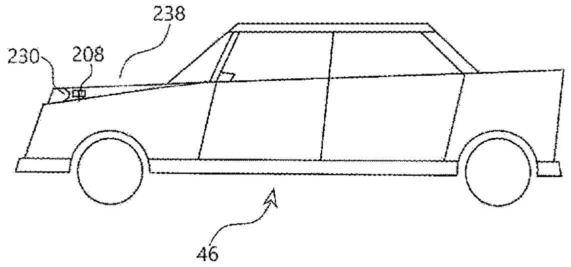

FIG. 46. Shows the same transportation vehicles of FIG. 45. It shows the outer view of the system. It shows only the parts that are visible to a viewer when the system is operating.

Figure 47:
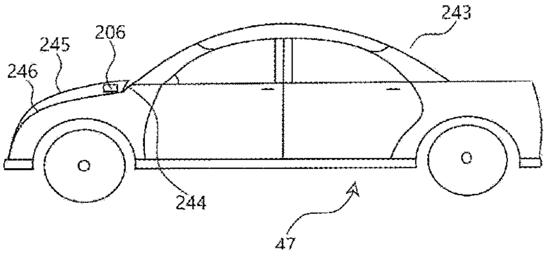

FIG. 47. Shows a normal front transportation vehicle where a front or a hood height is intentional or purposely lower than the bottom end of the windshield line to allow for addition of a second line to be drawn above the main front or hood line that outline the transportation vehicle, to represent a n-shape bump on the hood having different height and width than the rest of the transportation vehicle without the n-shape bump obstructing the view of the operator. It also shows a rectangular shape on the side of the n-shape bump as the opening or cut out on the side or the surface.

Figure 48:
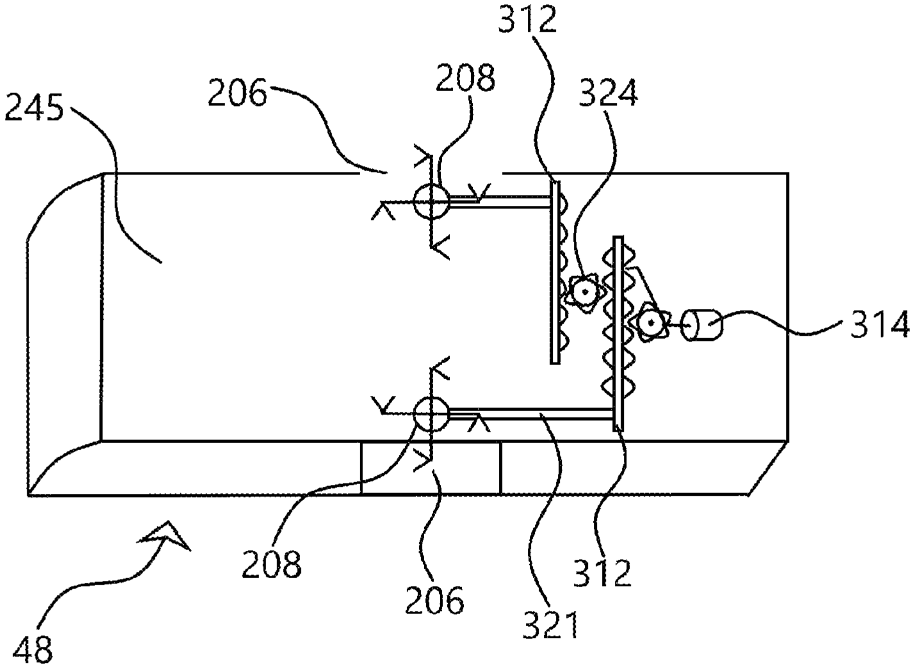

FIG. 48. Shows a detailed top view of FIG. 47, moving mechanisms.

Figure 49:
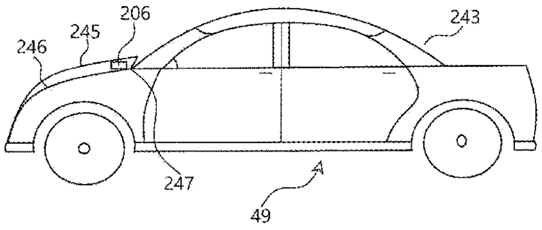

FIG. 49. Shows a normal front transportation vehicle where a front or a hood height is the same height as the bottom end of a windshield line to allow for addition of a second line to be drawn above the main front or hood line outlining the transportation vehicle, to represent a n-shape bump on the hood having different height and width than the rest of the transportation vehicle. It also shows a rectangular shape on the side of the n-shape bump as opening or cut out on the side or the surface.

Figure 50:
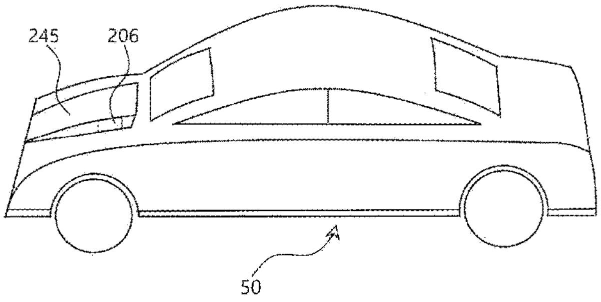

FIG. 50. Shows a top view of FIG. 47.

Figure 51:
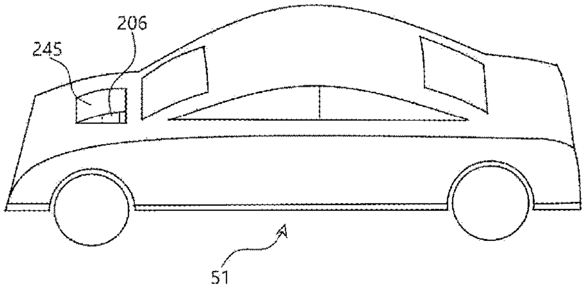

FIG. 51. Shows a top view of FIG. 48 with a different shape and size n-shape bump.

Figure 52:
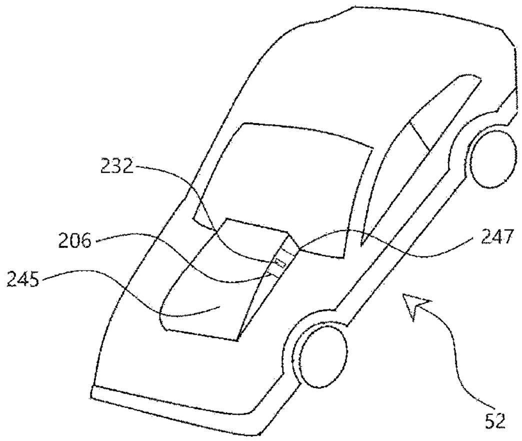

FIG. 52. Shows a top view of FIG. 49.

Figure 53:
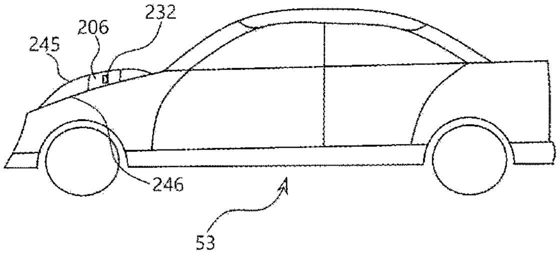

FIG. 53. Shows a lower front or hood transportation vehicle featuring a different n-shape bump without obstructing the operator view.

Figure 54:
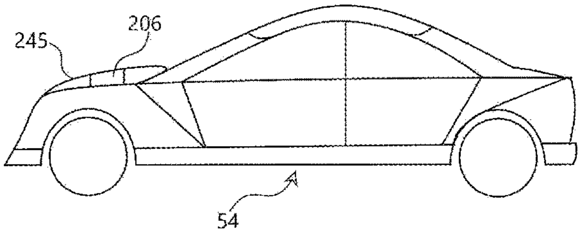

FIG. 54. Shows a side view of a normal looking sports car having an n-shape bump with an opening or the cut out method on the side of the n-shape bump.

Figure 55:
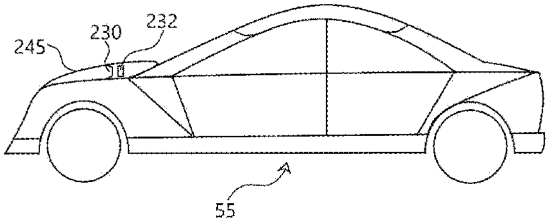

FIG. 55. Shows a side view of a normal looking sports car having a n-shape bump with a half shield method on the side of the n-shape bump.

Figure 56:
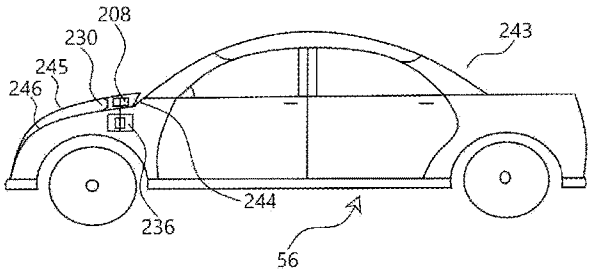

FIG. 56. Shows a transparent view of the vertical axis wind turbine on the transportation vehicle of FIG. 47, with the half shield method where a front or a hood height is intentionally or purposely lower than the bottom end of the windshield to allow the addition of a n-shape bump without obstructing the view of the operator.

Figure 57:
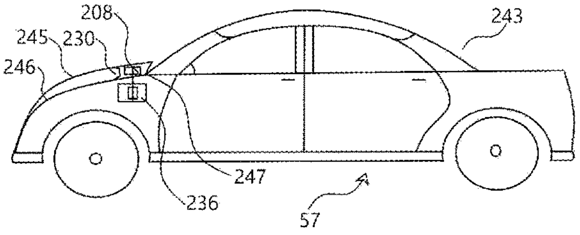

FIG. 57. Shows a transparent view of the vertical axis wind turbine on the transportation vehicle of FIG. 49 with the half shield method where a front or a hood height is the same height as the bottom end of a windshield to allow for addition of a n-shape bump.

Figure 58:
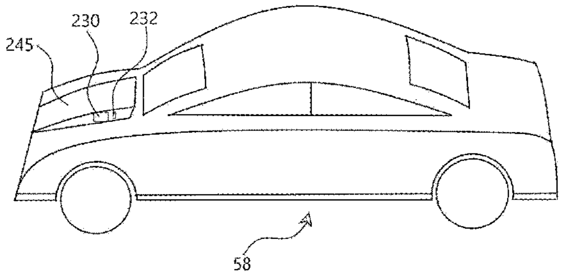

FIG. 58. Shows a top view of FIG. 56.

Figure 59:
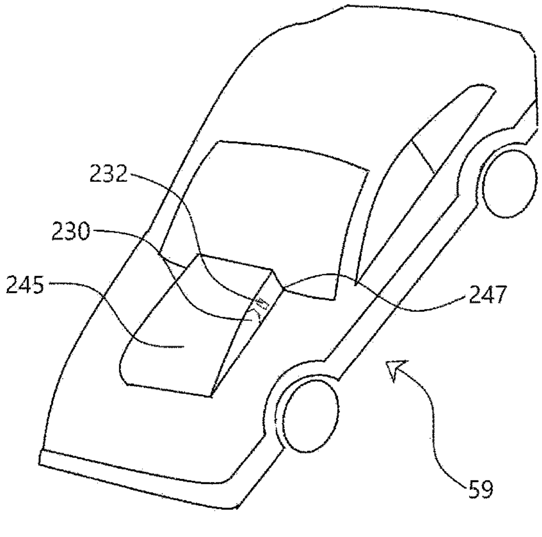

FIG. 59. Shows a top view of FIG. 57.

Figure 60:
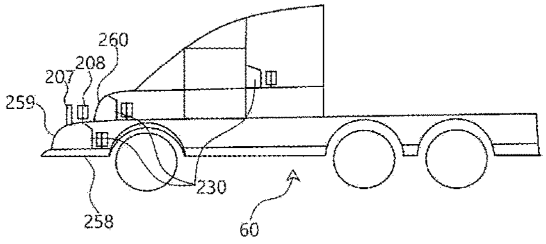

FIG. 60. Shows a transportation vehicle having extended front, where in the front is purposely elongated or stretching out further than a normal transportation vehicle front. It is also given multiple levels varying in height and width, so that the transportation vehicle will be able to house, carry and use more vertical axis wind turbines for its energy needs. It has a vertical axis wind turbine on the very front, with the blade section and the shield being above the first level. It also has one or more vertical axis wind turbines on its sides at varying positions so they won't interfere with each other's performance. The figure shows the half shield method on the side.

Figure 61:
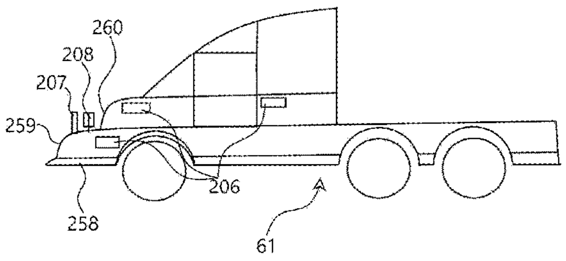

FIG. 61. Shows a transportation vehicle of FIG. 60 having extended front and multiple levels having one or more of the openings or the cut out system or method on its sides at varying positions so they won't interfere with each other.

Figure 62:
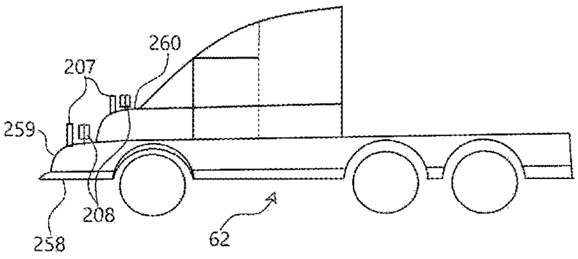

FIG. 62. Shows a transportation vehicle of FIG. 60 having extended front and multiple levels. The figure shows the transportation vehicle having vertical axis wind turbines and shields on the very front, on both the bottom level and the second level with the blade section and the shield being above the levels surfaces so they won't interfere with each other.

Figure 63:
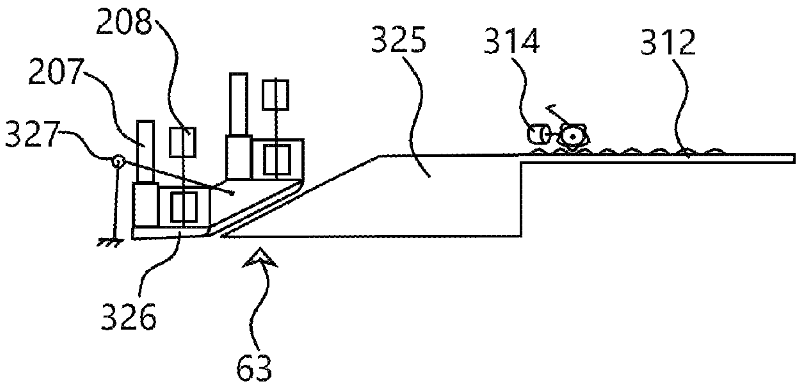

FIG. 63. Shows a detailed moving mechanism of FIGS. 60-62.

Figure 64:
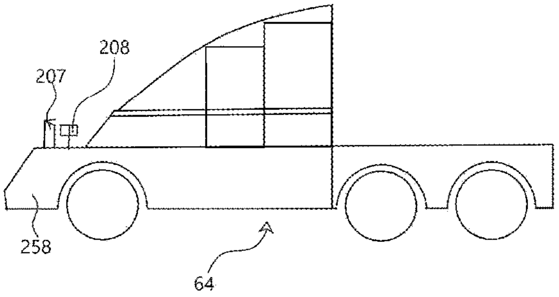

FIG. 64. Shows a transportation vehicle having extended front, where in the front is purposely elongated or stretching out further than a normal transportation vehicle front. So that the transportation vehicle will be able to house, carry and use more vertical axis wind turbines for its energy needs. This figure shows a single level front extension.

Figure 65:
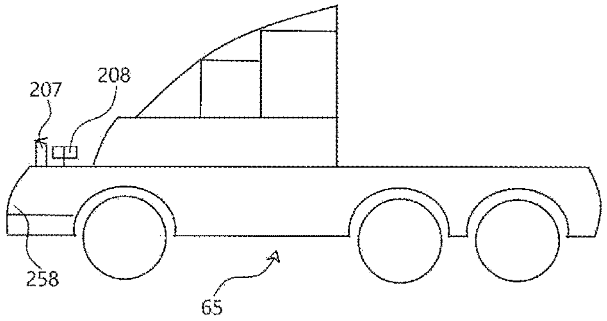

FIG. 65. Shows another transportation vehicle having extended front. This figure shows another single level front extension.

Figure 66:
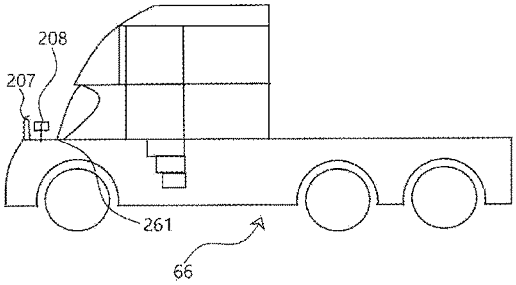

FIG. 66. Shows another transportation vehicle having extended front. This figure is more of a push back cabin front than an extended front. This figure shows another single level front extension.

Figure 67:
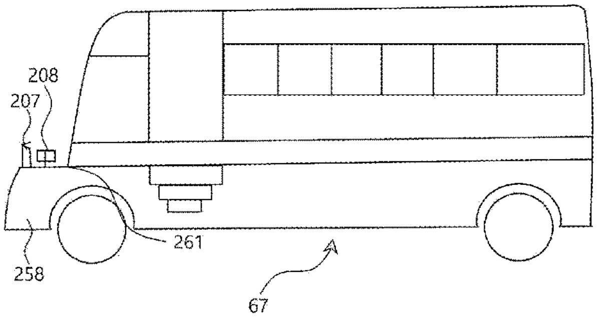

FIG. 67. Shows another transportation vehicle having extended front. This figure is more of a push back cabin front. This figure shows another single level front extension.

Figure 68:
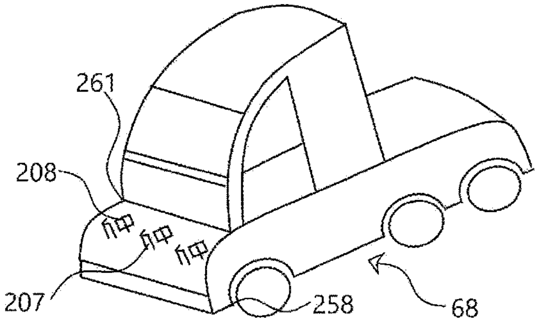

FIG. 68. Show top view of the extended front, push back cabin front or lower elongated front of the transportation vehicle of FIGS. 64, 65, 66 and 67. It gives the viewer a better understanding of the previous figures.

Figure 69:
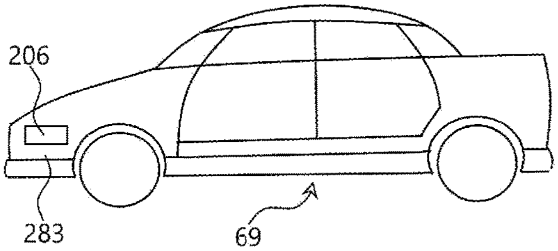

FIG. 69. Shows an extended front transportation vehicle to house a vertical axis wind turbine operating on the vertical plane between the front end and the front tire on the sides. It shows the opening or the cutout system, method or setup on its sides.

Figure 70:
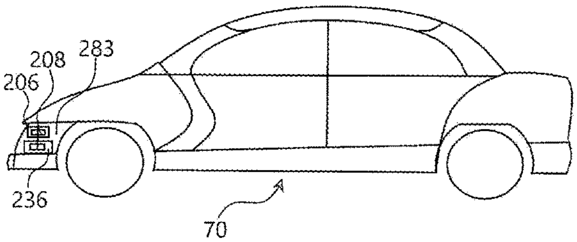

FIG. 70. Shows a transparent view of another extended front transportation vehicle to house a vertical axis wind turbine operating on the vertical plane between the front end and the front tire on the sides. It uses the opening or cutout system, method, or setups on its sides.

Figure 71:
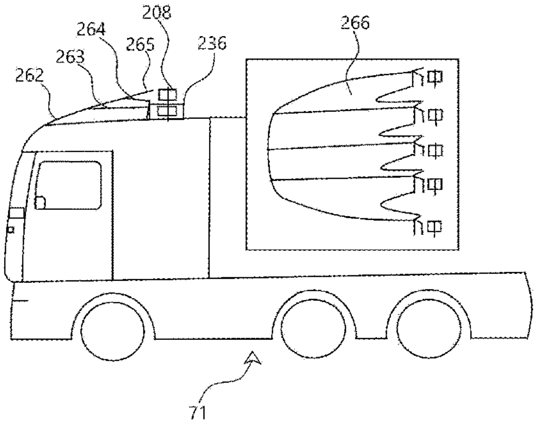

FIG. 71. Shows a normal looking transportation vehicle with fairing above the roof, and a vertical axis wind turbine operating on the vertical plane behind the fairing. It shows an addition of a top view of the fairing having one or more vertical axis wind turbines behind it, to give the viewer a better understanding of the system.

Figure 72:
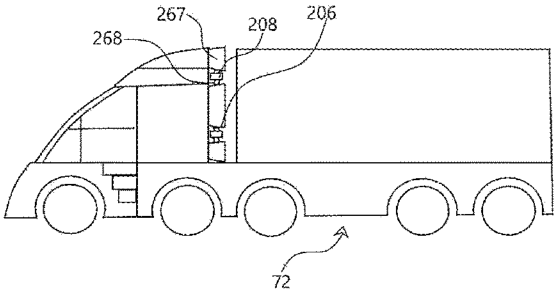

FIG. 72. Shows a normal looking transportation vehicle with fairing on the side behind the operator cabin, and a vertical axis wind turbine operating on the horizontal plane under the side fairing.

Figure 73:
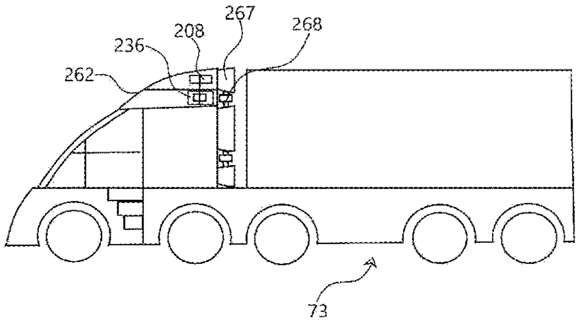

FIG. 73. Shows a normal looking transportation vehicle of FIG. 72 with above the roof fairing and vertical axis wind turbine operating on the vertical plane set up of FIG. 71. Also with side fairing and vertical axis wind turbine operating on the horizontal plane on set up of FIG. 72.

Figure 74:
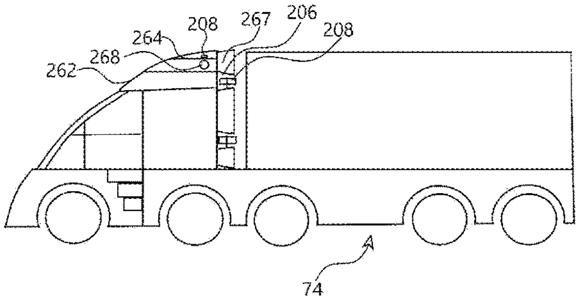

FIG. 74. Shows a normal looking transportation vehicle of FIG. 71 with a reverse vertical axis wind turbine set up. Wherein the above fairing is now coupled with the vertical axis wind turbine operating on the horizontal plane and the side fairing is now coupled with the vertical axis wind turbine operating on the vertical plane.

Figure 75:
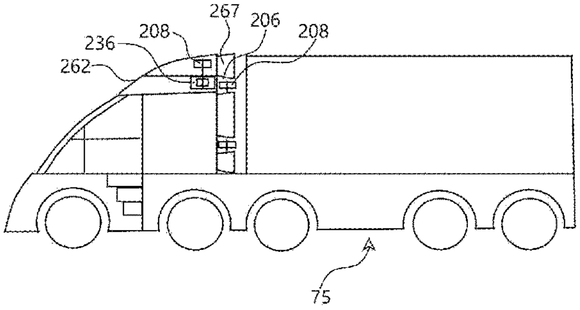

FIG. 75. Shows a normal looking transportation vehicle of FIG. 72 with a different vertical axis wind turbine set up. Wherein both the above and the side fairing are now coupled with a vertical axis wind turbine operating on the vertical plane.

Figure 76:
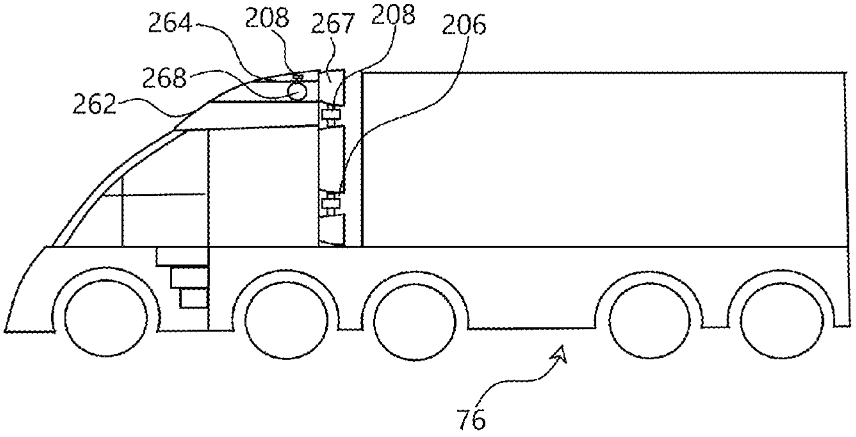

FIG. 76. Shows a normal looking transportation vehicle of FIG. 72 with a different vertical axis wind turbine set up. Wherein both the above and the side fairing are now coupled with vertical axis wind turbines that have blade portion in the middle and generate portion on both sides or end.

Figure 77:
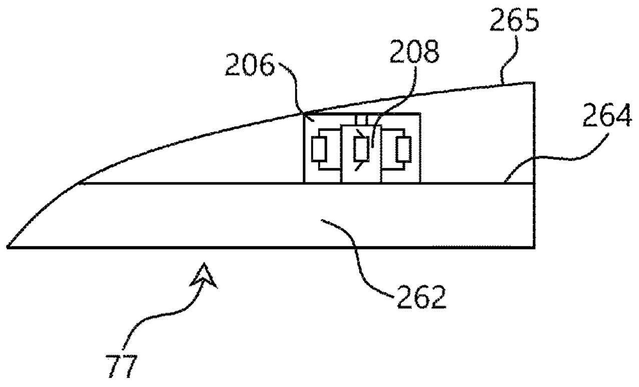

FIG. 77. Shows a separate view of a top fairing.

Figure 78:
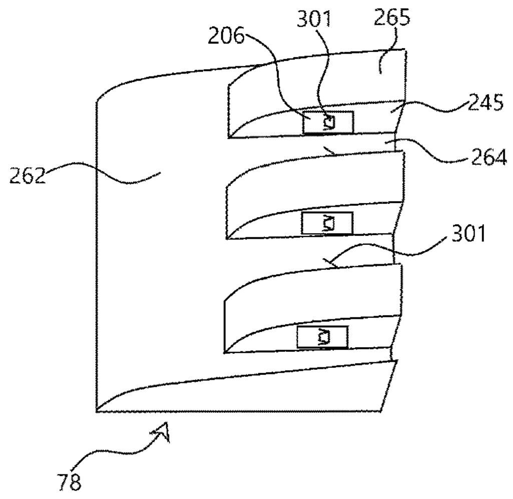

FIG. 78. Shows a detailed top view of FIG. 77.

Figure 79:
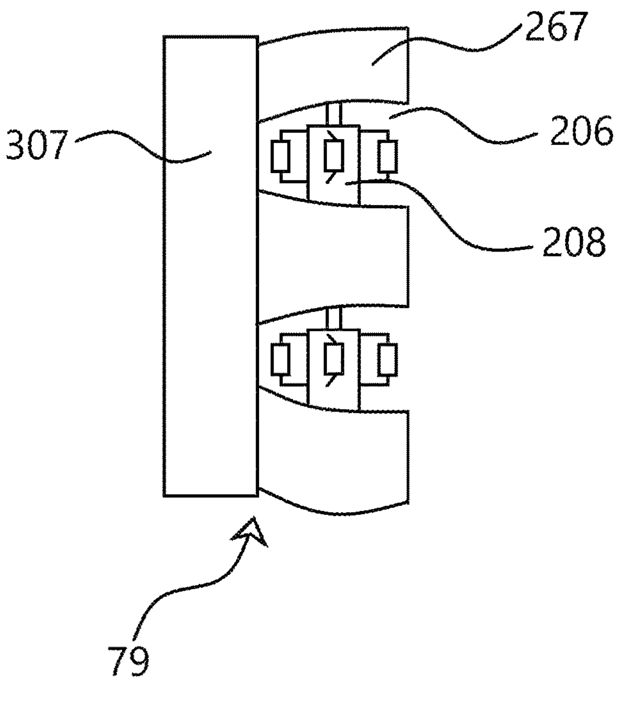

FIG. 79. Shows a blade portion of the vertical axis wind turbine on the side fairing.

Figure 80:
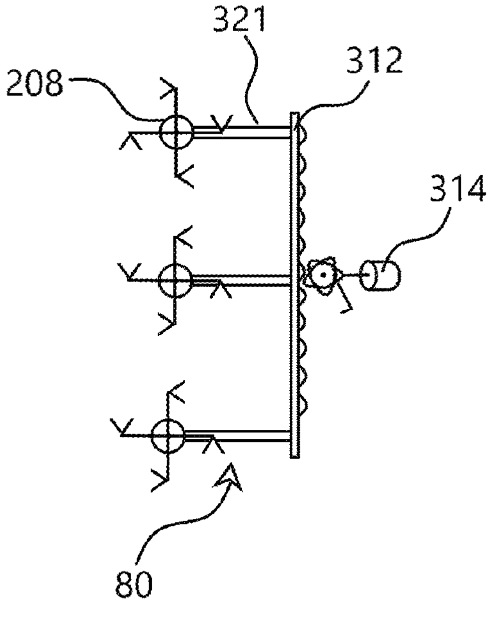

FIG. 80. Shows a simple close in view of the moving mechanisms for the fairing setup.

Figure 81:
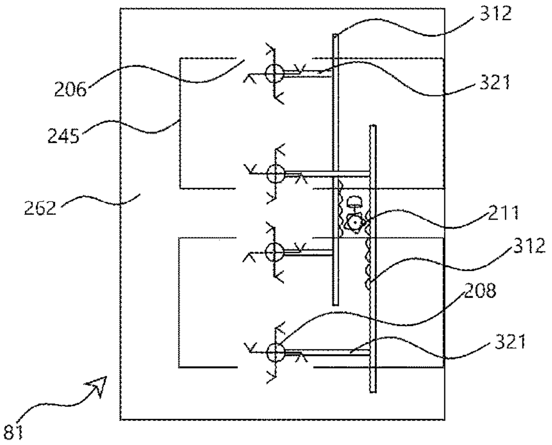

FIG. 81. Shows a detailed close in view of the moving mechanisms for the fairing setup.

Figure 82:
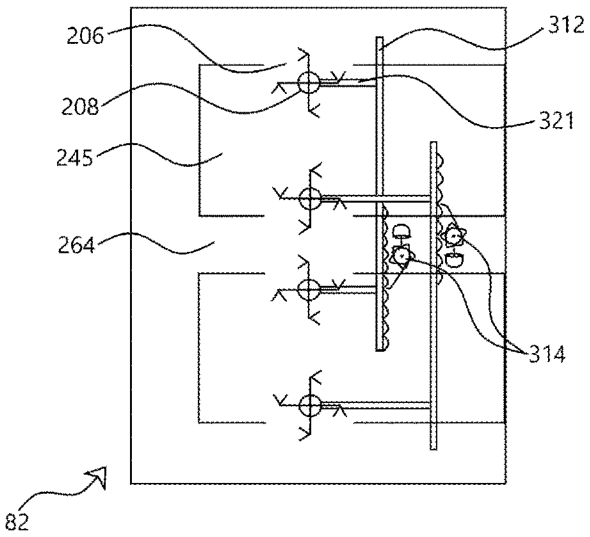

FIG. 82. Shows another detailed close in view of the moving mechanisms for the fairing system setup.

Figure 83:
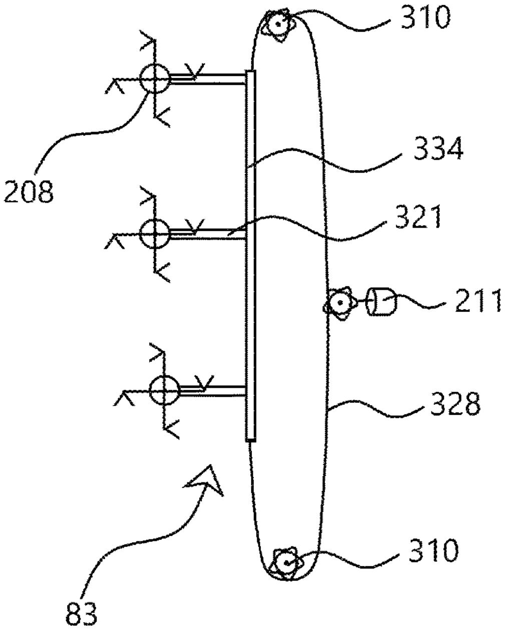

FIG. 83. Shows a detailed skeleton view of another moving mechanism for the fairing system.

Figure 84:
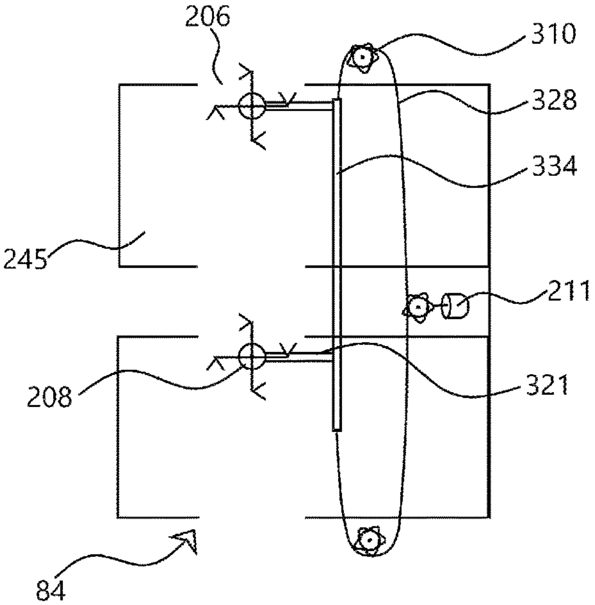

FIG. 84. Shows a more detailed view of FIG. 83.

Figure 85:
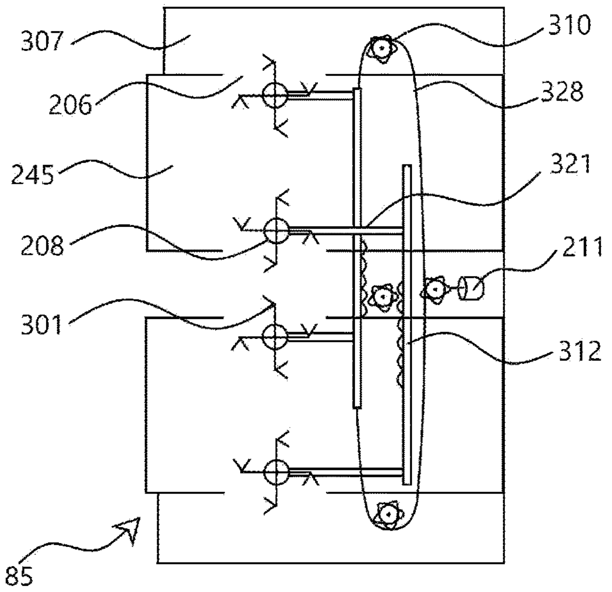

FIG. 85. Shows a more detailed and complex view and setup of FIGS. 83 and 84.

Figure 86:
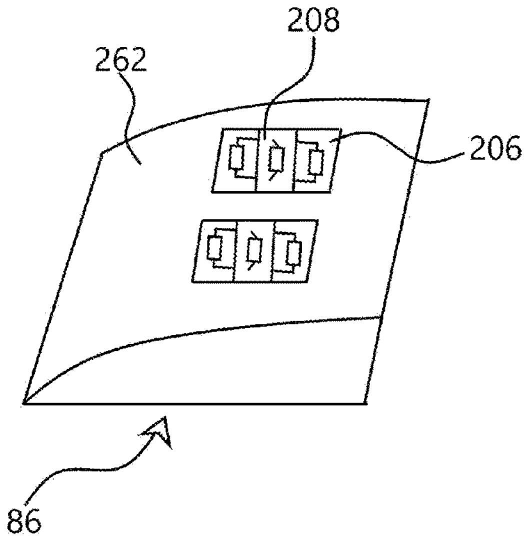

FIG. 86. Shows a detailed top view of a top fairing with a top surface opening or cutout.

Figure 87:
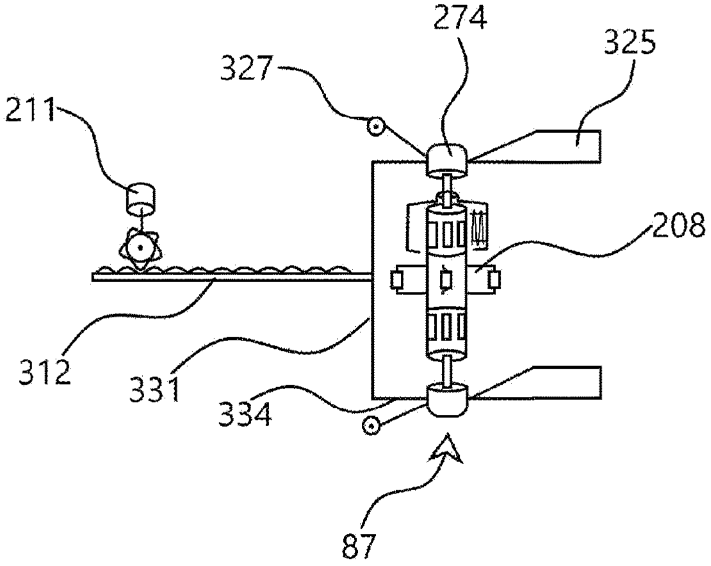

FIG. 87. Shows a detailed skeleton view of a moving mechanism for FIG. 86.

Figure 88:
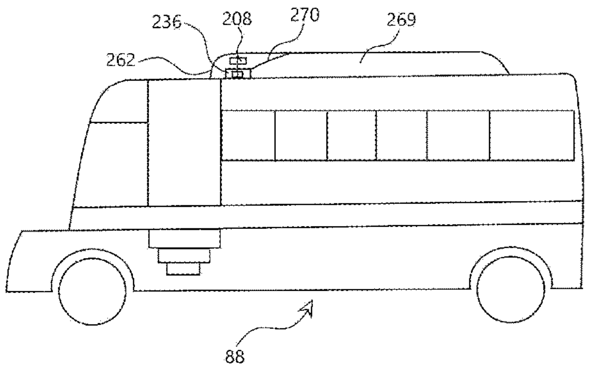

FIG. 88. Shows a transportation vehicle with a large hump on the roof for its compressed natural gas (CNG) fuel tanks. It shows a fairing and a vertical axis wind turbine operating on the vertical plane in front of it.

Figure 89:
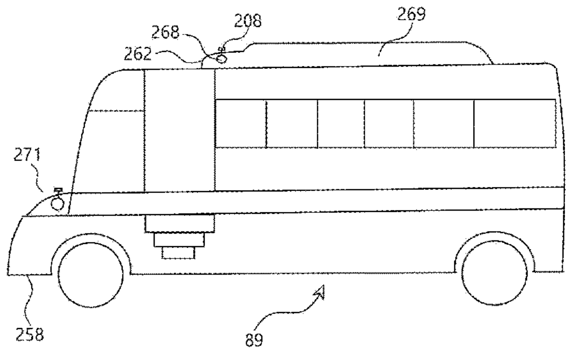

FIG. 89. Shows the transportation vehicle of FIG. 88, with a vertical axis wind turbine operating on the vertical plane and fairing in front of the large hump. It also shows a vertical axis wind turbine operating on the vertical plane and fairing coupled to the front extension in front of the transportation vehicle.

Figure 90:
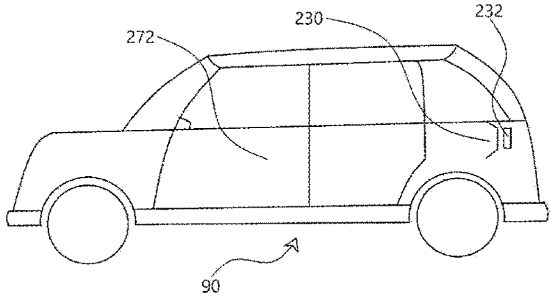

FIG. 90. Shows a side view of a normal looking transportation vehicle, employing the half shield system, method or setup on its side.

Figure 91:
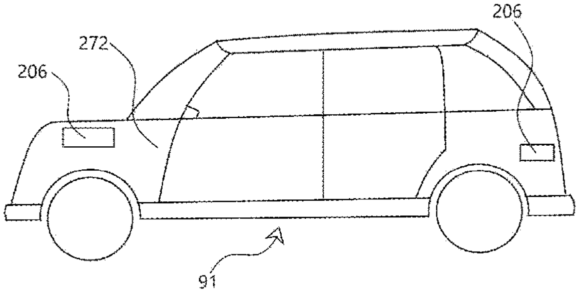

FIG. 91. Shows a side view of a normal looking transportation vehicle, employing the opening or the cut out system, method or setup on its side.

Figure 92:
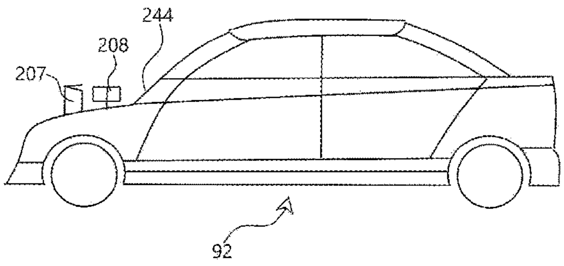

FIG. 92. Shows a normal front transportation vehicle where a front or a hood height is intentionally or purposely lowered or depressed than the bottom end of the windshield line to allow for addition of a vertical axis wind turbine operating on the vertical plane and shield systems without the systems obstructing the operator or the driver view.

Figure 93:
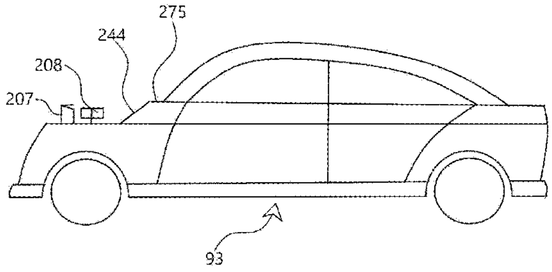

FIG. 93. Shows another different design lowered or depressed front transportation vehicle having the same properties, functions, methods, ways and workings as that of FIG. 92.

Figure 94:
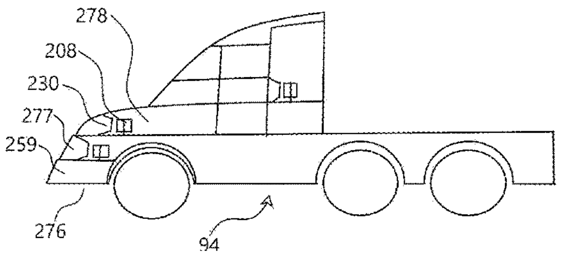

FIG. 94. Shows a non extended multi level stair front and side of a transportation vehicle with the half shield and vertical axis wind turbine operating on the vertical plane on the side.

Figure 95:
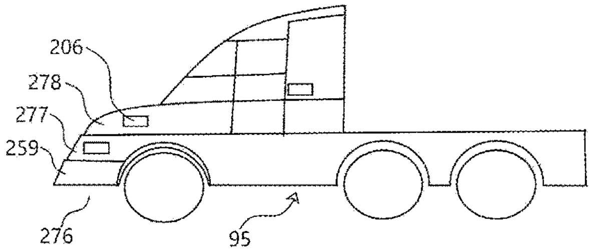

FIG. 95. Shows a non extended multi level stair front and side of a transportation vehicle with the opening or cut out and vertical axis wind turbine operating on the vertical plane on the side.

Figure 96:
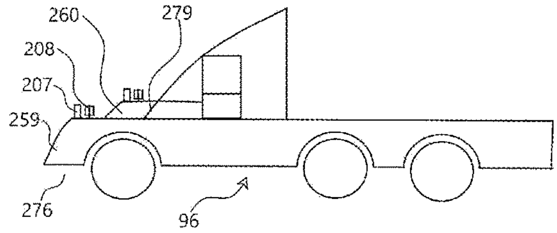

FIG. 96. Shows a non extended multi level stair front of a transportation vehicle with a shield and the blade section being above the surface of both levels in front.

Figure 97:
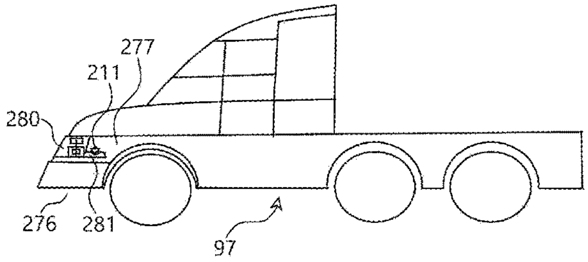

FIG. 97. Shows a non extended multi level stair front and side of a transportation vehicle of FIG. 95 with a tray push or slide out front system at the housing position on the middle level.

Figure 98:
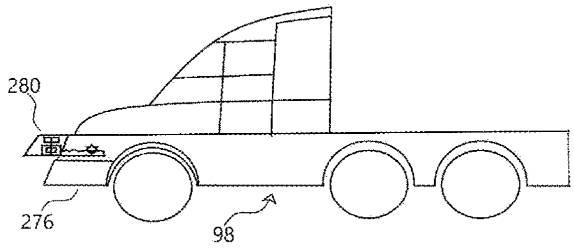

FIG. 98. Shows a non extended multi level stair front and side of a transportation vehicle of FIG. 97 with a tray push or slide out front system at the operating position on the middle level.

Figure 99:
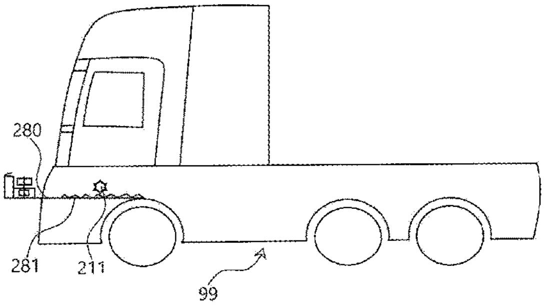

FIG. 99. Shows a normal looking transportation vehicle with a tray push or slide out front system at the operating position on it below the operator cabin.

Figure 100:
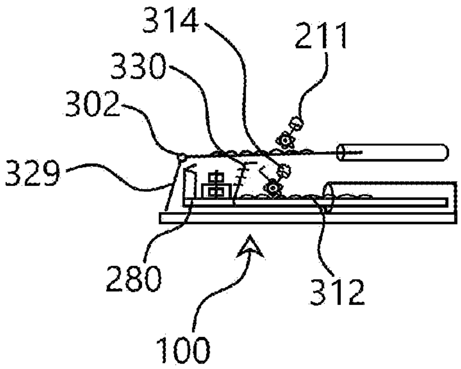

FIG. 100. Shows a detailed moving mechanism of the tray push or slide out system.

Figure 101:
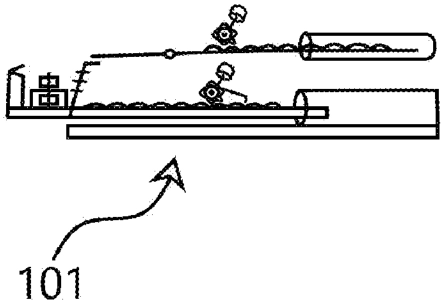

FIG. 101. Shows the tray system of FIG. 100 at the operating position.

Figure 102:
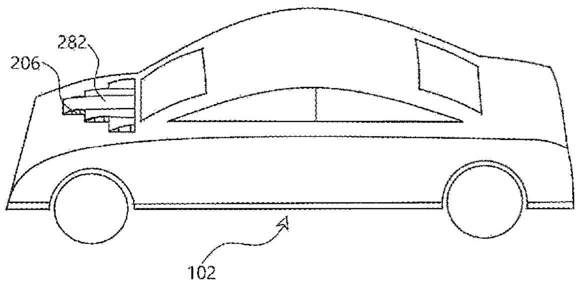

FIG. 102. Shows a side and top view of a normal looking transportation vehicle having an inverted symmetric unimodal n-shape bump on the front or on the hood with an opening or the cut out method on the side of the inverted symmetric unimodal n-shape bump.

Figure 103:
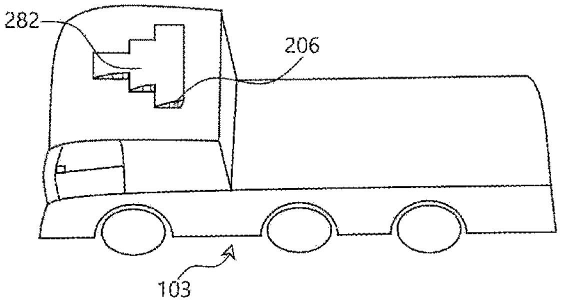

FIG. 103. Shows another side and top view of a normal looking transportation vehicle having an inverted symmetric unimodal n-shape bump above or on the roof with an opening or the cut out method on the side of the inverted symmetric unimodal n-shape bump.

Figure 104:
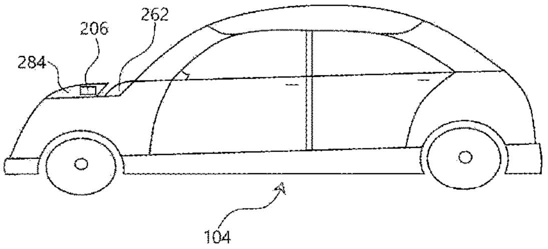

FIG. 104. Shows a side view of a normal transportation vehicle with a u-shape groove or channel on the front or the hood. The system features a vertical axis wind turbine operating on the vertical plane and the opening or cutout method on the side or surface of a n-shape bump wall. The u-shape groove or channel can be imagined as multiple n-shape bumps next to each other with little gap between the bumps which now makes or forms grooves or channels on a single transportation vehicle.

Figure 105:
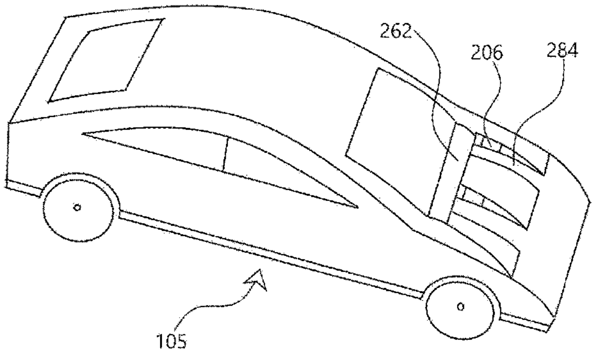

FIG. 105. Shows a top, clear and more understanding view of the u-shape grooves or channels on the transportation vehicle of FIG. 104.

Figure 106:
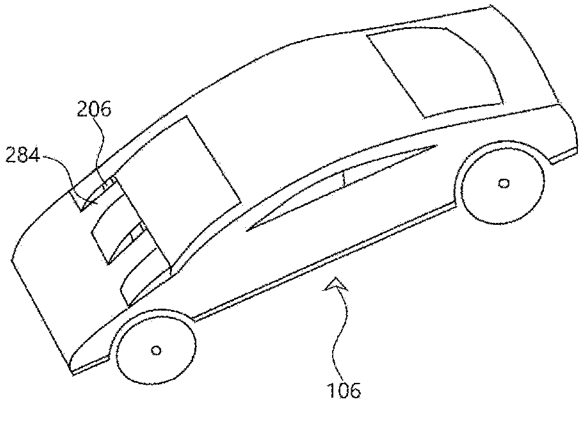

FIG. 106. Shows a top, clear and more understanding view of the u-shape grooves or channels on another transportation vehicle with shorter n-shape bumps.

Figure 107:
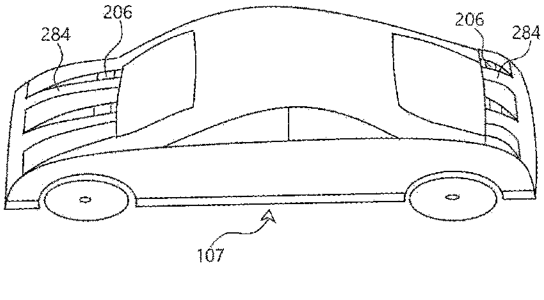

FIG. 107. Shows a top, clear and more understanding view of the u-shape grooves or channels on another transportation vehicle with the u-shape grooves or channels being on both the front and the back of the transportation vehicle.

Figure 108:
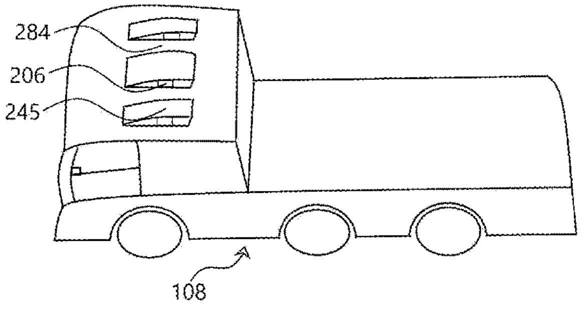

FIG. 108. Shows a top, clear and more understanding view of the u-shape grooves or channels on another type of transportation vehicle with the u-shape grooves or channels being above or on the roof.

Figure 109:
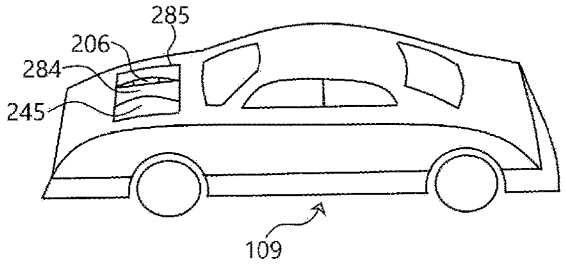

FIG. 109. Shows a top, clear and more understanding view of a different u-shape groove or channel on another type of transportation vehicle with the u-shape grooves or channels on the front or the hood.

Figure 110:
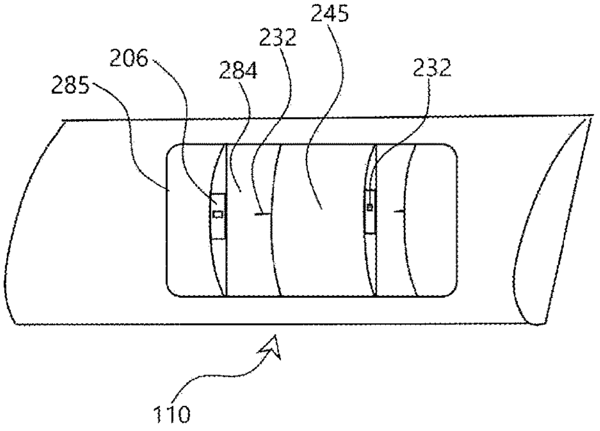

FIG. 110. Shows a top, clear and more understanding view of a different u-shape grooves or channels on another type of transportation vehicle (airplane) with the u-shape grooves or channels on a wing.

Figure 111:
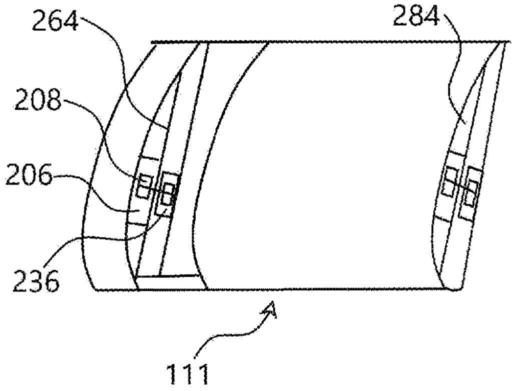

FIG. 111. Shows a transparent top, clear and more understanding view of a different u-shape grooves or channels on another type of transportation vehicle (airplane) with the u-shape grooves or channels being able to be carved out of the transportation vehicle (airplane wing) body or structure itself.

Figure 112:
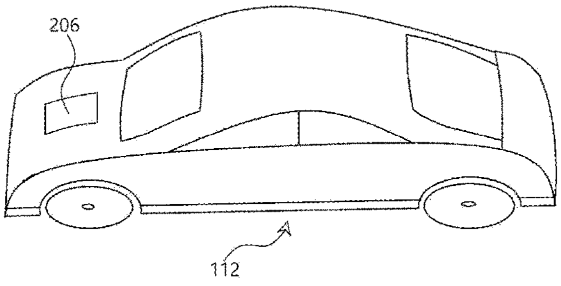

FIG. 112. Shows a top view of a normal transportation vehicle with a rectangle opening or cutout method on the front or the hood.

Figure 113:
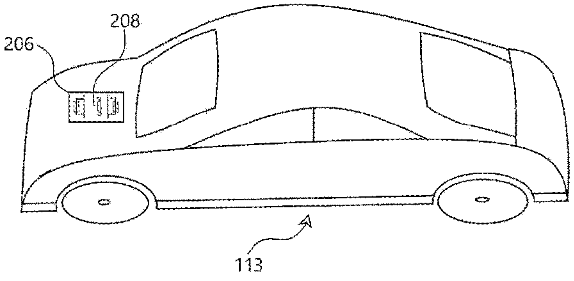

FIG. 113. Shows a top view of a normal transportation vehicle of FIG. 112 with a rectangle opening or cutout method on the front or the hood with the blade section shown inside the rectangle opening or cut out.

Figure 114:
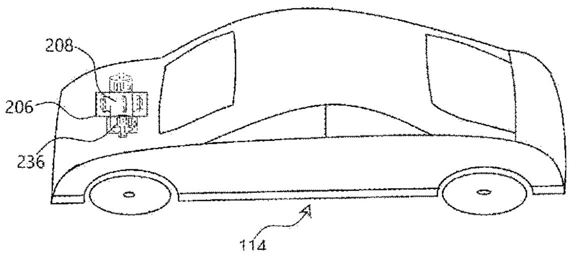

FIG. 114. Shows a top view of a normal transportation vehicle of FIG. 112 with a rectangle opening or cutout method on the front or the hood with the blade section shown inside the rectangle opening or cutout. It also shows a transparent view of the generator sections.

Figure 115:
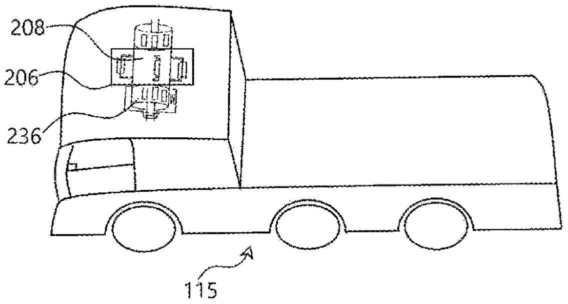

FIG. 115. Shows a top view of another normal transportation vehicle, with a rectangle opening or cut out on the roof or above with the blade section shown inside the rectangle opening or cut out. It also shows a transparent view of the generator sections.

Figure 116:
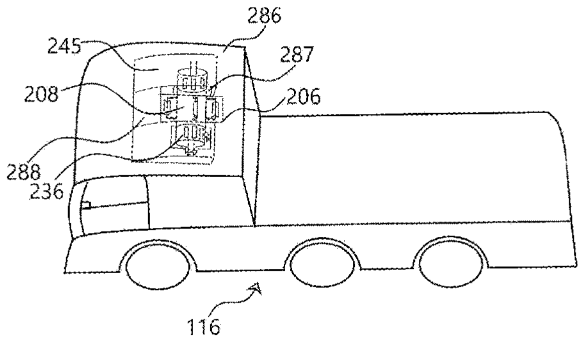

FIG. 116. Shows the transportation vehicle of FIG. 115 with a transparent view of a different version of the method or the setup on the roof or above. Here a set of n-shape bumps are added to the surface of the roof or the above.

Figure 117:
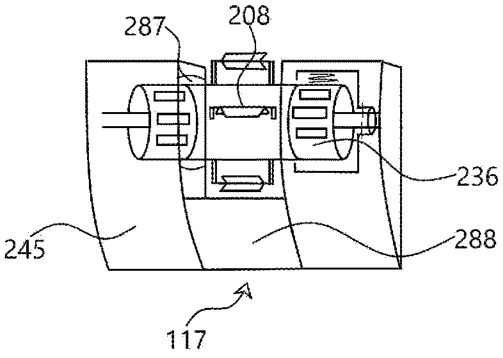

FIG. 117. Shows a close or zoom-in transparent view of the double generator vertical axis wind turbine operating on the horizontal plane and set of n-shape bump method or setup of FIG. 116.

Figure 118:
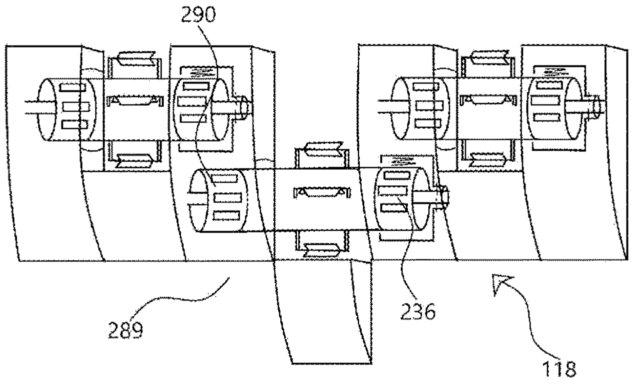

FIG. 118. Shows a close or zoom-in transparent view of a triple vertical axis wind turbine operating on the horizontal plane having a zigzag arrangement method or setup of the system.

Figure 119:
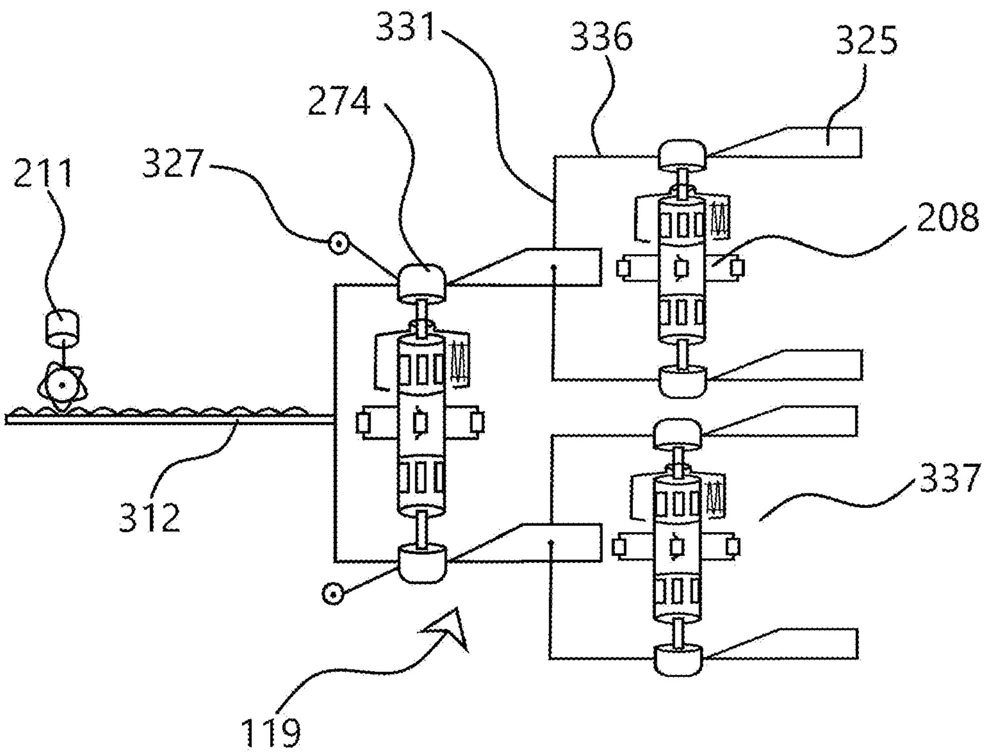

FIG. 119. Shows a detailed skeleton view of a moving mechanism for FIG. 118.

Figure 120:
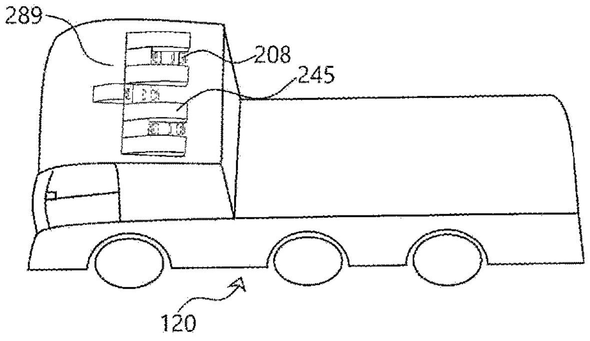

FIG. 120. Shows a top normal zoom out view of a triple vertical axis wind turbine operating on the horizontal plane having a zigzag arrangement, method or setup of the system on the roof or above a transportation vehicle.

Figure 121:
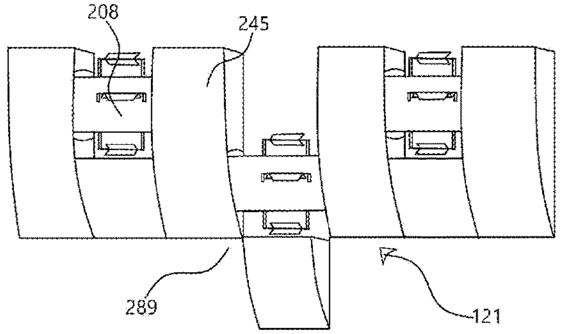

FIG. 121. Shows a top close or zoom in normal view of a triple vertical axis wind turbine operating on the horizontal plane having a zigzag arrangement, method or setup of the system.

Figure 122:
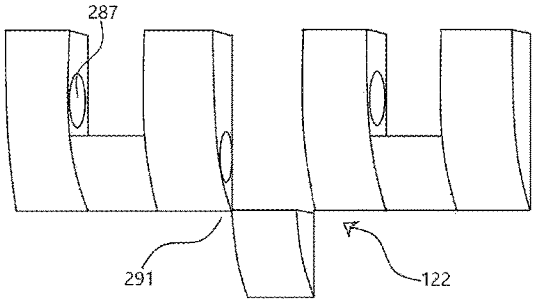

FIG. 122. Shows an empty cell or plain top view of the triple vertical axis wind turbine operating on the horizontal plane having a zigzag arrangement, method or setup of the system.

Figure 123:
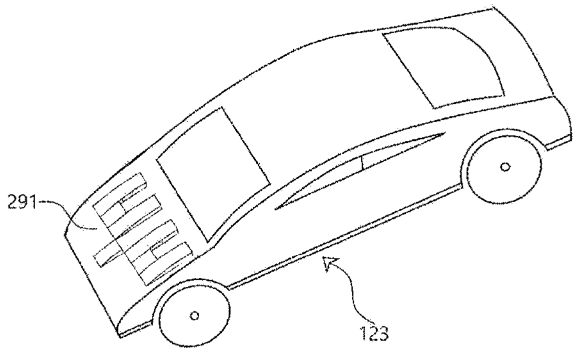

FIG. 123. Shows an empty cell or plain top view of the triple vertical axis wind turbine operating on the horizontal plane having a zigzag arrangement, method or setup of the system on a normal looking transportation vehicle.

Figure 124:
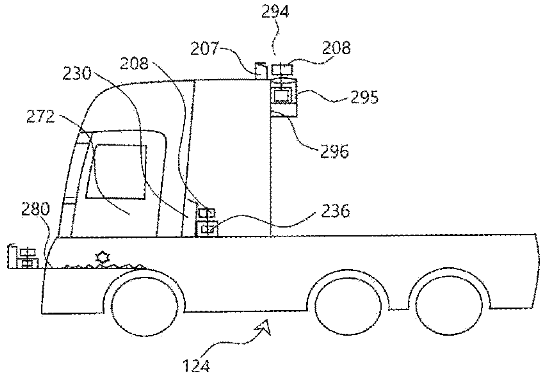

FIG. 124. Shows a normal looking transportation vehicle having a mixture of systems, methods and setups. It has the tray push or slide out front systems, methods or setups. It has the normal side half shield vertical axis wind turbine operating on the vertical plane mounting systems, methods or setups on the side. It has the behind the cabinet or between the cabin and the trailer systems, methods or setups.

Figure 125:
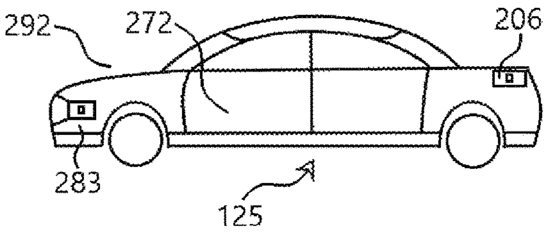

FIG. 125. Shows a transportation vehicle having a mix or combinations of different systems, methods, and setups on it. To show that a single transportation vehicle is able to have a mix of multiple different systems, methods and setups.

Figure 126:
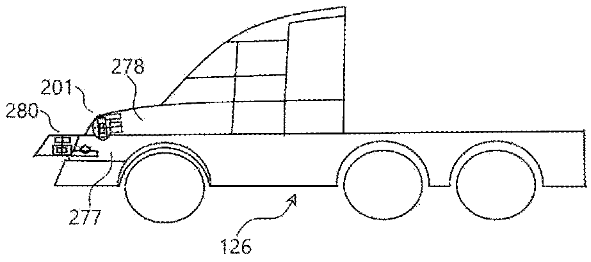

FIG. 126. Shows a transportation vehicle with non extended multi level front having a mix of different systems, methods, and setups. To show that a single transportation vehicle is able to have a mix of multiple different systems, methods and setups on it. It shows the barrel roll system, method and setup on the top level and it shows the tray push or slide out front on the bottom level.

Figure 127:
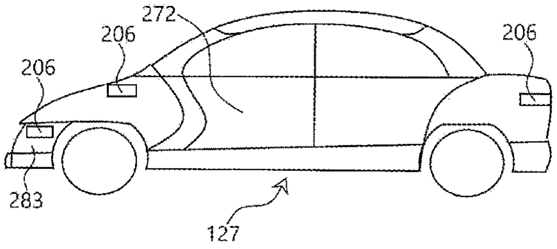

FIG. 127. Shows a transportation vehicle with extended front having a mixture of systems, methods or setups. It shows the extension between the front end and the front tire on the sides opening. It shows the opening or cut out method on a normal side of a transportation vehicle which is usually even on front above the tire and on the rear.

Figure 128:
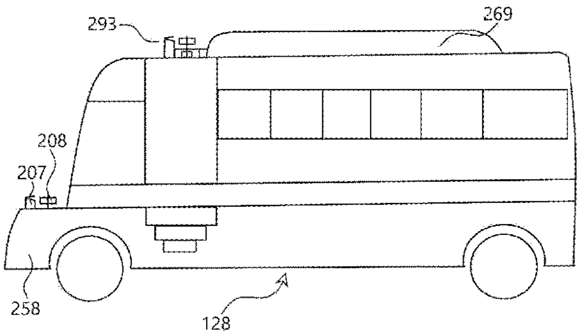

FIG. 128. Shows a transportation vehicle with extended front having a mixture of systems, methods and setups. The transportation vehicle has a vertical axis wind turbine operating on the vertical plane in front and above the roof in front of the large hump on the roof for its compressed natural gas (CNG) fuel tanks.

Figure 129:
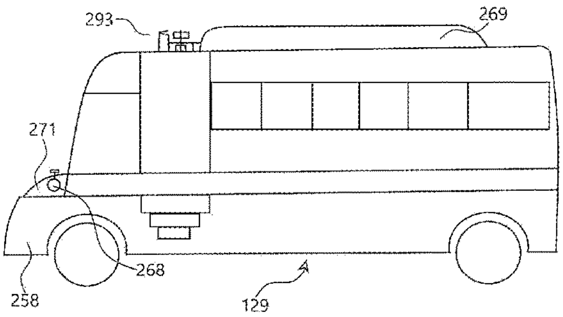

FIG. 129. Shows a transportation vehicle with extended front of FIG. 128 having a mixture of systems, methods and setups. The transportation vehicle has a vertical axis wind turbine operating on the horizontal plane on a fairing in front, and a vertical axis wind turbine operating on the vertical plane above the roof in front of the large hump on the roof for its compressed natural gas (CNG) fuel tanks.

Figure 130:
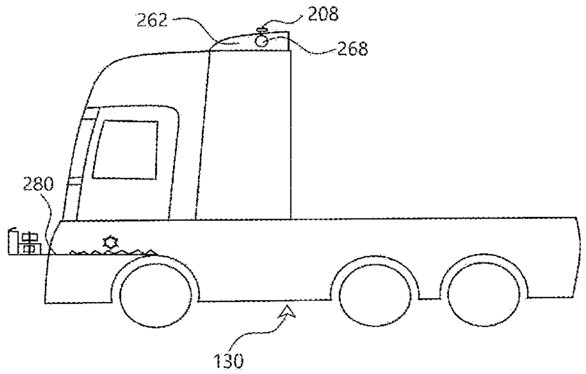

FIG. 130. Shows the transportation vehicle of FIG. 124 having a tray push or slide out front, it also shows it having a roof fairing with a vertical axis wind turbine operating on the horizontal plane.

Figure 131:
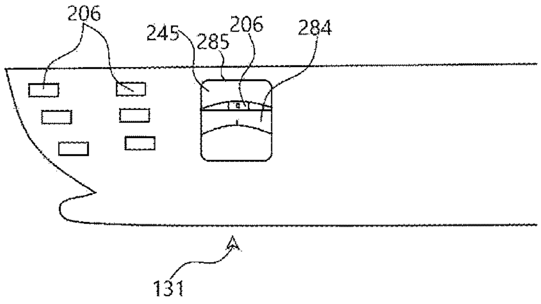

FIG. 131. Shows a normal transportation vehicle (ship) having the opening or the cut out method as well as the u-shape groove or channel system, method or setup on its side.

Figure 132:
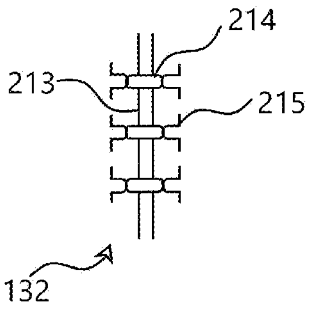

FIG. 132. Shows a vertical center pole or tube with one or more bearings coupled to it, a flat rods, rivets, fasteners or a u-shaped connector brackets are coupled to the bearings also extends outwards and flatten out. A shaft tube or a hollow cylinder which generator or rotor magnets and the blades are coupled to is able to slide over the multiple extended flatrods, rivets, fastener or the u-shaped connector brackets to be coupled to them. The vertical center pole or tube doesn't rotate.

Figure 133:
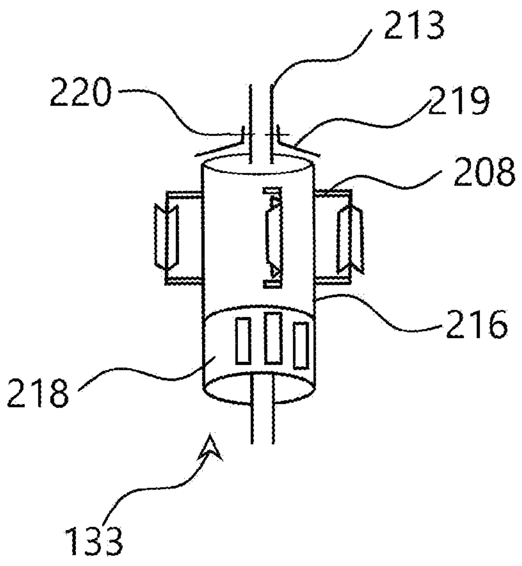

FIG. 133. Shows the tube or a hollow cylinder which generator or rotor magnets and the blades are coupled to, and the vertical center pole or tube in the center, the blade section on the top part, the generator or rotor section with the permanent magnets shown as rectangles at the bottom section. It also shows two L-shape coupled, welded or fastened to the vertical center pole with slight down slope extending outwards from the vertical center pole on the opposite sides which is a representation of a disk.

Figure 134:
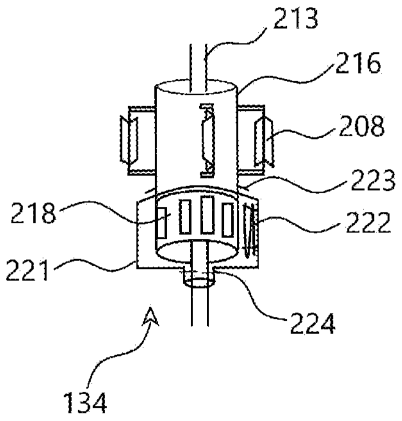

FIG. 134. Shows the tube or a hollow cylinder which a rotor magnets of the generator section and the blades are coupled to, the vertical center pole or tube in the center, the blade section on the top part. It also shows a transparent view of the generator section with the permanent magnets coupled to a rotor shown as rectangles at the bottom section, as well as the stator or casing which is shows as a covering over the rotor section with two pins extending inwards to towards the permanent magnets and a squiggly lines as the coil winding. It also shows two pins coupled to the tube or the hollow cylinder with slight down slope extending outwards from the tube or the hollow cylinder on the opposite sides. The pins are a representation of a disk.

Figure 135:
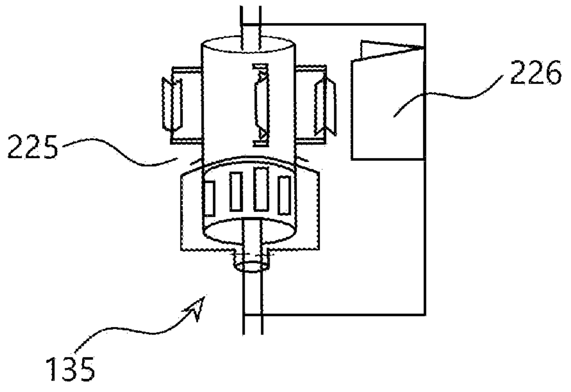

FIG. 135. Shows the vertical axis wind turbine of FIG. 134, with the addition of a shield in front, to shield the blade section of the vertical axis wind turbine from the wind except the blade opening facing the wind. The shield used in the figure is able to be from my previous patent number U.S. 12,297,802 B2.

Figure 136:
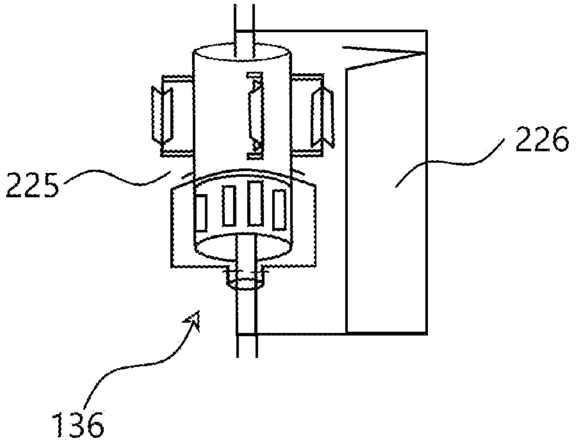

FIG. 136. Shows the vertical axis wind turbine of FIG. 134, with the addition of a shield in front to shield the vertical axis wind turbine from the wind except the blade opening facing the wind. The shield used in the figure is able to be from my previous patent number U.S. Pat. No. 12,297,802 B2.

Figure 137:
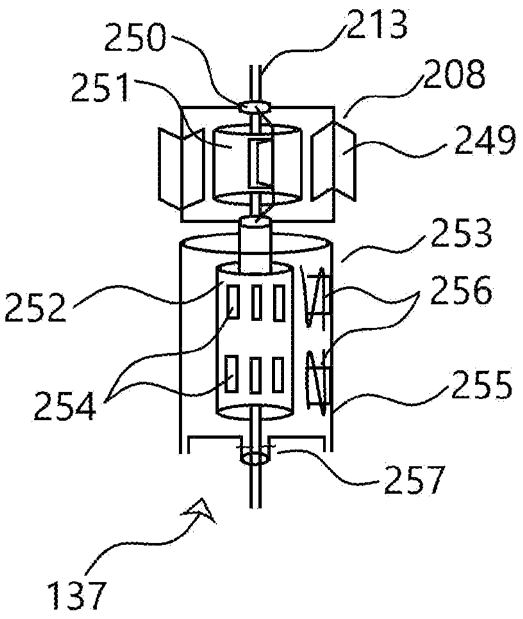

FIG. 137. Shows a vertical axis wind turbine operating on the vertical plane having a double stack permanent magnet on a single rotor to make a double generator. It also has a double coil winding on a single stator or covering.

Figure 138:
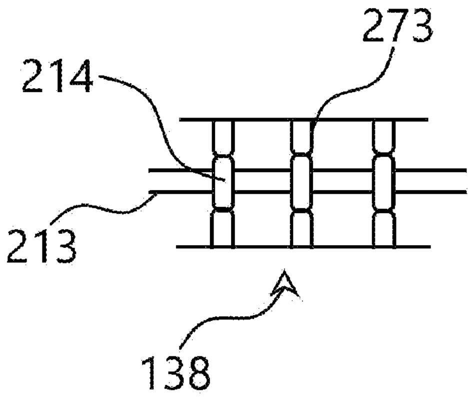

FIG. 138. Shows a horizontal center pole or tube with one or more bearings coupled to it, and the bearings also having extended flatrods, rivets, fasteners or a u-shaped connector brackets extending outwards couple to the bearings. The extended flatrods, rivets, fasteners or the u-shaped connector brackets are able to be interconnected or connected by flat straight brace at the extended or the outer ends. The tube or a hollow cylinder which generator or rotor magnets and the blades are coupled to is able to slide over and coupled to the multiple extended flatrods, rivets, fastener or the u-shaped connector brackets. The horizontal center pole or tube doesn't rotate.

Figure 139:
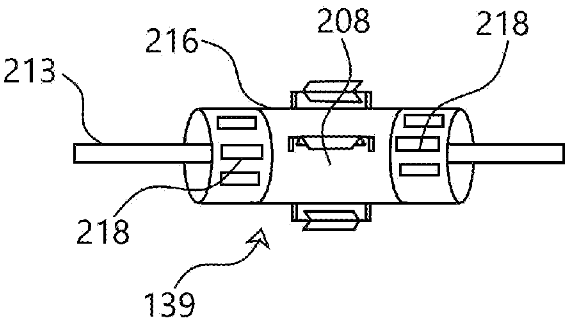

FIG. 139. Shows the tube or a hollow cylinder which generator or rotor magnets and the blades are coupled to, and the horizontal center pole or tube in the center, the blade section in the middle, the generator or rotor section with the permanent magnets shown as rectangles at the both ends.

Figure 140:
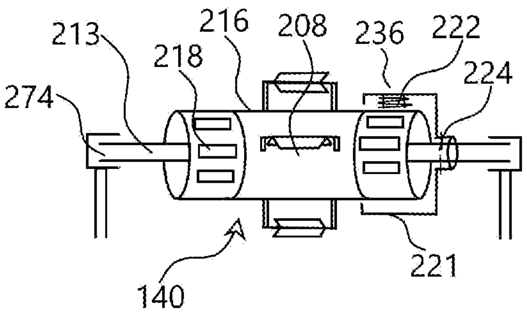

FIG. 140. Shows the tube or a hollow cylinder which generator or rotor magnets and the blades are coupled to, and the horizontal center pole or tube in the center, the blade section in the middle, it also shows a transparent view of the generator or rotor section with the permanent magnets shown as rectangles at the both ends, as well as the stator or casing which shows as a covering over the rotor section on one side with two pins extending inwards to towards the permanent magnets and a squiggly lines as the coil winding. It also shows one of the many possible ways the horizontal center pole is detachable coupled to the fixed or movable base.

DETAILED DESCRIPTION OF THE INVENTION

The various embodiment variations therefore illustrated in the accompanying Figures and/or described herein merely exemplary and are not meant to limit the scope of the invention. It is to be appreciated that numerous variations of the invention have been contemplated as would be obvious to one of ordinary skills in the art with the benefits of this disclosure. Rather, the scope and breadth of afforded this document should only be limited by the claim provided herein while applying either the plain meaning of each the terms and phrases in the claim or the meaning clearly and unambiguously provided in this specification.

Terminology

The terms and phrases as indicated in parenthesis (" ") in this section are intended to have the meaning ascribed to them in this section applied to them throughout this document including the claims unless clearly indicated otherwise in context.

The term "or", "etc" as used in the specifications and the appended claims is not meant to be exclusive, rather the term is inclusive meaning "either or both", or "adds more to the list".

Reference in the specification to "one embodiment", "an embodiment", "a preferred embodiment", "an alternative embodiment", "embodiments", "variations", "figures", and similar phrases mean that a particular feature, structure, and characteristic described in connection with the embodiment(s), variation(s) or figure(s) is included in at least an embodiment, variation or figure of the invention. The appearance of the phrase "in one embodiment", "in one variation" or "in one figure" in various places in the specification are not necessarily all referring to the same embodiment or variation. The term "spin", "rotate around", "connected", "coupled", "welded", "move", "movable", "flip", "slide", "push", "swing", "attached", or "fixed" etc., as used in the specification and the appended claims referred to either an indirect or direct connection between the identified elements, components or objects. Often the manner of the coupling will be related specifically to the manner in which the two coupled elements interact.

The phrases "barrel shaped front", "opening or cut outs", "curve side", "curve in upper", "curve out", "contour curve", "gap", "n-shape bump", "fairing", "u-shape groove", "triple horizontal zigzag arrangement", "triple zigzag arrangement n-shape bump", "single blade", "bearings", "hollow cylinder", "tube", "blade section", "generator section", and "rotor" and similar phrases refer to transportation vehicles and vertical axis wind turbines respectively. The phrases "L-shape blade", "single blade", "bearings", "empty cylinder" and "rotor" and similar phrases refer to turbine and generator respectively wherein the turbine is in an upright standing position. The "upright standing position" is the most common and well known way a typical vertical axis wind turbine operates at, whether on the vertical or horizontal plane. This type of turbine and accordingly the phrases as used herein does not deviate from that commonly held meaning. In contrast, a "a single blade left not shield", "a blade not shield", "a single is left outside the opening or the cutout", "the top blade", "blade section is shield", etc., is one in which the blades open facing the viewer or the wind is the outside or in the path of the wind, while the blades not open facing the viewer or in the path of the wind is the blade section shield.

There are thousands of components associated with the transportation vehicles and vertical axis wind turbine industry that are so commonly as to be transportation vehicles, vertical axis wind turbines and therefore are excluded from the description herein. Items such as transportation vehicle details, blade details, generator detail, coupling details, welded details, bearing details, nuts, bolts, washers and the like. Those individuals with ordinary skills in the art, with the benefit of this disclosure can, from the descriptions and diagrams provided herein easily and obviously understand and determine exactly what is required to manufacture, assemble or buy items not shown.

An Embodiment of a transportation vehicle with little adjustments and changes made to its design to allocates more place and area on it to housed, carry and use energy generating devices, vertical axis wind turbines for it energy needs, to generate energy from it own movements.

An embodiment of a transportation vehicle's, vertical axis wind turbines operating or being used to generate energy on the vertical or horizontal plane are illustrated all or in part in FIGS. 1-140.

Referring primarily in FIG. (1), line 200 shows a vertical axis wind turbine operating on the vertical plane and a shield at a operating position in front of a normal front transportation vehicle, wherein the blade section and the shield is above the surface method, with the shield in front of the blade section of the vertical axis wind turbine. Wherein the center of the shield is misaligned with the center of the vertical axis wind turbine, wherein the shield shields the blade section of the vertical axis wind turbine from the wind except the blade opening facing the wind. The vertical axis wind turbine and the shield are coupled together to form a rectangle base shape to make it a connected system. The system is able to couple to some device, apparatus or motor that moves, flip or roll it into an operating position and moves, flip or roll it back into a housing position where it seamlessly blends into the design, the surface or below the surface of the transportation vehicle as if the system was never there. The system is able to be moved, flipped or rolled from its side or front. The system formed a rectangular shaped base. Though the figure shows one system set up, the vehicle is able to house or have one or more setups. The setups are able to be individual or interconnected, moved, flipped, rolled.

Referring primarily in FIG. (2), line 201 shows a vertical axis wind turbine operating on the vertical plane and a shield at a housing position in front of a transportation vehicle coupled to a circular or barrel shaped base to seamlessly blend with the vehicle front design. The system is able couple to some device, apparatus or motor that move, flip or roll it into a operating position and move, flip or roll it back to a housing position where it seamlessly blend into or with the design, the surface or below the surface of the transportation vehicle as if the system was never there. The system is able to be moved, flipped or rolled in a front to back motion. The barrel does not move ones at an operating or housing position; it is locked into place until opposite action is required. The barrel and the housing mechanism serves multiple purposes, to serve as a braking system, aerodynamic efficiency, to house the system from the elements etc. The system formed a circular or barrel shaped base. Though the figure shows one system setup, the vehicle is able to house or have one or more setups. The setups are able to be individual or interconnected, moved, flipped, rolled.

Referring primarily in FIG. (3), line 208 shows a top view of a blade section of a vertical axis wind turbine operating or being used to generate energy on the vertical plane having a center cylinder, with spokes sticking out and connecting to L-shapes, which are the blades of the vertical axis wind turbine. In front of the vertical axis wind turbine, line 207 shows a shield which is approximately symmetry, whose center is slightly misaligned with the center of the vertical axis wind turbine horizontal, shielding all of the vertical axis wind turbine front from the wind except a single blade opening facing the wind. Line 301 shows the single blade that is left unshield, is on the part of the wind and line 300 shows the path of the wind as it travels against the shield and the vertical axis wind turbine.

Referring primarily in FIG. (4), a separate view of the movable or rotatable portion or base shape with line 207 the shield being in front of the vertical axis wind turbine operating on the vertical plane, line 208 being the blade section of the vertical axis wind turbine and line 236 being the generator section of the vertical axis wind turbine connected to Line 205 the rectangular movable or rotatable portion or base shape on the bottom, and line 302 being the pivot point of movable or rotatable portion or base shape. Wherein the shield length may be less than the length of the movable or rotatable portion or base shape on the front side, when the movable or rotatable portion or base shape is being housed the same level as the vehicle surface level, such that the movable or rotatable portion or base shape is the same level as the vehicle surface level and the shield is slightly below the vehicle surface level.

Referring primarily in FIG. (5), a separate view of the movable or rotatable portion or base shape with line 207 the shield being in front of the vertical axis wind turbine operating on the vertical plane, line 208 being the blade section of the vertical axis wind turbine and line 236 being the generator section of the vertical axis wind turbine connected to Line 205 the rectangular movable or rotatable portion or base shape on the bottom, and line 303 being a gear of the pivot point of movable or rotatable portion or base shape, which is also connected to Line 211 a motor also having a gear. So when the motor rotates, it rotates the movable or rotatable portion or base shape with the shield and the vertical axis wind turbine as one unit to and from operating position to housing position.

Referring primarily in FIG. (6), a close in view of line 211 a motor also having a gear. Many different types of electric motors can be used to move or rotate the movable or rotatable portion or base shape with the shield and the vertical axis wind turbine as one unit to and from operating position to housing position. Though limited rotation motors and low speed high torque electric motors are more efficient. Modify or customize motors also can be used.

Referring primarily in FIG. (7), a separate view of the moving mechanism of the movable or rotatable portion or base shape at the operating position, when Line 211 the motor also having a gear receive electricity, which is initiated by operator or driver input, the motor which is also connected or locked on to line 303 the gear of the pivot point, the motor rotate together with the pivot point, which in turn also rotate line 205 the movable or rotatable portion or base shape with the shield and the vertical axis wind turbine attached to the movable or rotatable portion as one unit, until the system reaches the operating position. Line 304 is both supporting rod and first locking rod which is also connected or attached to the motor and rotates simultaneously with the motor downward to both support and lock the system. Line 305 is a second locking rod which automatically falls into place to keep the first locking rod from sliding. Line 333 is the cover of the openable and closable opening or cutout with teeth rod attached to the cover and the teeth rod connected to Line 211 another motor that slides the cover to the close and open position. Line 306 is the housing cavity which houses all the different parts of the system when the system is in the housing position. Line 307 is a body section or part of a vehicle. The locking mechanism keeps the movable or rotatable portion or base shape in place while the system is being used or at the operating position. The motor is not attached to the movable or rotatable portion or base shape, the motor is attached to a different frame of the vehicle. The motor is on the outside or between the interconnected movable or rotatable portion or base shape. When the motor receives input from the operator or the driver the motor rotates the system until the system reaches the operating position, and when the motor receives input from the operator or the driver again, the motor rotates the system until the system reaches the housing position. The motors of the two separate systems can be controlled by different buttons where the operator or driver push one button to open the cover of the opening and another button to deploy the system or a single button, where the operator push the single button which send signal to a custom programed computer control box which delays the movement of the system motor when the system is being deployed and also delay the movement of the cover motor when the system is being retracted. The drawings of the system are disproportionate to show the details of different parts and small components.

Referring primarily in FIG. (8), a close in detail view of the customized or modified line 211 motor used in FIG. 7, setup including the motor gear and line 304 the supporting rod and the first locking rod. The supporting rod and the first locking rod is directly connected to the motor and rotates with the motor. FIG. 7, use one step and one motor setup, and the motor is customized or modified for that purpose. A multiple step and multiple motor setup can also be used, where one motor moves or rotates the system to operating position while another motor slides a supporting and locking block under the system. The system is able with different moving mechanisms.

Referring primarily in FIG. (9), the detailed view of the setup of FIG. 7, at the housing position, when Line 211 the motor also having a gear receive electricity again, which is initiated by operator or driver input, the motor which is also connected or locked on to line 303 the gear of the pivot point, the motor rotate together with the pivot point, which in turn also rotate line 205 the movable or rotatable portion or base shape with the shield and the vertical axis wind turbine attached to the movable or rotatable portion as one unit, until the system reaches the housing position. Line 304 is both supporting rod and first locking rod which is also connected or attached to the motor and rotates simultaneously with the motor upward to lift, line 305 the second locking rod which allows the system to close or be moved to the housing position. The torque the motor exerted on the first locking rod will force the first locking rod to lift the second locking rod to an upright position, while the first locking rod stays at an horizontal position. Line 306 is the housing cavity which houses all the different parts of the system while the system is in the housing position. Line 307 is the body section or part of a vehicle. Line 333 is the cover of the openable and closable opening or cutout connected to Line 211 another motor at the close position. Most drawings of the moving mechanisms systems throughout the document are disproportionate to show the details of different parts and small components. Line 225 is the vertical axis wind turbine.

Referring primarily in FIG. (10), a multiple interconnected detailed view of the setup of FIG. 7, at the operating position, where line 308 the pivot rod of the pivot point has another line 309 a secondary pivot gear connected to line 310 a free gear which is supported by line 311 a fix supporting structure between the systems and close to the second system. The free gear also has another locking/supporting rod attached to the free gear in this setup. When line 211 the motor rotates, it rotates the pivot rod with the secondary pivot gear via line 303 the pivot gear which in turn rotates the free gear with the locking/supporting rod to the locking position for extra support. The second system setup may or may not have line 305 the second locking rod. Each system can have the free gear setup or some have the setup and others don't.

Referring primarily in FIG. (11), a multiple interconnected detailed view of the setup of FIG. 7, at the operating position with extra locking mechanism, when line 211 the motor rotates line 303 the pivot gear and line 309 the secondary pivot gears, which in turn rotates line 310 the free gear and line 312 a sliding rod with teeth, which in turn rotates line 313 another free gear with small locking rod for extra stability. In this system setup, both the motor and the free gear position can have a motor or either side can have the motor. Line 335 is a box which is connected to the sliding rod with teeths via line 332 a connecting pole or rod. So that when the sliding with teeths slides, it slides boxes underneath the movable or rotatable portion or base shape to lock it in place as the system is being used.

Referring primarily in FIG. (12), line 202 shows a vertical axis wind turbine operating on the vertical plane and a shield at a housing position in front of another transportation vehicle coupled to a circular or barrel shape base to seamlessly blend with the front design or shape. The system is able to couple to some device, apparatus or motor that moves, flip or roll it into the operating position and move, flip or roll it back to the housing position where it seamlessly blends into the design, the surface or below the surface of the transportation vehicle as if the system was never there. The system is able to be moved, flipped or rolled in a front to back motion. The system formed a circular or barrel shaped base. Though the figure shows one system setup, a transportation vehicle is able to house or have one or more setups. The setup is able to be individual or interconnected, moved, flipped, rolled.

Referring primarily in FIG. (13), line 203 shows a vertical axis wind turbine operating on the vertical plane and a shield at an operating position in front of the transportation vehicle of FIG. 12, coupled to the circular or barrel shaped in front, wherein only the blade section and the shield is above the surface. The system has the same principles, properties, functions, methods, ways and workings as FIGS. 1, 2 and 12.

Referring primarily in FIG. (14), line 204 shows a vertical axis wind turbine operating on the vertical plane and a shield at a housing position in front of a another normal front transportation vehicle, the system is able to couple to some device, apparatus or motor that move, flip or roll it into a operating position and move, flip or roll it back to the housing position where it seamlessly blend into the design, the surface or below the surface of the transportation vehicle as if the system was never there. The system is able to move, flip or roll in a front to back motion. The system formed an undefined base shape to show that the system is able to work other shapes and configurations, also to show that the system comes in many different shapes and configurations. The shield is able to be made out of the base shape itself or be coupled to the base shape. Though the figure shows one system setup, a transportation vehicle is able to house or have one or more setups. The setups are able to be individual or interconnected, moved, flipped, rolled.

Referring primarily in FIG. (15), line 205 shows a plain top view of the transportation vehicle with a circular or barrel shaped based front at a housing position, and line 206 shows a rectangle that is a opening or cut out on the surface, which is also openable and closeable to allow the circular or barrel shaped base to move, roll or flip with the turbines and the shields as the barrel rolls from housing position to operating position and vice-versa. The figure also shows that the circular or the barrel shaped base does not have to show on the side though it is able to. It also shows how the shape, the barrel seamlessly blend with the transportation vehicle design, body or the surface at the housing position.

Referring primarily in FIG. (16), line 205 shows a top view of the circular or barrel shapes based front transportation vehicle, line 208 shows a vertical axis wind turbine operating on the vertical plane blade section and line 207 shows a shield in front of the blade section at a operating position, It also shows that only the blade section and the shield is above the surface when the system is operating, and line 206 shows a rectangle that is opening or cut out on the surface, that is also openable and closeable to allow the circular or barrel shaped base to move, roll or flip with the turbines and the shields in a back and forward motion to and from a operating or housing position and vice-versa. The barrel does not move ones at an operating or housing position; it is locked into place until the opposite action is required. The housing mechanism serves multiple purposes, to serve as a braking system, aerodynamic efficiency, to house the system from the elements etc. Though the figure shows one system setup, a single transportation vehicle is able to house or have one or more system setups. The setups are able to be individual (as shown in this figure) or interconnected moved, flipped, rolled.

Referring primarily in FIG. (17), line 210 shows a vertical axis wind turbine of FIG. 140 operating on the vertical plane at a operating position on the of a normal side transportation vehicle, wherein most of the vertical axis wind turbine is below the surface of the transportation vehicle except a single blade of the blade section is left outside the side through line 206 a opening or cut out on the side that is openable and closeable to allow the blades to spin in and out of the opening or the cut out as the wind pushes against the blades to spin the vertical axis wind turbine. This is possible because the blade section is wider in diameter than the generator sections or casing on both sides of the vertical axis wind turbine. The whole system is able to be a stand alone (wherein only the vertical axis wind turbine moves) or contain in some shape that blends into the transportation vehicle surface or sides, line 209 shows a rectangular shape base or container In this particular instance. The system or the rectangular shape is couple to some device, apparatus or motor that move, flip, roll or push it out into this operating position and move, flip, roll or pull it in back to the housing position where it seamlessly blend into the design, the surface, below the surface or the side of the vehicle as if the vertical axis wind turbine was never there. The system is able to be moved, flipped, rolled, pushed or pulled from its sides or under or above. The system formed a rectangular shaped base. Though the figure shows two systems setup on a single shape, the system is able to house or have one or more setups. The setups are able to be individually or interconnected moved, flipped, rolled, pushed or pulled. In the stand alone instance the vertical axis wind turbine is directly couple to some device, apparatus or motor that move, pushes it out so that a single blade is left outside the side through a openable and closable opening or cut out to allow the blades to spin in and out of the opening or the cut out on the surface or side of the transportation vehicle as the wind pushes against the blades to spin the vertical axis wind turbine, while leaving the transportation vehicle surface or the side smooth, even and unchanged, even when the vertical axis wind turbine is operating and pull the vertical axis wind turbine back inside when not operating. Once at the operating or the housing position the system is locked into place so it won't move while operating. All this is possible because the blade section is wider in diameter than the generator sections or casing on both sides of the vertical axis wind turbine.

Referring primarily in FIG. (18), a zoom in view of the movable or rotatable portion, base shape or container of FIG. 17, line 209 is the base shape or container that houses line 210 a vertical axis wind turbine operating on the vertical plain. Line 206 is the opening or cutout which lets line 208 the blade section of the vertical axis wind turbine spin through the opening. Line 211 is the motor that rotates the base shape or container using line 303 the pivot gear of the base shape or container to and from the operating position to the housing position. The motor will be controlled using the same controlling system as the previous moving mechanisms.

Referring primarily in FIG. (19), a top view of FIG. 18, where line 209 is the movable or rotatable base shape or container that houses a vertical axis wind turbine operating on the vertical plain. Line 303 is the pivot gear of the base shape or container and line 211 is the motor that rotates the base shape or container to and from the operating position to the housing position. The motor can be on any side of the pivot gear since it is above the base shape or container and not directly attached to the base shape or container. The motor can also be on the bottom side of the base shape or container.

Referring primarily in FIG. (20), a detailed top view of FIG. 18, at the operating position, where line 209 is the movable or rotatable base shape or container that houses the vertical axis wind turbine operating on the vertical plane. Line 206 is the opening or cutout that lets line 208 the blade section of the vertical axis wind turbine to spin through the opening. The vertical axis wind turbine operating on the vertical plane is not in the center of the base shape or container, so a single bade is left outside of the base shape or container to spin the vertical axis wind turbine operating on the vertical plane as the wind pushes against the blades. Line 303 is the pivot gear of the base shape or container which line 211 the motor locked on to and rotates the base shape or container with the vertical axis wind turbine to and from the operating position to the housing position. Line 315 a gap between the base shape or container and line 307 the vehicle body section or part. The gap allows the base shape or container with the vertical axis wind turbine to rotate to and from the operating position to the housing position. In this system setup, the single blade stays outside the base shape or container even at the housing position. Though the gap showed, the gap is inside because both the gap and the base shape or container are covered on the top part.

Referring primarily in FIG. (21), a detailed top view of FIG. 18, at the operating position, when line 211 the motor receives input from the operator or driver, it rotates and slides line 333 is the cover of the openable and closable opening or cutout to the open position. Then line 314 a modified or customized motor with a locking rod also receives input from the operator or driver and rotates sliding line 312 a sliding rod with teeth, which is directly connected or attached to the top of line 208 a blade section or portion of the vertical axis wind turbine operating on the vertical plane to an operating position where a single blade is outside line 206 the opening or the cutout and the vertical axis wind turbine is deployed and being used. The vertical axis wind turbine and locking rod both reach their respective position at the same time. The vertical axis wind turbine can have the sliding rod with teeth and the modified motor on both top and bottom side or one side, with the sliding rod aligned with the center of the vertical axis wind turbine. The sliding rod can also be on the side of the vertical axis wind turbine and connect to the vertical axis wind turbine via an extra rod perpendicular to the sliding rod. The motor always has to be on the teeth side of the sliding rod. Line 307 the vehicle body section or part. Upon retraction the vertical axis wind turbine system retracts first, the cover also slides shut. All the moving mechanisms shown throughout the document motors will be controlled using the same or very similar controlling systems and methods as previously stated moving mechanisms.

Referring primarily in FIG. (22), line 208 shows a vertical axis wind turbine operating on the vertical plane blade section and line 207 a shield in front of it at a operating position on top of a normal transportation vehicle roof, wherein only the blade section and the shield is above the surface, the system is able to couple to some device, apparatus or motor that move, lift or push it up and out to a operating position and move, lower or pull it back into the housing position where it seamlessly blend into the design, the surface or below the surface of the transportation vehicle as if the system was never there. The system is able to be pushed up and out from under. The system is able to be deployed or moved for operation and housing in many ways. The system is able to be lifted from the side. Line 211 shows a motor or device on the side that will lift the vertical axis wind turbine to operation position height. Line 212 shows a block that is able to slide under the system when the system reaches the operating position height to support and keep the system stable while operating. The system formed a rectangular or multiple rectangular shaped base. Though the figure shows one system setup, a transportation vehicle is able to house or have one or more setups. The setups are able to be individual or interconnected move, push or lift. FIGS. 1-22 shares the same functions, they all use the base shape methods where the blade section or the blade section with the shield in front of it is above the surface when operating.

Referring primarily in FIG. (23), line 227 shows a main line outlining a transportation vehicle front design or shape. The main front line shows the length, design, shape and the outline of the transportation vehicle. Line 228 shows a second contour curve down line which shows that the parts under the second line are the same width as the rest of the transportation vehicle. While the areas between the main line and the second contour, curve down line shows that part of the transportation vehicle is less in width than the area under second contour curve down line and rest of the transportation vehicle. The top and the bottom part of the transportation vehicle front have different widths, the bottom part is wider than the top part. The width difference between the areas under main line that outline the transportation vehicle and the areas under the second contour curve down line is so that the generator sector of the vertical axis wind turbine is able to be inside and below the surface of the transportation vehicle at the bottom part which is wider. While a single blade of the blade section is let or left out of the opening or cut out on the top part which is narrow without the transportation vehicle having any extra bumps, allowing it's surface to remain smooth and even. The difference in width also allows the generator section to have larger or equal diameter as the blade section which increases efficiency. The contour curve down of the second line is so that the transportation vehicle is able to have one or more vertical axis wind turbines or openings or cut outs on its sides or surface without the vertical axis wind turbines interfering with each other. The contour curve smoothly fuse to the rest of the transportation vehicle at where it ends or connects. Line 206 shows two rectangular shapes at different heights between the main line and the second line which are openings or cut outs on the surface or the side of the transportational vehicle. The rectangular shapes are openable and closable opening or cut out on a side or a surface of the transportation vehicle to allow a single blade of the blade section to be outside the opening or the cut out and to spin in and out of the opening or the cut out as the wind pushes against the blades to spin the vertical axis wind turbine. Though the figure shows only the front side, the back side is also able to have this setup. The vertical axis wind turbine is able to connected or couple to a fixed or movable base, a apparatus, device or a motor which is capable of moving, pushing or swing the vertical axis wind turbine to it sides so a single blade is outside the opening or the cut out for operation and move, pull it or swing it back inside for housing. Once at the operating or the housing position the system is locked into place so it won't move while operating. The housing mechanism is so that the vertical axis wind turbine is protected from the elements and saves energy when not being used.

Referring primarily in FIG. (24), a top view of FIG. 23, where line 208 shows a top view of a blade section of a vertical axis wind turbine operating on the vertical plane having a center cylinder, with spokes sticking out and connecting to L-shapes, which are the blades of the vertical axis wind turbine. In front of the vertical axis wind turbine, line 307 the vehicle body section or part both covers and shields all of the vertical axis wind turbine front from the wind except line 301 a single blade opening facing the wind is left uncovered and unshielded and is on the part of the wind to spin the vertical axis wind turbine through line 206 the opening or the cutout on the side of the vehicle body as the wind pushes against the blades.

Referring primarily in FIG. (25), a detailed sides view of FIG. 24, where line 316 is the top horizontal surface of the vehicle body section or part or the narrow area of the contour section and line 317 is a side wall or a vertical surface of the vehicle body section or part and line 318 is a horizontal surface of the wide area of the contour part of the vehicle body section. While line 206 the opening or the cutout on the side of the vehicle body, with line 208 the blade section of a vertical axis wind turbine inside the opening.

Referring primarily in FIG. (26), a detailed top view of both FIGS. 24 and 25 moving mechanism at the operating position, where line 314 a modified or customized motor with a locking rod receives input from the operator or driver and rotates sliding line 312 a sliding rod with teeth, which is perpendicularly connected or attached to line 320 a connecting rod which is also connected the top, bottom or both sides of a vertical axis wind turbine operating on vertical plane and then continues on to line 302 the pivot point, all to move the vertical axis wind turbine to an operating position where line 301 a single blade of line 208 the blade section of the vertical axis wind turbine is outside the vehicle body through line 206 the opening or cutout on the side of the vehicle body section or part. Line 316 is the top horizontal surface of the vehicle body section or part, while line 318 is the horizontal surface of the wide area of the contour part of the vehicle body section. The sliding rod with teeth can also be directly below or above the vertical axis wind turbine like in FIG. 21. The connecting rod has a ring at pivoting end to adjust for the slight change in length as the system moves to and from operating position to the housing position. There is a little gap between the ring and the pivot point rod.

Referring primarily in FIG. (27), a detailed top view of both FIGS. 24 and 25 with a different moving mechanism at the operating position, where line 314 a modified or customized motor with a locking rod receives input from the operator or driver and rotates sliding line 312 a sliding rod with teeth, which is perpendicularly connected or attached to line 321 a short connecting rod which is also connected line 322 a second connecting rod parallel to the sliding rod, the second connecting rod is connected or attached to the top, bottom or both sides of a vertical axis wind turbine operating on vertical plane, to move the vertical axis wind turbine to an operating position where line 301 a single blade of line 208 the blade section of the vertical axis wind turbine is outside the vehicle body through line 206 the opening or cutout on the side of the vehicle body section or part. Line 316 is the top horizontal surface of the vehicle body section or part, while line 318 is the horizontal surface of the wide area of the contour part of the vehicle body section. The sliding rod with teeth can also be directly below, above or on both ends of the vertical axis wind turbine like in FIG. 21, eliminating the need for both the short connecting rod and the second connecting rod. In this moving configuration the system moves in a straight line.

Referring primarily in FIG. (28), line 227 shows a normal transportation vehicle front as the main line outlining the transportation vehicle, the main line of the transportation vehicle is to show the vehicle length and outline. Line 228 shows a different second contour curve down line showing the parts under the second line have the same width as the rest of the transportation vehicle. The areas between main line and the second line shows that, that part of the transportation vehicle is less in width than the area under second contour curve down line part and rest of the transportation vehicle. Although this drawing or figure appears to not emphasize or show that the top and the bottom part of the transportation vehicle have different widths, the bottom part is wider than the top part and the second line is where the width difference occurs. This difference in width is so that the generator sector of the vertical axis wind turbine is inside and below the surface of the transportation vehicle at the bottom part which is wider while the blade section and a single blade is let or left out of the opening or cut out on the top part, which is narrow without the transportation vehicle having any extra bumps, allowing the surface to remain smooth and even. This figure shows a different second contour, curve down line to show that the contour curve down line design is able to differ, it does not have to be specific. Line 206 shows the two rectangular shapes on the side above the second line at different heights, which are openings or cut outs on the surface or the side. The rectangular shapes are openable and closable as opening or cut out on a side or a surface of the transportation vehicle. The rest of the figure has the same principles, properties, functions, methods, ways and workings as FIG. 23-27.

Referring primarily in FIG. (29), line 227 shows a normal transportation vehicle front as the main line outlining the transportation vehicle, the main line of the transportation vehicle is to show the vehicle length and outline. Line 228 shows a different second contour curve down line that shows the parts under the second line are the same width as the rest of the transportation vehicle. While the areas between the main line and the second line shows that the part of the transportation vehicle is less in width than the areas under second contour curve down line part and rest of the transportation vehicle. This figure shows a different contour curve down line to show that the contour curve down line is able to have many different designs, shapes, forms and configurations, it does not have to be specific. Line 206 shows the two rectangular shapes on the transportation vehicle side at different heights, which are openings or cut outs on the surface or the side. The rest of this figure has the same properties, functions, methods, ways and workings as that of FIGS. 23-28.

Referring primarily in FIG. (30), line 227 shows a top view of another normal transportation vehicle front as the main line outlining the transportation vehicle similar to that of FIG. 28, with line 229 showing a second line as a contoured curve in upper front, which is contoured and curve in, on the upper part and is less in width than the rest of the transportation vehicle as shown in the figure. The second line is the point of separation or differences in width. The curve is both curved in and angled as it gradually decreases or increases in width. Line 206 shows two rectangular shapes on the side at different angles, which are openings or cut outs on the surface or the side. The rectangular shapes are openable and closable as opening or cut out on a side or a surface of the contoured curve in upper part of the transportation vehicle to allow a single blade to be outside the opening or the cut out and to spin in and out of the opening or the cut out as the wind pushes against the blades to spin the vertical axis wind turbine. Though the figure shows only the front side, the back side and other areas are able to have it depending on the transportation vehicle types. The vertical axis wind turbine is able to connected or couple to a fixed or movable base, a apparatus, device or a motor which is capable of moving, pushing or swing the vertical axis wind turbine to it sides so a single blade is outside the opening or the cut out for operation and move, pull it or swing it back in for housing. Once at the operating or the housing position the system is locked into place so it won't move while operating. In the case where the vertical axis wind turbine is fixed, the blade section diameter must intentionally or purposely be equal or larger than the diameter of the housing casing of the generator section. The rest of this figure has the same principles, properties, functions, methods, ways and workings as that of FIGS. 23-28. This figure is also a better understanding and representation of the width difference of FIGS. 23, 28 and 29 as the contoured curve down sides except those figures are curved down on the sides.

Referring primarily in FIG. (31), line 227 shows a top view of another normal transportation vehicle front as the main line outlining the transportation vehicle similar to that of FIG. 28, with line 229 showing a second line as a straight contoured curve in upper front. Showing that the straight contour curve in upper is less in width than the rest of the transportation vehicle. The curve is both straight in and angled as it gradually decreases or increases in width. Line 206 shows two rectangular shapes at different angles, which are openings or cut outs on the surface or the side. The rest of this figure has the same principles, properties, functions, methods, ways and workings as that of FIGS. 23-28. This figure is also another better understanding and representation of the width difference of FIGS. 23, 28 and 29 as the contoured curve down sides except those are curved down on the sides.

Referring primarily in FIG. (32), line 227 shows a top view of another normal transportation vehicle front as the main line outlining the transportation vehicles similar to that of FIG. 30, with line 229 showing a second line as a sallow contour curve in upper front. The sallow contour curve in upper is less in width than the rest of the transportation vehicle. Line 206 shows a rectangular shape on the side or surface of the sallow curve which is an opening or cut outs. The rest of this figure has the same principles, properties, functions, methods, ways and workings as that of FIGS. 23-28. This figure is also another better understanding and representation of the width difference of FIGS. 23, 28 and 29 as the contoured curve down sides except those are curved down on the sides.

Referring primarily in FIG. (33), line 239 shows a side view of a transportation vehicle which has the same side view as FIGS. 30, 31 and 32 to shows that they all look the same when viewing from the side with the only difference being that here the width difference is straight to where it end, it does not curve in and it only feature one opening or cut out. Line 240 shows a second line in the front under, line 227 the main line outlining the transportation vehicle to show that the area between the two lines is less in width than the rest of the vehicle. Line 206 rectangle which is an opening or a cut out to allow a single blade to spin in and out the opening or the cut out as the wind pushes against the blades to spin the vertical axis wind turbine. The rest of this figure has the same principles, properties, functions, methods, ways and workings as that of FIGS. 23-32.

Referring primarily in FIG. (34), line 233 shows a side view contour curve out (a bump on the side) side of a normal side transportation vehicle. Where the curve out or bump represents an increase in the width of the transportation vehicle and shows that area is wider than the rest of the transportation vehicle. Line 208 shows a rectangle with a vertical line in the center of the rectangle as the vertical axis wind turbine blade section. Line 206 shows a big rectangle which is a opening or a cut out on the side or the surface of the transportation vehicle to allow a single blade to spin in and out the opening or the cut out as the wind pushes against the blades to spin the vertical axis wind turbine. The bump is so that the vertical axis wind turbine can have a larger generator or rotor section diameter without increasing the blade section diameter. This method allows the generator or the rotor section of the vertical axis wind turbine to be equal or larger in diameter than the blade section. This is to show that the curve out bump is able to the opening or a cut out method also. The rest of this figure has the same principles, properties, functions, methods, ways and workings as that of FIGS. 23-32.

Referring primarily in FIG. (35), line 206 shows an opening or a cut out on the side of a vehicle. It shows line 234 as a second line under line 227 the main front line outlining the transportation vehicle to show that the area between the two lines is narrower than the rest of the transportation vehicle. This method wherein the transportation vehicle has a narrow upper section and wider bottom section allows the generator section of the vertical axis wind turbine to be equal or larger in diameter than the blade section. Line 206 shows a rectangle as an opening or the cut out that lets or allow a single blade to spin in and out the opening or the cut out as the wind pushes against the blades to spin the vertical axis wind turbine. The rest of this figure has the same principles, properties, functions, methods, ways and workings as that of FIGS. 23-32.

Referring primarily in FIG. (36), line 206 shows an opening or a cut out on the side of a vehicle without the shield. Line 227 shows the main outline of the transportation vehicle. Line 237 shows another second line under the main front line outlining the vehicle to show that the area between the two lines both is narrow width and shorter in length than the rest of the transportation vehicle. Line 206 shows a rectangle as the opening or the cut out on the side. The rest of this figure has the same properties, functions, methods, ways and workings as that of FIGS. 23-35.

Referring primarily in FIG. (37), line 206 shows an opening or a cut out side view version of another transportation vehicle. Line 227 shows the main line outlining the transportation vehicle except here it is in the back. Line 237 shows another line under the main back line outlining the vehicle to show that that part is narrow in width and shorter in length than the rest of the transportation vehicle. Line 206 shows a rectangle as the opening or the cut out on the side. This figure shows that the system is able to work and function on the back section and other areas of a transportation vehicle. The rest of this figure has the same properties, functions, methods, ways and workings as that of FIGS. 23-35.

Referring primarily in FIG. (38), line 206 shows an opening or a cut out on the side of another transportation vehicle on the front section. Line 227 shows the main outline of the transportation vehicle. Line 241 shows another line under the main front line outlining the vehicle to show that that part is narrower in width than the rest of the transportation vehicle, except here the second line does not run the entire length of the front. It stops short to show that not all the front is narrower than the rest of the vehicle. Only a small section of the front that is narrower than the rest of the vehicle. This also shows that narrowing of the upper part of the front is able to have many different designs, and shapes. Line 208 shows a rectangle with a vertical line in the center of the rectangle as the vertical axis wind turbine blade section inside a big rectangle which is the opening or the cut out. This figure shows that the width difference does not have to affect the entire front or rear section of a transportation vehicle. Line 242 also shows a line on the top and bottom section extending from the narrow section to a small circle, to show some of the opening and closing functions of the system. The system is able to couple to some form apparatus, device or motor from any direction to move, open or close the covering of the opening or the cut out like a car window or by using other known opening and closing methods. The rest of this figure has the same principles, properties, functions, methods, ways and workings as that of FIGS. 23-35.

Referring primarily in FIG. (39), line 227 shows a top view of another normal transportation vehicle front as the main line outlining the transportation vehicle similar to that of FIG. 32 with a sallow contour curve in upper front. Showing that the sallow contour curve in upper part is less in width than the rest of the transportation vehicle. The sallow curve is angled as it gradually decreases or increases in width. Line 230 shows a half shield which makes a acute angle with the transportation vehicle sides or surface in front of the vertical axis wind turbine blade section or where openings or cut outs on the surface or the side is in a way that a single blade is left not covered or shield by the shield to spins the generator as the wind pushes against the blades. This system also requires a openable and closable as opening or cut out on a side or a surface of the sallow contoured curve in upper part transportation vehicle as well as the half shield to allow a single blade to be outside the opening or the cut out and to spin in and out of the opening or the cut out as the wind pushes against the blades to spin the vertical axis wind turbine. The shield is to direct more wind into the blade facing the wind as well as be able to close the opening or the cut out when not operating. Though the figure shows only the front side, the back side is also able to have this setup. The vertical axis wind turbine and the shield is able to connected or couple to a fixed or movable base, a apparatus, device or a motor which is capable of moving, pushing or swing the vertical axis wind turbine to it sides so a single blade is outside the opening or the cut out for operation and move, pull it or swing it back in for housing. Once at the operating or the housing position the system is locked into place so it won't move while operating. In the case where the vertical axis wind turbine is fixed, the blade section diameter must intentionally or purposely be equal or larger than that of the housing casing of the generator section. The rest of this figure has the same principles, properties, functions, methods, ways and workings as that of FIGS. 23-28. The only difference is the addition of the half shield. The half shield is able to open and close just as the opening or the cut outs. The contour curve is able to have many different designs, shapes, forms and configurations.

Referring primarily in FIG. (40), line 231 shows a side view FIG. 39, with a second line drawn under the main front line outlining the shape of the transportation vehicle showing that the upper part is less in width than the rest of the transportation vehicle. Line 232 shows a small rectangle on the side as a single blade of the vertical axis wind turbine blade section. Line 230 shows the half shield which makes an acute angle with the transportation vehicle sides or surface in front of a small rectangle in a way that a single blade is left not covered or shield by the shield to spin the generator as the wind pushes against the blades. The rest of this figure has the same properties, functions, methods, ways and workings as that of FIG. 39.

Referring primarily in FIG. (41), line 233 shows a side view of the contour curve out (a bump on the side) side of another normal side transportation vehicle. Where the curve out or bump represents an increase in the width of the transportations. To show the area is wider than the rest of the transportation vehicle sides and surfaces. Line 208 It shows a rectangle with a vertical line in the center as the vertical axis wind turbine blade section. Line 230 the half shield which makes an acute angle with the transportation vehicle sides or surface in front of the small rectangle in a way that a single blade is left not covered or shield by the shield to spin the generator as the wind pushes against the blades. The bump is so that the vertical axis wind turbine is able to have a larger diameter generator section. This is to show that the system is able to have a curve out addition too with the half shield method. The rest of this figure has the same properties, functions, methods, ways and workings as that of FIG. 39.

Referring primarily in FIG. (42), a detailed top view of FIGS. 39-41, where line 208 shows a top view of a blade section of a vertical axis wind turbine operating on the vertical plane having a center cylinder, with spokes sticking out and connecting to L-shapes, which are the blades of the vertical axis wind turbine. In front of the vertical axis wind turbine, line 307 the vehicle body section or part and line 230 a half shield both covers and shields all of the vertical axis wind turbine front from the wind except line 301 a single blade opening facing the wind is left uncovered and unshielded and is on the path of the wind to spin the vertical axis wind turbine through line 206 the opening or cutout the opening or cutout on the side of the vehicle body as the wind pushes against the blades.

Referring primarily in FIG. (43), a detailed top view of both FIG. 42 moving mechanism at the operating position, where line 314 a modified or customized motor with a locking rod receives input from the operator or driver and rotates sliding line 312 a sliding rod with teeth, which is perpendicularly connected or attached to line 320 a connecting rod which is also connected the bottom side of a vertical axis wind turbine operating on vertical plane and then continues on to line 302 the pivot point, all to move the vertical axis wind turbine to an operating position where line 301 a single blade of line 208 the blade section of the vertical axis wind turbine is outside the vehicle body through line 206 the opening or cutout on the side of the vehicle body section or part. Line 323 is a small rod which connects line 230 a half shield with the connecting rod and the system, so they can simultaneously deploy and retract together. Line 316 is the top horizontal surface of the vehicle body section or part. Line 319 is a small opening on line 318 the horizontal surface of the wide area of the contour part of the vehicle body section, so the vertical axis wind turbine can move further outside of the narrow area of the contour section; this is optional. The sliding rod with teeth can also be directly below or above the vertical axis wind turbine like in FIG. 21. The connecting rod has a ring at pivoting end to adjust for the slight change in length as the system moves to and from operating position to the housing position. There is a little gap between the ring and the pivot point rod.

Referring primarily in FIG. (44), line 227 shows a normal or a main outline of the transportation vehicle. Line 234 shows another line under the normal or the main front line outlining the transportation vehicle to show that the top part where the blade section is, is narrower in width than the rest of the transportation vehicle. Line 235 shows a simple transparent view of the whole vertical axis wind turbine, line 208 shows the blade section and line 236 shows two rectangles within each other on the bottom part as a generator section. The top part is the blade section and the bottom part is the generator or the rotor section. The generator section remains inside or under the sides or the surface of the transportation vehicle at all times, this statement is true for all the previous and most of the future transportation vehicles designs or figures, throughout this specification, though I did not mention it earlier. Most of the functions or the working of the systems are shared or transferable amongst the figure or the designs. Line 230 shows the shield in front of line 208 the blade section. The rest of this figure has the same properties, functions, methods, ways and workings as that of FIGS. 39-43.

Referring primarily in FIG. (45), line 227 shows the main outline of the transportation vehicle. Line 237 shows another line under the main front line outlining the vehicle to show that part, where the blade section is, is narrower in width and shorter in length than the rest of the transportation vehicle. Line 235 shows a simple transparent view of the whole vertical axis wind turbine, line 208 shows the blade section and line 236 shows the generator section. The generator section remains inside or under the sides or the surface of the transportation vehicle at all times. Most of the functions or the working of the systems are shared or transferable. Line 230 shows the half shield in front of the blade section. The rest of this figure has the same properties, functions, methods, ways and workings as that of FIGS. 39-43.

Referring primarily in FIG. (46), Line 238 shows the same transportation vehicles of FIG. 45. It shows the outer view of the system. It shows only the parts that are visible to a view when the system is operating, line 208 the blade section and line 230 the half shield. The rest of the vertical axis wind turbine and its functions are inside, below or beneath the sides or the surface of the transportation vehicle. Also The rest of this figure has the same principles, properties, functions, methods, ways and workings as that of FIGS. 39-43. The purpose of this figure is to show what is visible to the viewer in actuality, to show exactly what the viewer sees. All the functions and ways mentioned in this figure and in the previous figures or design are inside the transportation vehicle not visible or seen by the viewer.

Referring primarily in FIG. (47), line 243 shows a side view of a transportation vehicle where line 244 shows the front or hood height is intentional or purposely lower than the bottom end of the windshield line to allow for addition of line 245 a second line to be drawn above line 246 the main front or hood line outlining the transportation vehicle, to represent line 245 a n-shape bump on the hood having different height and width than the rest of the transportation vehicle without the n-shape bump obstructing the view of the operator or driver. The n-shape bump is able to house one or more vertical axis wind turbines. The n-shape bump or the area between the two lines is narrower in width than the rest of the transportation vehicle. The width different is so that the generator sector of the vertical axis wind turbine is inside and below the surface of the transportation vehicle, to allow the generator or the rotor section to be equal or wider than the blade section, also to allow the n-shape bump to remain just small, narrow and high enough to house the blade section. While the rest of the vertical axis wind turbine, its functions and workings remain below the transportation vehicle front or hood, that way the n-shape bump does not increase the drag of the transportation vehicle and allows the rest of the surface to remain smooth and even. Having a wider generator or rotor section is optional. Line 206 shows a rectangular shape on the side or surface of the n-shape bump which is openings or cut outs on the surface or the side. The n-shape bump is able to have one or more openings or cut out. The rectangular shapes are openable and closable as opening or cut out on a side or a surface of the n-shape bump to allow a single blade to be outside the opening or the cut out and to spin in and out of the opening or the cut out as the wind pushes against the blades to spin the vertical axis wind turbine. Though the figure shows only the front side, the back side is also able to have it. The vertical axis wind turbine is able to connected or couple to a fixed or movable base, a apparatus, device or a motor which is capable of moving, pushing or swing the vertical axis wind turbine to it sides so a single blade is outside the opening or the cut out for operation and move, pull it or swing it back in for housing. Once at the operating or the housing position the system is locked into place so it won't move while operating. The system is able to work and function on other types and areas of a transportation vehicle.

Referring primarily in FIG. (48), a detailed top view of the FIG. 47, moving mechanisms at the operating position, where line 314 a modified or customized motor with a locking rod receives input from the operator or driver and rotates sliding line 312 a sliding rod with teeth on both sides in one direction, which in turn also rotates line 324 a free gear which is also slides line 312 second sliding rod with teeth in the opposite direction, wherein each of the sliding rods is also perpendicularly connected line 321 a short connecting rod which is also connected the top, bottom or both side of a vertical axis wind turbine operating on the vertical plane moving them to their respective operating position simultaneously, where a single blade of the vertical axis wind turbine line 208 blade section is outside line 245 a n-shape bump through line 206 the opening or cutout on the side of the n-shape bump. The free gear is between the two sliding rods.

Referring primarily in FIG. (49), line 243 shows a side view of a transportation vehicle where line 247 shows the front or hood height is the same height as the bottom end of the windshield line to allow for addition of line 245 a second line to be drawn above line 246 the main front or hood line that outline the transportation vehicle, to represent line 245 a n-shape bump on the hood having different height and width than the rest of the transportation vehicle. The n-shape bump is able to house one or more vertical axis wind turbines. The n-shape bump or the area between the two lines is narrower in width than the rest of the transportation vehicle. The width different is so that the generator sector of the vertical axis wind turbine is inside and below the surface of the transportation vehicle, to allow the generator or the rotor section to be equal or wider than the blade section, also to allow the n-shape bump to remain just small, narrow and high enough to house the blade section. While the rest of the vertical axis wind turbine, its functions and work remain below the transportation vehicle front or hood, that way the n-shape bump does not increase the drag of the transportation vehicle and allows the rest of the surface to remain smooth and even. Having a wider generator or rotor section is optional. Line 206 shows a rectangular shape on the side or surface of the n-shape bump which is openings or cut outs on the surface or the side. The n-shape bump is able to have one or more openings or cut out. The rectangular shapes are openable and closable as opening or cut out on a side or a surface of the n-shape bump to allow a single blade to be outside the opening or the cut out and to spin in and out of the opening or the cut out as the wind pushes against the blades to spin the vertical axis wind turbine. Though the figure shows only the front side, the back side is also able to have it. The vertical axis wind turbine is able to connected or couple to a fixed or movable base, a apparatus, device or a motor which is capable of moving, pushing or swing the vertical axis wind turbine to it sides so a single blade is outside the opening or the cut out for operation and move, pull it or swing it back in for housing. Once at the operating or the housing position the system is locked into place so it won't move while operating. The system is able to work and function on other types and areas of a transportation vehicle.

Referring primarily in FIG. (50), line 245 shows a top view of the n-shape bump of FIG. 47. A better view and understanding of the FIG. 47, to emphasize the height and the width difference between the n-shape bump and the rest of the transportation vehicle front or hood. Line 206 shows a rectangular opening or cut out on the side or surface of the n-shape bump. The rest of this figure has the same principles, properties, functions, methods, ways and workings as that of FIGS. 47 and 48.

Referring primarily in FIG. (51), line 245 shows a top n-shape bump view of FIG. 47 with a different shape and size n-shape bump. To show that a transportation vehicle is able to have many different designs, shapes, sizes and configurations of the n-shape bump. It is also a better view and understanding of the figure, to emphasize the height and the width difference between the n-shape bump and the rest of the transportation vehicle front or hood. Line 206 shows a rectangular opening or cut out on the side or surface of the n-shape bump. The rest of this figure has the same principles, properties, functions, methods, ways and workings as that of FIGS. 47 and 48.

Referring primarily in FIG. (52), line 245 shows a top n-shape bump view of FIG. 49 wherein the n-shape bump is slightly higher than the bottom end of the windshield line. It is also a better view and understanding of the FIG. 49, to emphasize the height and the width difference between the n-shape bump and the rest of the transportation vehicle front or hood as well as the bottom end of the windshield line. Line 206 shows a rectangular opening or cut out on the side or surface of the n-shape bump. Line 232 shows an addition of a small rectangle as representation of a single vertical axis wind turbine blade. Line 247 shows the transportation vehicle front or hood height is the same height as the bottom end of the windshield line and n-shape bump is above the line. The rest of this figure has the same properties, functions, methods, ways and workings as that of FIGS. 47 and 48.

Referring primarily in FIG. (53), line 246 shows a lower front or hood transportation vehicle featuring line 245 a different n-shape bump without obstructing the operator view. This figure is to further emphasize that there are many different lower front or hood transportation vehicle and n-shape bump combinations. The lower front transportation vehicle and n-shape bump combinations or configurations are able to have or be made up of many different designs, shapes and sizes all of which cannot be shown. Line 206 shows a rectangular opening or cut out on the side or surface of the n-shape bump. Line 232 shows the addition of a rectangle as representation of a single vertical axis wind turbine blade. The rest of this figure has the same principles, properties, functions, methods, ways and workings as that of FIGS. 47 and 48. FIG. 23-59 share the same functions, they all use the opening or cutout method with or without addition of a half and other features. The n-shape bumps are able to have multi levels or work with an extended or non extended multi level stairs front transportation vehicle's setup also. Wherein the multiple levels stairs front employs the n-shape bumps with the opening or cutout on side method on each level, with the n-shape bumps connecting the multiple levels. The vertical axis wind turbines are able to have different arrangements inside the n-shape bump. The n-shape bump is able to house the one or more vertical axis wind turbines in side to side (row) arrangement or behind each other (column) arrangement with slight horizontal misalignment on the column arrangement, for better efficiency and to save space.

Referring primarily in FIG. (54), shows a side view of a normal looking sports car having a n-shape bump with line 206 the opening or the cut out on the side of line 245 the n-shape bump. This is to show that the n-shape bump is able to work with even the most normal looking or aerodynamic looking cars. The system, method or set up will use the same principles, properties, functions, methods, ways and workings as other openings or the cut out on the side of a n-shape bumps system, method or setups previously discussed. Although the figure shows the system, method or setup on the front, a sports car is able to have it in the back as well.

Referring primarily in FIG. (55), a side view of a normal looking sports car having line 245 a n-shape bump with line 230 the half shield on the side of the n-shape bump. Line 232 shows a single blade behind the half shield. This is to show that the n-shape bump is able to work with even the most normal looking or aerodynamic looking cars. The system, method or setup will use the same principles, properties, functions, methods, ways and workings as other half shields on the side of a n-shape bumps system, method or setups previously discussed. Although the figure shows the system, method or set up on the front, a sports car is able to have it in the back as well.

Referring primarily in FIG. (56), line 243 shows a transparent view of the vertical axis wind turbine on the transportation vehicle of FIG. 47, where line 244 shows a front or a hood height is intentional or purposely lower than the bottom end of the windshield line to allow line 245 a second line to be drawn above line 246 the main front or hood line that outlining the transportation vehicle, to represent line 245 a n-shape bump on the hood having different height and width than the rest of the transportation vehicle without the n-shape bump obstructing the operator view. The width different is so that the generator section of the vertical axis wind turbine is inside and below the surface of the transportation vehicle, to allow line 236 the generator section to be equal or wider than line 208 the blade section, also to allow the n-shape bump to remain just small, narrow and high enough to house the blade section. While the rest of the vertical axis wind turbine, its functions and work remain below the transportation vehicle front or hood, that way the n-shape bump does not increase the drag of the transportation vehicle and allows the rest of the surface to remain smooth and even. The n-shape bump has the same principles, properties, functions, methods, ways and workings as FIGS. 47 and 48. Line 230 shows a half shield which makes a acute angle with the n-shape bump sides or surface in front of the vertical axis wind turbine blade section or where openings or cut outs on the surface or the side is suppose to be, in a way that a single blade is left not covered or shield by the shield to spins the generator as the wind pushes against the blades. The system requires an openable and closable as opening or cut out on a side or a surface of the bump as well as the half shield. Though the figure shows only the front side, the back side is also able to have the system. The vertical axis wind turbine is able to be fixed or movable. The half shield has the same principles, properties, functions, methods, ways and workings as FIGS. 43 and 48.

Referring primarily in FIG. (57), line 243 shows a transparent view of the vertical axis wind turbine on the transportation vehicle of FIG. 49 where line 247 show the transportation vehicle front or hood height is the same height as the bottom end of the windshield line to allow line 245 a second line to be drawn above line 246 the main front or hood line that outlining the transportation vehicle, to represent line 245 a n-shape bump on the hood having different height and width than the rest of the transportation vehicle. The width different is so that the generator or the rotor sector of the vertical axis wind turbine is inside and below the surface of the transportation vehicle, to allow line 236 the generator or the rotor section to be wider than line 208 the blade section, also to allow the n-shape bump to remain just small, narrow and high enough to house the blade section. While the rest of the vertical axis wind turbine, its functions and work remain below the transportation vehicle front or hood, that way the n-shape bump does not increase the drag of the transportation vehicle and allows the rest of the surface to remain smooth and even. The n-shape bump has the same principles, properties, functions, methods, ways and workings as FIGS. 47 and 48. Line 230 shows a half shield which makes a acute angle with the n-shape bump sides or surface in front of the vertical axis wind turbine blade section or where openings or cut outs on the surface or the side is suppose to be, in a way that a single blade is left not covered or shield by the shield to spins the generator as the wind pushes against the blades. The system requires an openable and closable as opening or cut out on a side or a surface of the bump as well as the half shield. Though the figure shows only the front side, the back side is also able to have the system. The vertical axis wind turbine is able to be fixed or movable. The half shield has the same principles, properties, functions, methods, ways and workings as FIG. 39.

Referring primarily in FIG. (58), line 245 shows a top n-shape bump view of FIG. 56. Line 230 shows the half shield and line 232 shows a single blade behind the half shield. This is a better view and understanding of FIG. 56, to emphasize the height and the width difference between the n-shape bump and the rest of the transportation vehicle front or hood. The n-shape bump has the same principles, properties, functions, methods, ways and workings as FIGS. 47 and 48, and the half shield has the same principles, properties, functions, methods, ways and workings as FIGS. 43 and 48.

Referring primarily in FIG. (59), line 245 shows a top n-shape bump view of FIG. 57 wherein line 247 the transportation vehicle front or hood height is the same height as the bottom end of the windshield line and the n-shape bump line is slightly higher than the bottom end of the windshield line. Line 230 shows the half shield and line 232 shows a single blade behind the half shield. It is also a better view and understanding of the FIG. 57, to emphasize the height and the width difference between the n-shape bump and the rest of the transportation vehicle front or hood as well as the bottom end of the wind shield line. The n-shape bump has the same principles, properties, functions, methods, ways and workings as FIGS. 47 and 48, and the half shield has the same principles, properties, functions, methods, ways and workings as FIGS. 43 and 48.

Referring primarily in FIG. (60), Line 258 shows a transportation vehicle having extended front, wherein the front is purposely elongated or stretching out further than a normal transportation vehicle front. The transportation vehicle is also given multiple levels varying in height and width. So that the transportation vehicle will be able to house, carry and use more vertical axis wind turbines for its energy needs. Line 259, the bottom level is both longer and wider than line 260 the second level above. The transportation vehicle has a vertical axis wind turbine and shield on the very front, with line 208 the blade section and line 207 the shield being above line 259 the bottom level. Although the figure shows one wind turbine and shield, the transportation vehicle is able to have one or more vertical axis wind turbines. The front vertical axis wind turbine and shield are able to be fixed or movable. In the case where the system is fixed, the system stays as it is on the figure with only the blade being above the transportation vehicle surface and visible to the viewer. In the case where the system is movable, the system is couple to some device, apparatus or motor that move, push the system up from under, flip or roll the system into a operating position and moves, pull the system back down, flip or roll the system back into the housing position where the system is below the surface of the transportation vehicle as if the system was never their. The system is able to be moved, flipped or rolled from its side or front. The transportation vehicle also has one or more vertical axis wind turbines on its sides at varying positions so they won't interfere with each other. The figure shows line 230 the half shield method. The workings of this system, the half shield method, employ the same principles, properties, functions, methods, ways and workings as previously stated. In the instances where the bottom level is wider than the second level the vertical axis wind turbine blade section is able to be less or equal in diameter as that of the generator section. In the instances where the transportation vehicle side surface is even, the blade section diameter has to be wider than the generator section, as it is in the case for the vertical axis wind turbine behind the operator door in this figure.

Referring primarily in FIG. (61), Line 258 shows a transportation vehicle having extended front, wherein the front is purposely elongated or stretching out further than a normal transportation vehicle front. The transportation vehicle is also given multiple levels varying in height and width. So that the transportation vehicle will be able to house, carry and use more vertical axis wind turbines for its energy needs. Line 259 the bottom level is both longer and wider than line 260 the second level above. The transportation vehicle also has a vertical axis wind turbine on the very front, with line 208 the blade section and line 207 the shield being above the bottom level. The front vertical axis wind turbine and shield has the same properties, functions, methods, ways and workings as that of FIG. 60. The transportation vehicle also has one or more vertical axis wind turbines on its sides at varying positions so they won't interfere with each other, which are represented by line 206 the opening or cutout on the side method. The workings of this system, opening or cutout on the side method, employ the same principles, properties, functions, methods, ways and workings as previously stated. In the instances where the bottom level is wider than the second level the vertical axis wind turbine blade section is able to be less or equal in diameter as that of the generator section. In the instances where the transportation vehicle side surface is even, the blade section diameter has to be wider than the generator section, as it is in the case for the vertical axis wind turbine behind the operator door in this figure.

Referring primarily in FIG. (62), line 258 shows a transportation vehicle of FIG. 60 having extended front. Where in the front is purposely elongated or stretching out further than a normal transportation vehicle front. The figure shows the transportation vehicle is given multiple levels varying in height and width, so that it will be able to house, carry and use more vertical axis wind turbines for its energy needs. Bottom level longer than the second level. The second level is higher than the bottom level. The bottom and the second level is able to have the same width or varying width. The second level will always be less in length than the bottom level. The transportation vehicle has a vertical axis wind turbine and a shield on the very front, on both line 259 the bottom level and line 260 the second level with line 208 the blade section and line 207 the shield being above their surfaces so they won't interfere with each other. This is possible because of the elongation or the stretching of the front and the height difference of the levels. The rest of this figure has the same principles, properties, functions, methods, ways and workings as FIG. 60.

Referring primarily in FIG. (63), a detailed moving mechanism of FIGS. 60-62, at the housing position, where line 314 a modified or customized motor with a locking rod receives input from the operator or driver and rotates sliding line 312 a sliding rod with teeth which is connected to line 325 a lifting box in the forward direction under line 326 the base of a vertical axis wind turbine operating on vertical plane and line 207 a shield and lifting them to their operating position via a fixed rod connected to line 327 a connecting bar with a ring to move around a pivoting point. Line 208 is the blade of the vertical axis wind turbine. The moving mechanism works for both individual and interconnected setup. It can be one or more moving setups. Though the figure didn't show the base is the same length as the vertical axis wind turbine and the shield combined. The moving box can be hollow, it doesn't have to be a box, it just has to be strong enough to lift the vertical axis wind turbines to the operating position and keep them there.

Referring primarily in FIG. (64), Line 258 shows a transportation vehicle having extended front, where in the front is purposely elongated or stretching out further than a normal transportation vehicle front. So that the transportation vehicle is able to house, carry and use more vertical axis wind turbines for its energy needs without obstructing the operator view. Although I call it extended front it can also be referred to as push back cabin front or lower elongated front. The figure shows the transportation vehicle having a vertical axis wind turbine on the very front, with line 208 the blade section and line 207 the shield being above the surface. The rest of this figure has the same principles, properties, functions, methods, ways and workings as FIGS. 60 and 63.

Referring primarily in FIG. (65), Line 258 shows another transportation vehicle having extended front, where in the front is purposely elongated or stretching out further than a normal transportation vehicle front. So that the transportation vehicle is able to house, carry and use more vertical axis wind turbines for its energy needs without obstructing the operator view. Although I call it extended front it can also be referred to as push back cabin front or lower elongated front. The figure shows the transportation vehicle having a vertical axis wind turbine on the very front, with line 208 the blade section and line 207 the shield being above the surface. This figure shows another single level front extension. To show that the extensions are able to happen with many different designs, shapes, forms and configurations. The rest of this figure has the same properties, functions, methods, ways and workings as FIGS. 60 and 63.

Referring primarily in FIG. (66), Line 261 shows another transportation vehicle having a pushed back cabin, where the cabin is pushed back further than a normal transportation vehicle front. So that the transportation vehicle will be able to house, carry and use more vertical axis wind turbines in front for its energy needs without obstructing the operator view. It is very similar to the extended front, but here is the cabin that is stopped from reaching the front of the transportation vehicle. The figure shows the transportation vehicle having a vertical axis wind turbine on the very front, with line 208 the blade section and line 207 the shield being above the surface. This figure shows another single level extension or push back cabin front. The rest of this figure has the same principles, properties, functions, methods, ways and workings as FIGS. 60 and 63.

Referring primarily in FIG. (67), Line 258 shows another transportation vehicle having both an extended front, and line 261 a pushed back cabin where in the cabin is purposely pushed back further than a normal transportation vehicle front. So that the transportation vehicle will be able to house, carry and use more vertical axis wind turbines for its energy needs without obstructing the operator view. The figure shows the transportation vehicle having a vertical axis wind turbine on the very front, with line 208 the blade section and line 207 the shield being above the surface. This figure shows another single level push back cabin front. The rest of this figure has the same principles, properties, functions, methods, ways and workings as FIGS. 60 and 63.

Referring primarily in FIG. (68), Line 258 shows top view of the extended front, line 261 shows the push back cabin front where the front is purposely elongated of FIGS. 64, 65, 66 and 67. It gives the viewer a better understanding of the previous figures. The extended or the push back cabin front having more than one vertical axis wind turbine and shield system on the front with line 208 the blade section and line 207 the shield being above the surface. Emphasizing that the transportation vehicle is able to have multiple vertical axis wind turbine and shield systems setups on the front either interconnectedly coupled or individually coupled. The rest of this figure has the same properties, functions, methods, ways and workings as FIGS. 60 and 63. FIGS. 60-68 all share similar front methods and functions.

Referring primarily in FIG. (69), an extended front transportation vehicle to house a vertical axis wind turbine operating on the vertical plane between line 283 the front end and the front tire on the sides, employing the opening or the cut out system, method or set up on a normal side of a transportation which is mostly even. The system, method or set up will use the same principles, properties, functions, methods, ways and workings as other line 206 openings or the cut out on the side of even surface system, method or setups previously discussed, wherein a single blade is left outside and is able to spin in and out of the opening or the cut out as wind against the blades. With the only added requirement being that the blade section has to be wider in diameter than the casing of the generator section. In this design, the transportation vehicle front purposely and intentionally elongated or stretched to allow for the addition of the vertical axis wind turbine operating on the vertical plane between the front end and the front tire on the sides. Although the figure shows the system setup only on the front, the back is also able to have it.

Referring primarily in FIG. (70), a transparent view of another extended front transportation vehicle to house a vertical axis wind turbine operating on the vertical plane between line 283 the front end and the front tire on the sides. It uses line 206 the opening or cut out on side system, method, or setups. It shows line 208 the blade section and line 236 the generator section. The system, method or set up will use the same principles, properties, functions, methods, ways and workings as FIG. 69 and other openings or the cut out on the side of even side or surface system, method or setups previously discussed. This is another example to show the setup is able to work with different designs and types of transportation vehicles.

Referring primarily in FIG. (71), line 262 shows a fairing above the roof of a transportation vehicle with a vertical axis wind turbine behind the fairing so as it appears with line 208 a blade section above and line 236 the generator section below. In reality the vertical axis wind turbine is able to be behind or inside the fairing and seamlessly fuse with the fairing. The fairing is made up of the (3) three horizontal lines with the top line being sloped upwards. Line 263 the first line is to show the height of line 236 the generator section. Line 264 the second or the middle line is to show or represent a small, narrow grooves or a channels dept of the fairing or wall height on the fairing to allow the wind to pass through to interact or push a single blade that is left outside a opening or a cut out on the surface or the side walls of the grooves or the channels as the wind pushes against the blades to spin the vertical axis wind turbine. The groove or channel depth or wall height is just tall enough to house the blade section of the vertical axis wind turbine. The groove or channel width is just wide enough to allow one or more single blades of the vertical axis wind turbine to be in the path of the wind or in between the groove or the channel walls and spin side by side without touching or interfering with each other. In the instance where the vertical axis wind turbine is behind the fairing a single blade is also left in the path of the wind (the groove or the channel) while the rest of the vertical axis wind turbine is covered or shield from the wind. Line 265 the top line shows or represents the fairing height housing the vertical axis wind turbines. In this instance the entire vertical axis wind turbine system is above the transportation vehicle surface. This is to utilize the space behind and under the fairing for housing energy generating devices or vertical axis wind turbines for harvesting energy from the movement of the transportation vehicle. These are the places on the transportation vehicle where the same amount of wind will touch or pass through with or without the addition of the vertical axis wind turbine, the shield or the fairing systems. This statement is true for most of the methods and the systems in this patent application. Line 266 shows an addition of a top view of the fairing having one or more vertical axis wind turbines behind it, to give the viewer a better understanding of the system. The fairing system also can be better understood from FIGS. 105-111 a top view of the u-shaped grooves or channel, except here the fairing and the vertical axis wind turbines are able to separate from the rest of the transportation vehicle, they are not built into the transportation vehicle. Both the fairing and the vertical axis wind turbine are above the surfaces of the transportation vehicle. The vertical axis wind turbines are also able to move to operating or housing positions using the moving methods previously discussed to save energy.

Referring primarily in FIG. (72), Line 267 shows a normal looking transportation vehicle with a side fairing behind the operator cabin, and line 268 a double generator vertical axis wind turbine operating on the vertical plane under the side fairing. The double generator vertical axis wind turbine used in the figure is from FIG. 140, with a blade section in middle and generator section on both ends. The double generator vertical axis wind turbine is coupled to a fix or a movable base on one or both ends. The fixed or the movable base is also couple to some device, apparatus or motor that move, push the vertical axis wind turbine up from under the fairing into a operating position and moves, pull the vertical axis wind turbine back down into the housing position where the system is below the surface of the transportation vehicle as if the system was never their. In the instance where the vertical axis wind turbine is fixed, the vertical axis wind turbine appears and stays the same as it is in the figure. Line 206 the gap in the fairing showing a rectangle with two vertical lines on the top and bottom part disappearing into the fairing is line 208 a blade section inside the gap. While the generation section is below the fairing and not visible to the viewer. Line 206 the gap is also able to be openable and closable opening or cut out on the fairing to allow the blade section to spin in and out of the opening or the cut out on the fairing as the wind pushes against the blades to spin the vertical axis wind turbine. This is possible because the blade section is wider in diameter than the generator sections on both sides of the vertical axis wind turbine. The opening and the closing of the gap is optional. Although the gap which is an opening or cut out is shown in the figure as having a slope or curve lines making funnel gaps, in reality it is a strength line or rectangular gap, opening or cut out just wide enough to allow the blade section to interact with the wind. The slope or the curve line is to show that the fairing is able to curve outwards a little bit as it is in most normal transportation vehicles. The side fairing is also able to be straight or flat depending on the transportation vehicle type. The system is capable of working with many different types of fairings.

Referring primarily in FIG. (73), line 262 shows a normal looking transportation vehicle with above the roof fairing of FIG. 72, and vertical axis wind turbine operating on the vertical plane set up of FIG. 72 having line 208 a blade section above and line 236 a generator section below. With the only difference being that the top fairing will have less vertical axis wind turbines. Example instead of 5 vertical axis wind turbines it could end up with 4 or 3 vertical axis wind turbines. To avoid interference with the side vertical axis wind turbine. The view of the roof fairing and vertical axis wind turbine operating on the vertical plane setup is transparent, in reality it cannot be seen from the side and here the vertical axis wind turbine is inside the fairing not behind it. Line 267 shows a side fairing and line 268 a double generator vertical axis wind turbine set up of FIG. 72. The rest of this figure has the same properties, functions, methods, ways and workings as FIGS. 71, 72 respectively.

Referring primarily in FIG. (74), a normal looking transportation vehicle of FIG. 73 with reverse vertical axis wind turbine set up. Line 262 shows the above fairing is now coupled with line 268 the double generator vertical axis wind turbine. The above fairing still employs line 264 the groove or channel depth on the fairing method described in FIG. 71. Wherein line 208 the blade section of the double generator vertical axis wind turbine is now in the center of the groove or the channel or in between the walls of the groove or the channel, to interact with the vertical axis wind turbine as the wind pushes against the blades to spin the vertical axis wind turbine. The groove or channel inner walls of the fairing will have a circular opening or cut out on the walls to allow the vertical axis wind turbine to spin or rotate through the opening or the cut out without touching it. The wall's height or depth are able to be high enough to allow the blades to spin or rotate without the blades touching the surface below the blade section in between the groove or channel walls. The groove or channel walls height or depth is also able to be just high enough to house the generator section while allowing the blade section to spin or rotate through a opening or cut out on the surface below the blade section or in between the walls, that will be three separate openings or cut outs to keep the fairing from being too tall, and also acting as a half shield on the horizontal plane wherein only a single blade is above the surface opening or cutout to spin the vertical axis wind turbine as the wind pushes against the blades. The fairing is also able to be low enough in height to the point that the three separate openings or cutouts are able to be single continuous opening or cut out. The setup can also be better understood from FIGS. 115 and 116, minus the small n-shape bump in front of the blade section in those figures. Line 267 shows the side fairing is now coupled with the vertical axis wind turbine operating on the vertical plane. The side fairing still employs line 206 the gap, opening or the cut out method described in FIG. 70. Wherein line 208 the blade section of the vertical axis wind turbine operating on the vertical plane is now in the center of the gap, opening or the cut out. It will have the same principles, properties, functions, methods, ways and workings as FIGS. 69 and 70 just with a different vertical axis wind turbine.

Referring primarily in FIG. (75), a normal looking transportation vehicle of FIG. 72 with a different vertical axis wind turbine set up. Line 262 shows the above fairing is now coupled with the vertical axis wind turbine operating on the vertical plane having line 208 a blade section above and line 236 a generator section below. The above fairing still employs the groove or channel dept method described in FIG. 71. Line 267 shows the side fairing is now coupled with the vertical axis wind turbine operating on the vertical plane having line 208 a blade section. The side fairing still employs line 206 the gap, opening or the cut out on the side fairing method described in FIG. 72. The roof and side fairing will have the same principles, properties, functions, methods, ways and FIGS. 71 and 72 respectively.

Referring primarily in FIG. (76), a normal looking transportation vehicle of FIG. 72 with a different vertical axis wind turbine set up. Line 262 shows the above fairing is now coupled with line 268 the double generator vertical axis wind turbine operating on the horizontal plane. The above fairing still employs line 264 the groove or channel dent or dept method described in FIGS. 71 and 74. Wherein line 208 the blade section of the double generator vertical axis wind turbine operating on the vertical plane is now in the center of the groove or the channel or in between the walls of the groove or the channel, as the wind pushes against the blades to spin the double generator vertical axis wind turbine. Line 267 shows the side fairing is now coupled with the double generator vertical axis wind turbine operating on the vertical plane. The side fairing still employs line 206 the gap, opening or the cut out method described in FIG. 72. The figure will have the same principles, properties, functions, methods, ways and workings as FIGS. 71 and 74 for the above or roof fairing and FIG. 72 for the side fairing.

Referring primarily in FIG. (77), a separate view of a top fairing, where line 262 is a top fairing with line 265 being a top surface of the multiple n-shape bumps that are formed by line 264 a grooves or channels on the fairing, and line 208 is a blade section of a vertical axis wind turbine operating on vertical plane shown through line 206 a opening or cutout on the sides of the multiple n-shape bumps to allow the blades to spin through them as the wind pushes against the blades.

Referring primarily in FIG. (78), a detailed top view of FIG. 75, where line 262 is a top fairing with line 265 being a top surface of line 245 the multiple n-shape bumps which are formed by line 264 the grooves or channels on the fairing, and line 301 a single blade of the vertical axis wind turbine operating on the vertical plane blade section opening facing the wind in the center of line 206 a opening or cutout on the sides of the multiple n-shape bumps to allow the blades to spin through them as the wind pushes against the blades.

Referring primarily in FIG. (79), line 301 a single blade opening facing the wind, where line 307 is a body section or part of a vehicle, and line 267 is a side fairing behind the operator cabin, and line 208 is a blade section of a vertical axis wind turbine operating on vertical plane shown through line 206 a opening, cutout or a gap on the sides fairing. The opening, cutout or the gap don't have to be closed, only the vertical axis wind turbine operating on the vertical plane has to move to and from operating position to the housing position.

Referring primarily in FIG. (80), a simple close in view of the moving mechanisms for the fairing setup at the housing position, where line 314 a modified or customized motor with a locking rod receives input from the operator or driver and rotates sliding line 312 a sliding rod with teeth which is connected to line 321 multiple short connecting rod, wherein each of the multiple short connecting rods also connected the top, bottom or both side of a vertical axis wind turbine operating on vertical plane moving them to their respective operating position. Line 208 is the blade section of the vertical axis wind turbine.

Referring primarily in FIG. (81), a detailed close in view of the moving mechanisms for the fairing setup at the operating position, where line 211 a motor also having a gear receives input from the operator or driver and rotates sliding line 312 two separate sliding rod with teeth on the opposite direction of each other, the two separate sliding rod with teeth is connected to line 321 multiple short connecting rod, wherein each of the multiple short connecting rods also connected the top, bottom or both side of a vertical axis wind turbine operating on vertical plane moving them to their respective operating position simultaneously, where a single blade of the vertical axis wind turbine line 208 blade section is outside line 245 the multiple n-shape bumps formed by the grooves or channels through line 206 the opening or cutout on the side of the n-shape bumps that are on line 262 the top fairing. The outer sliding rod can have teeth on both sides connected to free gear with a locking rod to the system at operating position.

Referring primarily in FIG. (82), another detailed close in view of the moving mechanisms for the fairing system setup at operating position, where line 314 a modified or customized motor with a locking rod receives input from the operator or driver and rotates sliding line 312 a sliding rod with teeth which is connected to line 321 multiple short connecting rod, wherein each of the multiple short connecting rods also connected the top, bottom or both side of a vertical axis wind turbine operating on vertical plane moving them to their respective operating position, where a single blade of the vertical axis wind turbine line 208 blade section is outside line 245 the multiple n-shape bumps formed by line 264 the grooves or channels through line 206 the opening or cutout on the side of the n-shape bumps that are on the top fairing. Here double moving mechanisms are used, with each of the sliding rods having its own motor move independent of each other. This is so the entire system doesn't stop working if malfunction happens.

Referring primarily in FIG. (83), a detailed skeleton view of another moving mechanism for the fairing system, where line 211 a motor also having a gear receives input from the operator or driver and rotates moving line 328 a chain goes around line 310 two pivot gear on opposite sides of the fairing and connect line 334 a sliding rod with no teeth, which perpendicularly connects to line 321 multiple short connecting rod, wherein each of the multiple short connecting rods also connected the top, bottom or both side of a vertical axis wind turbine operating on vertical plane moving them to their respective operating position. Line 208 is the blade section of the vertical axis wind turbine.

Referring primarily in FIG. (84), a more detailed view of FIG. 83, where line 211 a motor also having a gear receives input from the operator or driver and rotates moving line 328 a chain goes around line 310 two pivot gear on opposite sides of the fairing and connect line 334 a sliding rod with no teeth, which perpendicularly connects to line 321 multiple short connecting rod, wherein each of the multiple short connecting rods also connected the top, bottom or both sides of a vertical axis wind turbine operating on vertical plane moving them to their respective operating position where a single blade of the vertical axis wind turbine line 208 blade section is outside line 245 the multiple n-shape bumps formed by the grooves or channels through line 206 the opening or cutout on the side of the n-shape bumps that are on the top fairing, in front or on the hood of a vehicle.

Referring primarily in FIG. (85), a more detailed and complex view and setup of FIGS. 83 and 84 moving mechanism at the operating position, where line 211 a motor also having a gear receives input from the operator or driver and rotates moving line 328 a chain goes around line 310 two pivot gear on opposite sides of the fairing and connect line 312 a sliding rod with teeths, which perpendicularly connects to line 321 multiple short connecting rod, wherein each of the multiple short connecting rods also connected the top, bottom or both side of a vertical axis wind turbine operating on vertical plane moving them to their respective operating position where line 301 a single blade of the vertical axis wind turbine line 208 blade section is outside line 245 the multiple n-shape bumps formed by the grooves or channels through line 206 the opening or cutout on the side of the n-shape bumps that are on line 307 a body section a vehicle or the top fairing, because this moving method works on the u-shapes grooves or channels. The teeth of the sliding rod locked on to another free gear, which also locked on to another sliding rod. The free gear is between the two sliding rods, so that when the motor slide the first sliding rod, it teeth rotates the middle free gear which in turn slides the second sliding rod on opposite direction of the first sliding rod deploying the vertical axis wind turbines to opposite sides of the multiple n-shape bumps formed by the grooves or channels on the fairing.

Referring primarily in FIG. (86), a detailed top view of a top fairing with a top surface opening or cutout, where line 262 a top fairing has line 206 opening or cutout on the top surface to allow a blade section of a vertical axis wind turbine operating on the horizontal plane to spin through opening as the wind pushes against the blades. The top blade is outside and above the surface level of the fairing. Line 208 is the blade section of the wind turbine.

Referring primarily in FIG. (87), a detailed skeleton view of a moving mechanism for FIG. 86, where line 211 a motor is connected to line 312 a sliding rod with teeth, which is perpendicularly connected line 331 a long connecting bar which also perpendicularly connected to line 334 a sliding rod with no teeths, which also connects to line 325 a lift box, which slide under line 274 a base of a vertical axis wind turbine operating on the horizontal plane and lift it to an operating position where a top blade of line 208 the blades section is outside and above the surface level of a fairing when the motor receives an input from the operator or driver. Line 327 a connecting bar with a ring to move around a pivoting point. The connecting bar has a ring at pivoting end to adjust for the slight change in length as the system moves to and from operating position to the housing position. The ring has a small gap between it and the fixed pivot point. These moving mechanisms can be used on all instances where a vertical axis wind turbine is operating on a horizontal plane.

Referring primarily in FIG. (88), a transportation vehicle with line 269 shows a large hump on the roof for its compressed natural gas (CNG) fuel tanks. It shows a addition of line 262 a fairing in front and a vertical axis wind turbine operating on the vertical plane having line 208 a blade section above and line 236 a generator section below. To take advantage of the space in front of the large hump, because these are places on the transportation vehicle where the same amount of wind will touch or pass through with or without the addition of the vertical axis wind turbine and the fairing system. This fairing and vertical axis wind turbine combination employ the same principles, properties, functions, methods, ways and workings as FIG. 71. Wherein a single blade is left outside a opening or a cut out on the surface or the side walls of the groove or the channel as the wind pushes against the blade to spin the vertical axis wind turbine. Line 270 the slope line behind the vertical axis wind turbine is to show the exit path of the wind. Though the figure doesn't show the fairing depth or wall height is just tall enough to house the blade section of the vertical axis wind turbine. The rest of the vertical axis wind turbine is covered. The shield in front of the vertical axis wind turbine method is also able to be mounted at this position too. Not all the possible combinations can be shown in the drawings.

Referring primarily in FIG. (89), a transportation vehicle of FIG. 88, with line 269 a large hump on the roof for its compressed natural gas (CNG) fuel tanks. It shows a addition of line 268 a vertical axis wind turbine operating on the horizontal plane and fairing to the front of hump with the fairing in front being lower in height than the rest hump. This is to allow a single blade of line 208 the blade section to be outside and above line 262 the fairing without increasing the overall surface area of the transportation vehicle. This system, method or set up employs the openable and closable opening or cut out to allow the blade to spin in and out of the opening or the cut out as the wind pushes against the blades to spin the vertical axis wind turbine. Here the opening or the cutout is on the surface of the fairing. It can also be better understood from FIGS. 113 and 114. The system is able to be movable or fixed. The roof set up is also able to have a setup wherein the fairing has an even height with the hump and only a single blade will above the surface of the fairing, in which case the transportation vehicle surface area is increased by the height of the blade section above the fairing. The fairing system set up is able to have many different set ups or combinations all of which cannot be shown. Line 258 shows the front extension in front of the transportation vehicle having line 271 a small fairing with the same set up as the above or the roof set up. They both employ the same properties, functions, methods, ways and workings. FIGS. 71-89 all share similar fairing groove or channel and opening or cutout methods and functions.

Referring primarily in FIG. (90), a normal side view of a normal looking transportation vehicle which is usual line 272 even side, employing line 230 the half shield system, method or set up on a normal side of a transportation which is mostly even, and line 232 shows a single blade behind the half shield. The half shield has the same principles, properties, functions, methods, ways and workings as FIGS. 39 and 34. With the only added requirement being that the blade section has to be wider in diameter than the casing of the generator section. The half shield system, method or set ups is able to be mounted on the front, on the back side, behind the operator door and many positions on the side of the transportation vehicle depending on the vehicle type. FIGS. 71-89 all share similar methods and functions of the half shield being in front of an opening or cutout with the only difference being the n-shape bump and the blade section diameter.

Referring primarily in FIG. (91), a side view of a normal looking transportation vehicle, employing line 206 the opening or the cut out system, method or setup on a normal side of a transportation which is mostly line 272 even side. The system, method or set up will use the same principles, properties, functions, methods, ways and workings as other openings or the cut out system, method or setups on the side as previously discussed. With the only added requirement being that the blade section has to be wider in diameter than the casing of the generator section. The opening or the cut out system, method or set ups is able to be mounted on the front side, on the back side, behind the operator door and many other different positions on the side of a transportation vehicle depending on the vehicle type.

Referring primarily in FIG. (92), Line 244 shows a normal front transportation vehicle where a front or a hood height is intentional or purposely lowered or depressed than the bottom end of the windshield line to allow for addition of a vertical axis wind turbine operating on the vertical plane and shield system without the system obstructing the operator or the driver view. This allows the vertical axis wind turbine and the shield to remain below the operator or driver line of sight. The intentional or purposely lowering or depressing of the front or the hood ends or stops at the windshield. Line 207 shows the shield in front of the vertical axis wind turbine. The shield shown is able to be from my previous patent number U.S. Pat No. 12,297,802 B2. Wherein the shield is horizontally spaced from the vertical axis wind turbine center to shield the front of the vertical axis wind turbine from the wind except a single blade is left uncovered. With the shield being more than or equal to the height of the blade section or the entire vertical axis wind turbine. Line 208 shows the blade section of the vertical axis wind turbine as a rectangle with a vertical line in the center extending down and disappearing into the vehicle. The vertical axis wind turbine and shield combination or set up in this figure is able to be fixed or movable. If fixed it will remain as it appears in the figure. If movable the system is be able to couple some device, apparatus or motor that move, flip or push it up into the operating position, the way shown in the figure and moves, flip or pull it back into the housing position where both the vertical axis wind turbine and shield will be below the surface of the transportation vehicle as if the system was never their. The system is able to be moved or flipped from its side or front. As well as being able to be pushed from under with a piston or hydraulic like function. The back, the rear or other areas of a transportation vehicle is also capable of having the intentional or purposely lowering or depressing a part of a transportation vehicle set up or method depending on the transportation vehicle. Wherein the lowered or depressed method is able to work with other methods stated throughout this specification.

Referring primarily in FIG. (93), Line 244 shows a normal front transportation vehicle where a front or a hood height is intentionally or purposely lowered or depressed than the bottom end of the windshield line. Line 207 shows the shield in front of the vertical axis wind turbine wherein only line 208 the blade section is above the front or the hood. The transportation vehicle has the same principles, properties, functions, methods, ways and workings as that of FIG. 92. With the only difference being that the intentional or purposely lowering or depressing of the front or the hood line 275 ends before reaching the windshield. This is to show that the system, method or setup is able to have many different designs, shapes, forms, width, height, length, size, and combinations all of which can't be shown. FIGS. 92-93 shared the same methods and functions.

Referring primarily in FIG. (94), Line 276 shows a non extended multiple level stair front and side of a transportation vehicle. It shows that line 259 the bottom level is longer and wider than line 277 the middle level from the front end to the tire area. The middle level is also longer and wider than line 278 the top level. The top level is able to be less in width than the cabin. The cabin is able to have the same width as the middle level from the windshield to the back. Line 230 shows the half shield and vertical axis wind turbine operating on the vertical plane method on the side with line 208 the blade section showing, whether it be that the generator section inside the wider areas and blade section be inside the narrow areas or both be inside a even side or surface. The system, method or setup use the same principle, properties, functions, methods, ways and working as other half shield and vertical axis wind turbines operating on the vertical plane previously discussed. With the only noticeable difference being the blade section has to be wider than the generator if the system is on an even side of a transportation vehicle. The middle and the top levels are able to have the shield in front of the blade section method on it, in front without interfering with each other's performance although the drawing didn't show it. The top level just has to be much less in length than the middle level. The blade section and the shield are able to be in front, outside and above each level surface when operating without interfering with each other's performance, though the figure did show it.

Referring primarily in FIG. (95), Line 276 shows a non extended multiple level stair front and side of a transportation vehicle. It shows that line 259 the bottom level is longer and wider than line 277 the middle level from the front end to the tire. The middle level is also longer and wider than line 278 the top level. The top level is able to be less in width than the cabin. The cabin is able to have the same width as the middle level from the windshield to the back. Line 206 shows the opening or cut out and vertical axis wind turbine operating on the vertical plane method on the side, whether it be that the generator section inside the wider areas and blade section be inside the narrow areas or both be inside a even side or surface. The system, method or setup use the same principle, properties, functions, methods, ways and working as other opening and cut out and vertical axis wind turbines operating on the vertical plane methods previously discussed. With the only noticeable difference being the blade section has to be wider than the generator if the system is on an even side of a transportation vehicle.

Referring primarily in FIG. (96), Line 276 shows a non extended multiple level stair front of a transportation vehicle. It shows that line 259 the bottom level is longer than line 260 the second level. The bottom level is also able to be wider than the second level, but it is optional. The second level is able to be equal or less in width than the cabin from the front to line 279 the windshield area. Line 207 shows the shield in front of line 208 the blade section being above the surface of both levels in front. The system, method or setup use the same principle, properties, functions, methods, ways and working as other shields in front of the blade section being above the front surface previously discussed whether fixed or movable. FIGS. 94-96 shared the same methods and functions.

Referring primarily in FIG. (97), Line 276 shows a non extended multiple level stair front and side of a transportation vehicle of FIG. 95 with a tray push or slide out front system on the middle level. Line 280 shows the tray push or slide out front system on line 277 the middle level at an housing position. This is where a vertical axis wind turbine operating on the vertical plane and a shield are coupled together to a tray or other shape (note: the tray or the other shape itself can be the shield). The tray or the other shape is able to couple line 211 some device, apparatus or motor to move, push or slide out the tray or the other shape in front and out of the transportation vehicle for operation, and move, pull or slide in the tray or the other shape for housing when not operating. The tray or the other shape is able to use line 281 rod with teeths or a chain method to help with the sliding. The system will use already known methods. Once at the operating or the housing position the system is locked into until the opposite action is required. The systems are able to individually or interconnectedly move from and to housing or operating positions.

Referring primarily in FIG. (98), Line 276 shows a non extended multiple level stair front and side of a transportation vehicle of FIG. 97 with a tray push or slide out front system on the middle level. Line 280 shows the tray push or slide out front system on the middle level having the same principle, properties, functions, methods, ways and working as FIG. 97. The system is at the operating position in this figure where it is in front and outside.

Referring primarily in FIG. (99), a normal looking transportation vehicle with line 280 a tray push or slide out front system on it below the operator cabin having the same principle, properties, functions, methods, ways and working as FIG. 97. The system is at the operating position in this figure. Line 281 shows a rod with teeths couple to the tray or the other shape on one end and couple to line 211 some device, apparatus or motor to rotate to move and slide the rod with teeths. The motor is able to couple to a gear like teeths that is able to lock on to the rod teeths, as the gear rotates it moves the rod depending on the direction of rotation. Each system is able to have one or more gear, rod with teeth systems. Although the figure shows the gear, rod with teeth combination, is able to work with many known methods as well. FIGS. 97-99 shared the same methods and functions.

Referring primarily in FIG. (100), a detailed moving mechanism of the tray push or slide out system, at house positions, where when line 211 a motor receives input from the operator or driver, it rotates and slides into a housing position a rod with teeths which is connected to line 329 a front panel which covers the front of the tray push or slide system while it is at the housing position via line 302 a pivoting point, which forces the panel to rotate to the horizontal plane, therefore effectively open the cover to allow the tray push or slide system to slide out for use. Wherein line 314 another modified or customized motor with a locking rod also receives input from the operator or driver and rotates sliding line 312 a sliding rod with teeth, which is directly connected or attached to line 280 the tray push or slide system out to an operating position where a vertical axis wind turbine operating on the vertical plane with a shield in front of the vertical axis wind turbine are outside the vehicle body in front of the vehicle body for use. Line 330 is another panel which is behind the tray system to prevent wind from entering the housing cavity which also reduces the drag. The tray can expand about the entire width of the vehicle front, while the sliding rod or the motor can be one or multiple rods and motors separated by large gaps, so the system doesn't take much of the vehicle space.

Referring primarily in FIG. (102), a side and top view of a normal looking transportation vehicle having line 282 a inverted symmetric unimodal n-shape bump on the front or the hood with line 206 a opening or the cut out on the side of the inverted symmetric unimodal n-shape bump. The front starting point of each of the sections of the inverted symmetric unimodal n-shape bump starts at the same level as the front surface or the hood of the transportation vehicle and gradually increases in slope or height towards the back where it ends or stops. The system, method or setup will use the same principles, properties, functions, methods, ways and workings as other openings or the cut out on the side of a n-shape bumps system, method or setups previously discussed. This is just a more efficient way to mount more vertical axis wind turbines operating on the vertical plane on a transportation vehicle using a n-shape bump method without the systems or the setups interfering with each other. The inverted symmetric unimodal n-shape bump is just wide enough to house four or more vertical axis wind turbines on a v-shape formation without the vertical axis wind turbines interfering with each other's performance. It uses the single blade out of the opening or the cut out system, method or setup. The horizontal curve lines shown above the inverted symmetric unimodal n-shape bump are not separations; they are there to show a realistic view of the inverted symmetric unimodal n-shape bump though they are also able to be separate pieces. Though the figure shows the system, method or setup on the front. A transportation vehicle is able to have it in many different places depending on the type. Although the figure shows the system, method or set up having a six (6) configuration setup, the system, method or setup is able to have more or less configurations.

Referring primarily in FIG. (103), a side and top view of another normal looking transportation vehicle having line 282 a inverted symmetric unimodal n-shape above or on the roof with line 206 a opening or the cut out on the side of the inverted symmetric unimodal n-shape bump. The system, method or set up will use the same principles, properties, functions, methods, ways and workings as FIG. 102 and other openings or the cut out on the side of a n-shape bumps system, method or set ups previously discussed. This is another example of the inverted symmetric unimodal n-shape on a different transportation vehicle to show that it is able and compatible with different types of transportation vehicles.

Referring primarily in FIG. (104), a side view of a normal looking transportation vehicle with line 284 a u-shape groove or channel on the front or the hood. The system features a vertical axis wind turbine operating on the vertical plane and the openable and closable line 206 opening or cut out on the side or surface of a n-shape bump wall. The u-shape groove or channel is able to be imagined as multiple n-shape bumps next to each other with little gap between the bumps now make or form grooves or channels on a transportation vehicle. A single blade is outside the groove or the channel walls via the opening or the cut out to spin the generator as the wind pushes the blades. Wherein each of the multiple n-shape bumps are flatten out or fused into the transportation vehicle surface at one end. Each u-shape groove or channel wall houses at least one vertical axis wind turbine or has at least one opening or cut out on it making it at least two vertical axis wind turbines in between each wall or within each groove or channel. The u-shape grooves or channel walls are high enough to house the blade section. The u-shape groove or channel width is wide enough to allow two single blades open facing the wind to spin within the groove or the channel without touching or interfering with each other. The u-shape groove or channel is able to work with a intentional or purposely lowered or depressed front or hood setup or a normal front or hood setup. The u-shape grooves or channels are able to have fixed or movable setup. If fixed the openable and closable opening or cut out is on a side or a surface of the n-shape bump to allow a single blade to be outside the opening or the cut out and to spin in and out of the opening or the cut out as the wind pushes against the blades to spin the vertical axis wind turbine. If movable the vertical axis wind turbine is able to couple to a fixed or movable base, a apparatus, device or a motor which is capable of moving, pushing or swing the vertical axis wind turbine to it sides so a single blade is outside the opening or the cut out for operation and move, pull it or swing it back in for housing. Once at the operating or the housing position the system is locked into place so it won't move while operating. The u-shape grooves or channels are able to be on the front, back, hood, side and above depending on transportation vehicle type. The u-shape groove or channel system, method or setup will use the same principles, properties, functions, methods, ways and workings as FIGS. 47-49, 80-85 and other openings or the cut out on the side of a n-shape bumps system, method or set ups previously discussed. This figure shows an intentional or purposely lowered or depressed front or hood u-shape groove or channel system, method or setup. When viewed from the side the –u-shape grooves or channels system appears to be the same as the n-shape bump. Both the u-shape grooves or channels and the n-shape bump are able to be made out of or built into the transportation vehicle body itself or be an addition to the transportation vehicle (note: the last sentence is able to be true for all the u-shape grooves or channels and the n-shape bump figures). Line 262 shows a small fairing behind the u-shape groove or channel to smooth the exit path of the wind exiting out of the channel. The u-shape grooves or channels are able to work with a double generator vertical axis wind turbine operating on the horizontal plane of FIG. 140. The u-shape grooves or channels are able to have multi levels or work with a extended or non extended multi level stairs front transportation vehicle's setup also. Wherein the multiple levels stairs front employs the u-shape grooves or channels with the opening or cutout on the side method on each level, with the n-shape bumps that made up the u-shape grooves or channels connecting the multiple levels. The u-shape groove or channel is able to work with an open symmetric unimodal shape with an opening for the air to enter in between the groove or the channel walls on bottom or the wide side, also an opening for the air to exit on the top or the narrow side. Wherein the vertical axis wind turbines are on the inner sides or sections of the open symmetric unimodal shape. The symmetric unimodal shape is able to have four (4) or more vertical axis wind turbines operating on the vertical plane on it.

Referring primarily in FIG. (105), a top, clear and more understanding view of FIG. 104. Line 206 shows the opening or cut out on the side or surface of a n-shape bump wall. Line 262 shows a small fairing behind the u-shape groove or channel to smooth the exit path of the wind exiting out of the channel. It shows that the u-shape grooves or channels are made up of multiple n-shape bumps, with the middle n-shape bump being able to house two vertical axis wind turbines operating on the vertical plane side by side. The u-shape groove or channel is able to have many different designs, forms or configurations. Line 284 shows a u-shape groove or channel on the front or the hood of a transportation vehicle. The system has the same principles, properties, functions, methods, ways and workings as FIG. 104.

Referring primarily in FIG. (106), a top, clear and more understanding view showing line 284 the u-shape grooves or channels on another transportation vehicle with a shorter length n-shape bumps. Line 206 shows the opening or cut out on the side or surface of an n-shape bump wall. This figure does not have the small fairing behind the grooves or the channels. This is to show another example, also to show that the u-shape grooves or channels are able to have many different designs, sizes, shapes, types, forms and configurations depending on the transportation vehicle type. The system also has the same principles, properties, functions, methods, ways and workings as FIG. 104.

Referring primarily in FIG. (107), a top, clear and more understanding view of line 284 the u-shape grooves or channels on another transportation vehicle with the u-shape grooves or channels being on both the front and the back of the transportation vehicle. Line 206 shows the opening or cut out on the side or surface of an n-shape bump wall. This is to show that a single transportation vehicle is able to have one or more systems, setups on it in one or more areas. It also has the same principles, properties, functions, methods, ways and workings as FIG. 104.

Referring primarily in FIG. (108), a top, clear and more understanding view of line 284 the u-shape grooves or channels on another type of transportation vehicle with the u-shape grooves or channels being on the roof or above. Line 206 shows the opening or cut out on the side or surface of an n-shape bump wall. This is another example to show that the inventor has contemplated many different designs, forms, setups and configurations of the system on many different types and areas of transportation vehicles. Although the figures don't show it, line 245 the outer n-shape bumps that forms the u-shape grooves or channel are able to push in from the outer edge of the transportation vehicle side so it could also house two vertical axis wind turbines in each n-shape bump side by side depending on the transportation vehicle type. The system also has the same principles, properties, functions, methods, ways and workings as FIG. 104.

Referring primarily in FIG. (109), a top, clear and more understanding view of a different line 284 u-shape groove or channel on another type of transportation vehicle with the u-shape groove or channels on the front or the hood. Here line 245 the n-shape bumps that made up the u-shape groove or channel is line 285 flatten out or fused into the transportation vehicle surface at all sides. Line 206 shows the opening or cut out on the side or surface of an n-shape bump wall. The n-shape bumps that form the u-shape grooves or channels are able to flatten at one or more sides as well as have many different designs. This is to show that the inventor has contemplated many different designs, shapes, styles, forms, setups and configurations etc., of the system on many different types of transportation vehicles. It also has the same principles, properties, functions, methods, ways and workings as FIG. 104.

Referring primarily in FIG. (110), a top, clear and more understanding view of a different line 284 u-shape grooves or channels on another type of transportation vehicle (airplane) with the u-shape groove or channels on the wing. Here line 245 the n-shape bump is line 285 flatten out or fused into the transportation vehicle surface at all sides. Line 206 shows the opening or cut out on the side or surface of an n-shape bump wall. Line 232 shows a rectangle as representation of a single vertical axis wind turbine blade inside the opening or the cut out. It also has more than one groove or channel on the single flatten out sides n-shape bump. This is to show that the single flatten out sides n-shape bump is able to have one or more grooves or channels. This is another example to show that the inventor has contemplated many different designs, shapes, styles, forms, setups and configurations etc., of the system on many different types of transportation vehicles. It also has the same principles, properties, functions, methods, ways and workings as FIG. 104.

Referring primarily in FIG. (111), a top, clear and more understanding view of a different line 284 u-shape groove or channel on another type of transportation vehicle (airplane) with the u-shape grooves or channels being able to be carve out of the transportation vehicle (airplane wing) body or structure itself. Here the u-shape bottom is not able to show because of the transparency of the figure, the line is instead pointing at the wall of the u-shape. Line 208 shows the blade section of the vertical axis wind turbine. Line 236 shows the bottom section where the generator section is housed, consisting of a rectangle within a rectangle and a vertical in the center of the rectangles. The line 264 the middle line represent the groove or the channel depth or wall height, it is the line drawn above the generator section to show that, the parts below the line are completely covered and those parts are completely connected or coupled to the rest of the wing so we don't weakening the structurally integrity of the airplane wing, though the figure shows otherwise. Line 206 shows the openable and closable opening or cut out. The opening or the cutout, the blade section, and the groove or the channel wall are all above the middle line. The middle line also represents the depth or height of the groove or the channel wall or the depth of the carve out. The vertical axis wind turbines are able to have different arrangements inside the n-shape bump. The n-shape bump that make up the u-shape grooves or channels are able to house the one or more vertical axis wind turbines in side to side (row) arrangement or behind each other (column) arrangement with slight horizontal misalignment (about a width of a single) on the column arrangement, for better efficiency and to save space. This is to show that this system, method, setup, design, style, form or configuration is also possible and that the inventor contemplated many different designs, shapes, styles, forms, setups and configurations etc., of the system on many different types of transportation vehicles. It also has the same principles, properties, functions, methods, ways and workings as FIG. 104. FIGS. 104-111 shared the same methods and functions.

Referring primarily in FIG. (112), a top view of a normal transportation vehicle with line 206 a rectangle opening or cut out on the front or the hood. The rectangle is a openable and closable opening or cut out on the surface of the front or the hood allowing the blade section of a double generator vertical axis wind turbine operating on the horizontal plane to spin in and out of the opening or the cut out as the wind pushes against the blades. The blade section has a larger diameter than the casings of the generator sections. A top blade is always outside, higher or above the opening or the cut out on the surface. While the rest of the double generator vertical axis wind turbine operating on the horizontal plane is inside or below the surface of the front or the hood. The system or the setup is able to be fixed or moveable. If fixed, the top blade is always outside, higher or above the opening or the cut out on the surface and is in the path of the wind and stays that way. If movable, the system or the setup is coupled to a movable base which is also coupled to a apparatus, device or a motor which is capable of moving or lifting the system to a operating position which is the fixed position described above, and move or lower the system to a housing position where the entire system is inside or below the surface. The system is also able to be directly coupled to the apparatus, device or a motor for movement in which case the movable base is not needed. A single transportation vehicle is able to have one or more of this opening or cutout on the surface system or method in or on it at different positions with different arrangements and setups. The method is able have triple double generator vertical axis wind turbine operating on the horizontal plane having a zigzag arrangement or setup of FIG. 118, wherein the inner generator section of the two outside double generator vertical axis wind turbines operating on the horizontal plane are aligned with the middle double generator vertical axis wind turbine generator section, wherein the generator sections are behind each to save space and maximize efficiency, except here the n-shape bumps are not needed because most of vertical axis wind turbine and its functions are inside or below the surface. The double generator vertical axis wind turbine operating on the horizontal plane with generator section on both sides of FIG. 140 is the vertical axis wind turbine that will be used in these figures and works with this system or setups.

Referring primarily in FIG. (113), a top view of a normal transportation vehicle with line 206 a rectangle opening or cut out on the front or the hood. Line 208 shows the blade section inside the rectangle opening or cut out. This is a much clearer view of the system or setup, and what is really visible to the viewer when the system or the setup is at an operating position. The rest of the system or the setup has the same principles, properties, functions, methods, ways and workings as FIG. 112.

Referring primarily in FIG. (114), a top view of a normal transportation vehicle with line 206 a rectangle opening or cut out on the front or the hood with line 208 the blade section shown inside the rectangle opening or cut out. It also shows a transparent view of line 236 the generator sections below the surface. This to give the viewer a better view and understanding of the system or the setup. The figure has the same principles, properties, functions, methods, ways and workings as FIG. 112.

Referring primarily in FIG. (115), a top transparent view of another normal transportation vehicle with line 206 a rectangle opening or cut out on the roof or above with line 208 the blade section shown inside the rectangle opening or cut out. It also shows a transparent view of line 236 the generator sections below the surface. This to give the viewer a better understanding of the system or the setup as well as to show that the system or the setup is able to work with many different designs and types of transportation vehicles and on different areas of a transportation vehicle. The figure has the same principles, properties, functions, methods, ways and workings as FIG. 112. FIGS. 112-115 shared the same methods and functions.

Referring primarily in FIG. (116), a transportation vehicle with a transparent view of a different version of the system or the setup on the roof or above. The figure has the same principles, properties, functions, methods, ways and workings as FIG. 112. Line 245 shows a set of n-shape bumps added to line 286 the surface of the roof or the above, with line 208 the blade section in the middle. A set of n-shape bumps house line 236 the generator section on both sides of the vertical axis wind turbine. The set of n-shape bumps inner walls will have line 287 a circular opening or cut out on the n-shape bumps walls, to allow the vertical axis wind turbine to spin or rotate through the opening or the cut out without touching it. Here the set of n-shape bumps are able to be high enough above the surface of the transportation vehicle to allow the vertical axis wind turbine to spin or rotate without the blades touching the surface below the blade section or in between the bumps walls. Or the sets of n-shape bumps are able to be just high enough to house the generator section while allowing the blade section to spin or rotate through another line 206 opening or cut out on the surface of below the blade section or in between the bumps walls, that is three separate openings or cut outs. The sets of n-shape bumps are also able to be lowered enough to the point that the three separate openings or cutouts are able to be single continuous opening or cut out. In which case line 288 the n-shape bumps in front of the blade section may or may not be needed. The vertical axis wind turbine, the sets of n-shape bumps or the entire system, or the setup is able to be fully or partially be fixed or moveable. If fixed the system or the setup will be as it appears in the figure. If movable some parts or the entire system or setup is able to be lowered inside, below the surface or at the same level as the surface of the transportation vehicle to save energy. If only the vertical axis wind turbine is movable, the sets of n-shape bump stays as it is in the figure while the vertical axis wind turbine is lowered inside or below the surface when not operating, also known as the housing opposition to save energy depending on whether it is a single continuous opening or cut out which allows it, while the three separate openings or cut outs which don't allow it. Line 288 shows a small n-shape bump in front of the blade section just high enough in height to shield the blade section except the blade above opening facing the wind to spin the vertical axis wind turbine as the wind pushes against the blades. The small n-shape bump in front of the blade section can also be seen as a half shield making an acute angle with the surface or as a fairing. This is to show that the system or the setup is able and capable to work with many different designs, types of transportation vehicles, on many different areas or surfaces of a transportation vehicle with or without little adjustments, slight modifications, some reorientation etc. Also to show that the Inventor has contemplated a multitude of systems or setups as well. Though the figure or the figures shows only one side of the sets of n-shape bumps flatten or smoothing out into the surface of the transportation vehicle, the sets of n-shape bumps are able to flatten or smooth out into the surface on one or more sides.

Referring primarily in FIG. (117), a close or zoom in transparent view of the vertical axis wind turbine and the sets of n-shape bump system or setup of FIG. 116. Line 208 shows the blade section in the middle. Line 236 shows the generator section on both sides of the vertical axis wind turbine. Line 245 shows n-shape bumps. Line 287 shows a circular opening or cut out on n-shape bump walls. Line 288 shows the small n-shape bump in front of the blade section. This is to give the viewer a better view and understanding of the system or the setup. The figure has the same principles, properties, functions, methods, ways and workings as FIG. 116.

Referring primarily in FIG. (118), a close or zoom-in transparent view of line 289 a triple double generator vertical axis wind turbine operating on the horizontal plane zigzag arrangement or setup of the system. Wherein one side of line 236 the generator section of the two outside double generator vertical axis wind turbines operating on the horizontal plane are line 290 aligned with the middle double generator vertical axis wind turbine generator section, wherein the generator sections are behind each to save space, energy and maximize efficiency. The figure has the same principles, properties, functions, methods, ways and workings as FIG. 116. The only difference is that the method, system or the setup has three sets with a zigzag arranged. The front or the starting point of the back sets of n-shape bumps are able to be equal or lot less pointy or curve at the front where it flatten or smoothing out into the surface than the front or the middle n-shape bump in front of the middle double generator vertical axis wind turbines operating on the horizontal plane blade section in the triple double generator vertical axis wind turbine operating on the horizontal plane zigzag arrangement or setup depending on how large it is spaced apart. The back n-shape bumps sets are able to have many different starting points. Although I call it a triple double generator vertical axis wind turbine operating on the horizontal plane having a zigzag arrangement method or setup, the method is able to have more sets of n-shape bumps.

Referring primarily in FIG. (119), a detailed skeleton view of a moving mechanism for FIG. 118, where line 211 a motor is connected to line 312 a sliding rod with teeth, which is perpendicularly connected line 331 a long connecting bar which also perpendicularly connected to line 336 a different sliding rod with no teeths, which also connects to line 325 a lift box, which slide under line 274 a base of a double generator vertical axis wind turbine operating on the horizontal plane and lift the vertical axis wind turbine to an operating position where a top blade of line 208 the blades section is outside and above the surface level of a fairing when the motor receives an input from the operator or driver. Line 327 a connecting bar with a ring to move around a pivoting point. The connecting bar has a ring at pivoting end to adjust for the slight change in length as the system moves to and from operating position to the housing position. The ring has a small gap between the ring and the fixed pivot point. Another moving set is attached to the first moving set so they can slide together. The second moving set can be attached to any part of the lift box and the sliding rod with no teeths. Line 337 is the back set of vertical axis wind turbines operating on the horizontal plane for the zig zag arrangement.

Referring primarily in FIG. (120), a top normal zoom out view of line 289 a triple double generator vertical axis wind turbine operating on the horizontal plane having a zigzag arrangement method or setup of the system on the roof or above a transportation vehicle. This to show how the system or the setup looks at its normal operating position or condition, wherein line 208 the blades or the blade section is visible to the viewer. While the rest of the vertical axis wind turbine and its functions are inside line 245 the n-shape bumps. The figure has the same principles, properties, functions, methods, ways and workings as FIGS. 116 and 118.

Referring primarily in FIG. (121), a top close or zoom in normal view of line 289 a triple double generator vertical axis wind turbine operating on the horizontal plane having a zigzag arrangement, method or setup of the system. This to show how the system or the setup looks at its normal operating position or condition, wherein line 208 the blades or the blade section is visible to the viewer. While the rest of the vertical axis wind turbine and its functions are inside line 245 the sets of n-shape bumps. It gives the viewer a clear view and understanding of the method or system. The figure has the same principles, properties, functions, methods, ways and workings as FIGS. 116 and 118.

Referring primarily in FIG. (122), line 291 shows an empty cell or plain top view of the triple double generator vertical axis wind turbine operating on the horizontal plane having a zigzag arrangement, method or setup of the system. Line 287 shows a circular opening or cut out on the set of the n-shape bumps walls. This further gives the viewer a plain clear view and understanding of the system or the setup.

Referring primarily in FIG. (123), line 291 shows an empty cell or plain top view of the triple double generator vertical axis wind turbine operating on the horizontal plane zigzag arrangement, setup or system on a normal looking transportation vehicle. This is to show that the method, system or the setup is able and capable to work with many different designs, types of transportation vehicles, on many different areas or surfaces of a transportation vehicle with or without little adjustments, slight modifications, some reorientation etc. Also to show that the Inventor has contemplated a multitude of this method, system arrangement or setups as well. The figure has the same principles, properties, functions, methods, ways and workings as FIGS. 116 and 118. FIGS. 116-123 shared the same methods and functions, while FIGS. 121-132 shared similar methods and functions.

Referring primarily in FIG. (124), a normal looking transportation vehicle having a mixture of systems, methods and setups. It has line 280 the tray push or slide out front systems, methods or setups. Line 272 shows a normal even side line 230 half shield vertical axis wind turbine operating on the vertical plane with line 208 the blade section and line 236 the generator section showing mounting systems, methods or setups on the side. Line 294 shows a transparent view of the behind the cabin or between the cabin and the trailer systems, methods or setups. This system, method or setup, I haven't discussed before. This system, methods or setups, is able to have a stand alone vertical axis wind turbine operating on the vertical plane or for the vertical axis wind turbine to be housed inside a openable and closeable line 295 tube, cylinder or other shapes to protect it from the elements. The housing shape is then line 296 detachable coupled to the outside of the transportation vehicle (behind the cabin), in a way that only line 208 the blade section is above the roof if fixed and line 230 a shield having more or the same height as the blade section is also detachable coupled to the roof in a way that it shield the blade section front from the wind except a single blade is left not shield if fixed as it appears in the figure. If movable setup, the shield is able to move below the surface line of the roof when not operating or being used, using the systems, methods and workings previously discussed. The vertical axis wind turbine is also able to use the push up, flip, roll, piston or hydraulic methods discussed before, to keep it below the roof line. This is another mounting method.

Referring primarily in FIG. (125), Line 292 shows a transportation vehicle having a mix of different systems, methods, and setups on it. To show that a single transportation vehicle is able to have a mix of multiple different systems, methods and setups all which cannot be shown. To show that the Inventor have contemplate multitude of systems, methods and setups as well as mix of different systems, methods and setups for different types of transportation vehicles on different areas, position, designs etc., of a transportation vehicle, with or without little adjustments, slight modifications, some reorientation etc., to make the systems, methods or setups works with different transportation vehicles all of which cannot be shown in the figures. Line 206 shows a opening or cut out method on a normal side of a transportation vehicle which is usually line 272 and even side. The figure also shows an extended front method on a transportation vehicle to house a vertical axis wind turbine operating on the vertical plane between Line 283 the front end and the front tire on the sides or the back sides vice versa.

Referring primarily in FIG. (126), a transportation vehicle with non extended multi level front having a mix of different systems, methods, and setup. To show that a single transportation vehicle is able to have a mix of multiple different systems, methods or setups on it. Line 201 shows the barrel roll system, method and setup on line 278 the top level. Line 280 shows the tray push or slide out front on line 277 the middle level. To show that the Inventor have contemplate multitude of systems, methods and setups as well as mix of different systems, methods and setups for different types of transportation vehicles on different areas, position, designs etc., of a transportation vehicle, with or without little adjustments, slight modifications, some reorientation etc., to make the systems, methods or setups works with different transportation vehicles all of which cannot be shown in the figures. This transportation vehicle is able to have even more systems, methods and setups like behind the door side mount, the fairing, the side opening or the roof mount etc.

Referring primarily in FIG. (127), a transportation vehicle with extended front for having a mixture of systems, methods and setups. It shows the extension between line 283 the front end and the front tire on the sides opening method. Line 206 shows the opening or cut out method on a normal side of a transportation vehicle which is usually line 272 even side on the front, above the tire and on the rear. This is another example to show how a single transportation vehicle is able to have a mixture of the systems, methods or setups. This figure has the same properties, functions, methods, ways and workings as that of the other figure described throughout this specification.

Referring primarily in FIG. (128), Line 258 shows a transportation vehicle with extended front having a mixture of systems, methods and setups. The transportation vehicle has a vertical axis wind turbine operating on the vertical plane line 208 blade section with line 207 a shield in front of the blade section above the extension. Line 293 shows the entire vertical axis wind turbine operating on the vertical plane with the shield above the roof in front of line 269 the large hump on the roof for its compressed natural gas (CNG) fuel tanks. This is another example of a mixture of systems, methods and setups on a single transportation vehicle. The front extension is also able to have the entire vertical axis wind turbine operating on the vertical plane with the shield above it too. This figure shares the same principles, properties, functions, methods, ways and workings as other previous figures with the same methods, setups etc.

Referring primarily in FIG. (129), a transportation vehicle line 258 with extended front having a mixture of systems, methods and setups. The transportation vehicle has line 268 a vertical axis wind turbine operating on the horizontal plane with line 271 a small fairing in front and above the extension using the opening or cutout on the surface method. Line 293 shows a transportation vehicle having a vertical axis wind turbine operating on the vertical plane with a shield in front of it, above the roof in front of line 269 the large hump on the roof for its compressed natural gas (CNG) fuel tanks. This is another example of a mixture of systems, methods and setups on a single transportation vehicle.

Referring primarily in FIG. (130), a transportation vehicle of FIG. 124 having line 280 tray push or slide out front. The transportation vehicle has line 262 a roof fairing with line 268 a vertical axis wind turbine operating on the horizontal plane. It shows, using the opening or the cut out on the surface system, method or setup, where a single blade of line 208 the blade section is outside and above the fairing. It is also capable of having the groove or the channel system, method or setup wherein the opening or the cut out will be on the floor of the grooves or the channels. That way we don't increase the transportation vehicle surface area above the fairing. This is another example.

Referring primarily in FIG. (131), a normal transportation vehicle (ship) having line 206 the opening or the cut out method on a side transportation vehicle. The transportation vehicle also has line 284 the u-shape groove or channel system, method or setup made out of line 245 the n-shape bumps with one or more line 285 flatten out sides. The figure or the design feature the vertical axis wind turbine operating on the vertical plane at an horizontal orientation. The figure or the design is also able to feature the vertical axis wind turbine operating on the horizontal plane at a vertical orientation. This is to show that, thought I have being using land transportation vehicles mostly in the drawings or the figures, all the system, method or setup are able functions, work with most, if not all types of transportation vehicles (Ships, planes, trucks, cars, buses, etc.,) with or without little adjustments, slight modifications, some reorientation etc. The generator section remains inside or under the sides or below the surface of a transportation vehicle at all times, this statement is true for most of the previous designs or figures, throughout this specification, though I did not mention it earlier.

Referring primarily in FIG. (132), line 213 shows a vertical center pole or tube with one or more bearings coupled to it, a flat rods, rivets, fasteners or a u-shaped connector brackets are also able to coupled to the bearings extending outwards and flatten out. The flat rods, rivets, fasteners or the u-shaped connector brackets are able to have many different designs, shapes and configurations. A tube or a hollow cylinder which generator or rotor magnets and the blades are coupled to is able to slide over the multiple extended flatrods, rivets, fastener or the u-shaped connector brackets to be coupled to them. The vertical center pole or tube doesn't rotate. Line 214 shows a multiple bearing couple to the center pole, line 215 shows some form of a flat rods, rivet, fastener or a u-shaped connector brackets couple or welded to the bearing, extending outward and flatten out at the outer part to make up for a diameter gap difference between the bearing and the tube or the hollow cylinder which the generator or rotor magnets and the blades are attached or coupled to. Although the figure shows only two separate sets of extended flatrods, rivet, fastener or u-shaped connector brackets coupled or welded to the bearing on the opposite sides of each other, the system is able to have one or more them coupled or welded to the bearing equally spaced apart. Preferably each vertical axis wind turbine should at least have four (4) extended flatrods, rivet, fastener or u-shaped connector brackets coupled or welded to each bearing. The vertical axis wind turbine is also able to use different extended flatrods, rivet, fastener or u-shaped connector brackets coupled or welded to the bearing setups like the one used in the vertical axis wind turbine operating on the horizontal plane in FIG. 140 and many more setups all of which cannot be shown. The vertical center pole or tube is able to be coupled to a fixed or a movable supporting base or structure at one or both ends.

Referring primarily in FIG. (133), line 216 shows the tube or a hollow cylinder which generator or rotor magnets and the blades are coupled to, is able to slide over the multiple extended flatrods, rivets, fastener or u-shaped connector brackets to coupled to the multiple extended flatrods, rivets, fasteners or a u-shaped connector brackets in one or more ways, line 213 shows the vertical center pole or tube in the center as two vertical lines extending out on the top and the bottom end of the tube or the hollow cylinder. The whole vertical axis wind turbine is coupled to this vertical center pole or tube and rotates or spins around it, line 208 shows a detailed view of the blades section on the top part as multiple L-shaped folded blades equal spaced apart, line 218 shows the rotor of the generator section with permanent magnets coupled to it as a rectangle shapes at the bottom section, both the blades section and the rotor section are coupled to the same single continuous tube or hollow cylinder of the same diameter to keep the vertical axis wind turbine simple and compressed as the height. The permanent magnets are able to have different designs, shapes and arrangements. The bearings, the flatrods, the rivet, fastener or the u-shaped connector brackets and the tube or the hollow cylinder which the generator or rotor magnets and the blades are coupled to, all rotates or spins together simultaneously as the wind pushes against the blades. Line 219 shows two L-shape disks detachable coupled, welded or fastened to the vertical center pole with slight down slope extending outwards from the vertical center pole on the opposite sides. This L-shape disk is able to be made up with one or more pieces to cover and prevent rain and other elements from entering into the tube or the hollow cylinder on the top part. When the vertical axis wind turbine is mounted to a transportation vehicle, the vehicle itself is able to cover the tube or the hollow cylinder from the element depending which one of the many methods is used in which case the L-shape disk is not needed. Line 220 shows two pins on the top part where the L-shape disk met with the vertical center pole as a fastener, bolt, etc., to show that the L-shape disk and the vertical center pole are directly coupled and do not rotate or spin all together.

Referring primarily in FIG. (134), line 216 shows a tube or a hollow cylinder which rotor magnets of the generator section and the blades are coupled to, is able to slide over the multiple extended flatrods, rivets, fastener or u-shaped connector brackets to coupled to the multiple extended flatrods, rivets, fasteners or the u-shaped connector brackets in one or more ways, line 213 shows the vertical center pole or tube in the center as two vertical lines extending out on the top and the bottom end of the tube or the hollow cylinder. The whole system is coupled to this vertical center pole or tube and rotates or spins around it, line 208 shows a detailed view of the blades section on the top part as multiple L-shaped folded blades equal spaced apart, line 218 shows the generator or rotor section with permanent magnets as a rectangle shapes at the bottom section, both the blades section and the rotor magnets of the generator section are coupled the same single continuous tube or hollow cylinder of the same diameter to keep the vertical axis wind turbine simple and compressed as the height. The bearings, the flatrods, the rivet, fastener or the u-shaped connector brackets and the tube which the generator or rotor magnets and the blades are coupled to, all rotates or spins together simultaneously as the wind pushes against the blades, line 221 shows the stator or casing as a covering over the generator or the rotor section with two pins or other shapes extending inwards to towards the permanent magnets and line 222 shows a squiggly lines as a coil winding. Line 223 shows two pins coupled or welded to the tube or the hollow cylinder with slight down slope extending outwards from the tube or the hollow cylinder on the opposite sides of each other, the pins are a representation of a disk of some form to prevent water and other elements from entering or falling into the generator section. Line 224 shows two pins on the bottom where the stator or the casing met with the vertical center pole as a fastener, bolt, etc., to show that the stator or the casing and the vertical center pole are directly coupled and do not rotate or spin all together.

Referring primarily in FIG. (135), line 225 shows the vertical axis wind turbine of FIG. 135, line 226 shows the addition of a shield in front of the blade section of the vertical axis wind turbine to shield the blade section from the wind except the blade opening facing the wind. The shield used in the figure is able to be from my previous patent number U.S. Pat. No. 12,297,802 B2. A shield which is horizontal spaced from turbine center is approximately symmetric shield the vertical axis wind turbine front from the wind except the blade open facing the wind, wherein the shield height is equal to or more than the blades height, to show the shield is also compatible with this vertical axis wind turbine. The center of the shield is also able to be misaligned with the center of the vertical axis wind turbine horizontal, the shield shields the blade section of the wind turbine from the vertical axis wind except the blade opening facing the wind. The shield is able to be fixed or rotatable, in this instance the shield is fixed, and does not rotate since it is intended for transportation vehicles we already know the direction of the wind.

Referring primarily in FIG. (136), line 225 shows the vertical axis wind turbine of FIG. 134, line 226 shows the addition of a shield in front to the blade section of the vertical axis wind turbine to shield the blade section from the wind except the blade opening facing the wind. The shield used in the figure is able to be from my previous patent number U.S. Pat. No. 12,297,802 B2. The rest of the figure has the same principles, properties, functions, methods, ways and workings as FIG. 135.

Referring primarily in FIG. (137), Line 213 shows a center pole or tube running the entire height of the vertical axis wind turbine, which all components are coupled to, having line 208 a blade section on a top part with line 249 multiple L-shapes folded blades which are equally spaced apart, line 250 a bearing on both the top and the bottom part connecting the blades, line 251 a close hollow cylinder that does not rotate is couple to the center pole or tube in between the blades. The blade section is able to couple to line 252 the rotor section directly or indirectly on a single tube or hollow cylinder or on multiple tubes or hollow cylinders having varying sizes as shown in the figure. The bottom bearing is where the blade section is coupled to the rotor section. The vertical axis wind turbine is also able to use the coupling method used in the simple compressed vertical axis wind turbine shown in FIG. 133. The blade section is coupled to the double stack permanent magnet on a single rotor to make a double generator. The blade section or design shown in this figure is from my previous patent number U.S. Pat. No. 11,614,073. The center pole or tube doesn't rotate. Line 253 shows a generator section below. A generator section having line 254 a double stack permanent magnets single rotor coupled to the blade section via bearing and tube or hollow cylinder. The tube which the permanent magnets are coupled to is able to be larger in diameter than the tube which connects it to bottom blade section bearing. The center pole is able to have another bearing couple to it at where the rotor magnets section is, connecting the center pole to the tube which the permanent magnets are coupled to with or without a u-shaped connector brackets for more stability. Line 255 shows a housing case housing line 256 double coil winding on a single or double stator acting as a casing is placed or slid on over the double stack permanent magnets on a single rotor section. Line 257 the housing casing is detachable coupled to the center pole or tube on the bottom part, in a way that the housing case doesn't rotate, while allowing double stack permanent magnets on a single rotor to rotate inside the coil windings. Though the figure did not show it, the housing casing is able to be covered on both the top end and the bottom end. The cover is able to be made up of one or more pieces and is able to be detachable. The cover is also able to be permanently coupled to the casing acting as the stator in some instances specially on the bottom part. The center pole or tube is able to be coupled to a fixed or movable supporting structure at one or both ends. The rotor section is able to couple to blade sections of varying shapes, sizes, designs or configuration.

Referring primarily in FIG. (138), line 213 shows a horizontal center pole or tube with one or more bearings coupled to it, and the bearings have extended flatrods, rivets, fasteners or a u-shaped connector brackets extending outwards couple or attach to the bearings. The extended flatrods, rivets, fasteners or u-shaped connector brackets are also able to be interconnected or connected by flat straight brace at the extended or the outer ends. The tube or a hollow cylinder which generator or rotor magnets and the blades are coupled to is able to slide over and coupled the multiple extended flatrods, rivets, fastener or the u-shaped connector brackets. The horizontal center pole or tube doesn't rotate. Line 214 shows a multiple bearing couple to the horizontal center pole, line 273 shows the flatrods, rivet, fastener or the u-shaped connector brackets couple or welded to the bearing and extends outward to make up for diameter gap difference between the bearing and the tube or the hollow cylinder which the generator or rotor magnets and the blades are attached or coupled to. Here except the flatrods, rivet, fastener or the u-shaped connector brackets are interconnected. Although the figure shows only two sets of flatrods, rivet, fastener or u-shaped connector brackets couple or welded to the bearing on the opposite sides, a vertical axis wind turbine is able to have one or more flat rods, rivet, fastener or a u-shaped connector brackets couple or welded to the bearing equally spaced apart. Preferably each bearing should at least have four (4) flat rods, rivet, fastener or a u-shaped connector brackets couple or welded to the bearing equally spaced apart. The vertical axis wind turbine is also able to use different extended flatrods, rivet, fastener or u-shaped connector brackets coupled or welded to the bearing design or setups like the one used in the compressed vertical axis wind turbine in FIG. 132 and many more ways all of which cannot be shown. The horizontal center pole or tube is able to be coupled to a fixed or movable supporting structure at one or both ends.

Referring primarily in FIG. (139), line 216 shows the tube or a hollow cylinder which generator or rotor magnets and the blades are coupled to, is able to slide over and coupled to the multiple extended flatrods, rivets, fastener or u-shaped connector brackets in one or more ways. Line 213 shows the horizontal center pole or tube in the center as horizontal rectangles starting from the center of the tube or the hollow cylinder extending outwards on both ends. The whole vertical axis wind turbine system is coupled to the horizontal center pole or tube and rotates or spins around it. Line 208 shows the blade section in the middle having multiple L-shaped folded blades equal spaced apart, line 218 shows the generator or rotor section with permanent magnets as a rectangle or other shapes at the both ends of the tube or the hollow cylinder. The blades section and the generator or rotor section are coupled to the same single continuous tube or hollow cylinder of the same diameter to keep the vertical axis wind turbine simple, stable, compact and compressed while increasing its energy generating capacity. The bearings, the flatrods, the rivet, the fastener or the u-shaped connector brackets and the tube or the hollow cylinder which the generator or rotor magnets and the blades are coupled to, all rotates or spins together simultaneously around the center pole or tube as the wind pushes against the blades. This system, method or setup is able to have an L-shape disk covering, coupled to the tube or the hollow cylinder between the blade section and the stator which is made up with one or more pieces similar to the method shown in the compressed vertical axis wind turbine FIG. 134.

Referring primarily in FIG. (140), line 216 shows the tube or a hollow cylinder which generator or rotor magnets and the blades are coupled to, is able to slide over and coupled the multiple extended flatrods, rivets, fastener or u-shaped connector brackets in one or more ways, line 213 shows the horizontal center pole or tube in the center as horizontal rectangles starting from the center of the tube or the hollow cylinder extending outwards on both ends, the whole system is coupled to this horizontal center pole or tube and rotates or spins around it, line 208 shows the blade section in the middle have multiple L-shaped folded blades equal spaced apart, line 218 shows the generator or rotor section with permanent magnets as a rectangle shapes at the both ends of the tube or the hollow cylinder. The permanent magnets are able to have different designs, shapes and arrangements. The blades section and the generator or rotor section are coupled to the same single continuous tube or hollow cylinder of the same diameter to keep the vertical axis wind turbine simple, stable, compact and compressed while increasing its energy generating capacity. The entire system rotates or spins together simultaneously around the center pole or tube as the wind pushes against the blades except the stator. Line 221 shows the stator or casing as a covering over line 236 the generator section with two pins or other shapes extending inwards towards the permanent magnets and line 222 a squiggly line as the coil winding. The coil is winding around the two pins or shapes. The stator or the casing housing the coil winding is placed or slid on over the permanent magnets section of the rotor. The stator or housing casing is detachable coupled to the horizontal center pole or tube on both ends (although only one is shown in the figure), in a way that the stator or the casing don't rotate, while allowing the rotor to rotate or spin inside the coil winding. Line 224 shows two pins on the side where the stator or the casing met or coupled with the horizontal center pole as a fastener, bolt, etc., to show that the stator or the casing and the horizontal center pole are directly coupled and don't rotate or spin all together. Line 274 shows one of the many possible ways the horizontal center pole is detachable coupled to a fixed or movable base. The horizontal center pole is first detachable coupled to a u-shape bracket with bolts, fastener etc., the bracket is also able to couple the fixed or the movable base or supporting structure. This is so all the individual components are able to easily slide over and be fixed or coupled into place for assembly and use and be removed, replaced for repair, maintenance or recycling. The double generator vertical axis wind turbine is able to be reoriented, so it could operate in different planes.

What is claimed is:

1. Methods of configuring a portion of a vehicle body or a fairing body to shield, house, carry and use at least one vertical axis wind turbine to generate electric energy from the vehicle's forward movement comprising;

the at least one vertical axis wind turbine including a shaft that extends in the vertical direction and a plurality of blades coupled to the shaft;

and wherein the vertical axis wind turbines have a blade section on top and a generator section on the bottom or a blade section in the middle and generator section on both sides or end;

and wherein a body surface in front of an opening or cutout on the vehicle body surfaces or on fairing body surfaces, the opening or cutout with a half shield, a shield, the vehicle body or the fairing body are forms of shield that are able to be positioned upstream or in front of the at least one vertical axis wind turbines, including a height greater than or equal to a height of the blade section;

and wherein, when the vertical axis wind turbines are deployed, the body surface in front of the opening or the cutout on the vehicle body surfaces or on the fairing body surfaces, the opening or cutout with the half shield, the shield, the vehicle body or the fairing body shields all of the vertical axis wind turbine from the wind except a single blade open facing the wind to be outside, on the side or above the vehicle or the fairing body surfaces and exposed to the wind to spin the vertical axis wind turbine to generate electric energy from the vehicle's forward movement, wherein the vertical axis wind turbines are mounted to the vehicles or fairings body on the horizontal or the vertical plane;

and wherein the vertical axis wind turbines are mounted, deployed and retracted to the vehicles or to the fairings body in the following ways consisting of:

(a) the vertical axis wind turbines are mounted, deployed and retracted with the opening or cutout method as further defined when on the vehicle or the fairing body, the configured body section and the opening or cutout allow a single blade of the vertical axis wind turbine blade section open facing the wind to be deployed outside and on the sides or above the surfaces of the vehicle or the fairing body through side surfaces, vertical surfaces running in the front to the back direction or horizontal surfaces opening or cutout on the vehicle or the fairing body for the blades to spin through or in and out of the opening or cutout as the wind pushes against the blades to spin the vertical axis wind turbine to generate energy, and the vehicle or the fairing body allow the whole vertical axis wind turbine system to be retracted inside the vehicle or the fairing body for housing, and wherein the shield is defined by the vehicle or the fairing body surfaces in front of the opening or the cutout; and, (b) the vertical axis wind turbines are mounted, deployed and retracted with the opening or cutout and a half shield method and the half shield method is further defined when the half shield is positioned in front of both the openings or the cutouts and a portion of the vertical axis wind turbines blade section, the configured body section with the opening or cutout and the half shield allow the half shield with the portion of the vertical axis wind turbine blade section to be deployed outside and on the side or above the surface of the vehicle body through the side, the vertical or the horizontal surface openings or cutouts on the vehicle body to spin through or in and out of the opening or cutout as the wind pushes against the blades to spin the vertical axis wind turbines to generate energy, wherein the half shield forms an acute angle with the vehicle body surfaces, shielding all of the exposed portion of the blade section from the wind except the single blade open facing the wind, and the vehicle body allow the whole vertical axis wind turbine system to be retracted inside the vehicle body, and allow the half shield to close to the vehicle body surface level for housing; and, (c) the vertical axis wind turbines are mounted, deployed and retracted with a shield method and the shield method is further defined in when the shield is positioned in front of the vertical orientated vertical axis wind turbine blade section, the configured body section allow the vertical axis wind turbines blade section with the shield to be deployed outside and above the surface of the vehicle body through the surface opening or cutout and the shield height equal to or greater than the blade section height, shielding all of the blade section from the wind except the single blade open facing the wind to be exposed to the wind to spin the vertical axis wind turbine to generate energy, and wherein the shield is approximately symmetric and the center of the shield is misaligned with the center of the vertical axis wind turbine horizontal by approximately one-fourth the diameter of the vertical axis wind turbine blade section, and wherein the vehicle body allow the whole vertical axis wind turbines and the shields to be retracted inside the vehicle body for housing, wherein the vertical axis wind turbine with the shield are able to be mounted to the vehicle body on the vertical or the horizontal plane; and, (d) the vertical axis wind turbines are mounted, deployed and retracted behind the vehicle body, behind the fairing body or behind a fairing with a u-shape grooves or channels method in which the behind method is further defined when on the vertical plane, the vehicle body, the fairing body or the fairing with the u-shape grooves or channels are configured to shield all of the vertical axis wind turbine from the wind except the single blade open facing the wind to be on the side of the vehicle body or vertical surfaces running in the front to the back direction, the fairing body or vertical surfaces running in the front to the back direction, or to be on the sides of the walls of the u-shape grooves or channels and aligned with the u-shape grooves or channels, and exposed to the wind passing on the sides or vertical surfaces running in the front to the back direction of the vehicle or the fairing body, or between the u-shape grooves or channels walls, to spin the vertical axis wind turbines behind the vehicle body, the fairing body or the fairing with the u-shape grooves or channels to generate energy, and wherein the shield is defined by the vehicle body sides or vertical surfaces running in the front to the back direction, the fairing body sides or vertical surfaces running in the front to the back direction, or the fairing with the u-shape grooves or channels walls surfaces, and wherein the vehicle body, the fairing body or fairing with the u-shape grooves or channels allows the whole vertical axis wind turbines to be retracted behind the vehicle body or vertical surfaces running in the side to the side direction, the fairing body or vertical surfaces running in the side to the side direction, or to be retracted behind and aligned with u-shape grooves or channels lands for housing; or mounted on the horizontal plane, wherein the vehicle body, the fairing body or the fairing with the u-shape grooves or channels shield all of the vertical axis wind turbine from the wind except the single blade open facing the wind to be deployed above the horizontal surfaces of the vehicle body, the fairing body or a base surfaces of the fairing with the u-shape grooves or channels, and exposed to the wind passing above the vehicle body, the fairing body or between the u-shape grooves or channels walls, to spin the vertical axis wind turbines behind the vehicle body, the fairing body or the fairing with the u-shape grooves or channels to generate energy, and wherein the shield is defined by the vehicle body horizontal surfaces, the fairing body horizontal surfaces or the fairing with the u-shape grooves or channels base surfaces, and wherein the vehicle body, the fairing body or fairing with the u-shape grooves or channels allows the whole vertical axis wind turbines to be retracted below the horizontal surface level of the vehicle body, the fairing body or below the base surfaces of the u-shape grooves or channels for housing;

and wherein the vertical axis wind turbines with the opening or cutout, with the opening or cutout and the half shield, with the shield or with the behind vehicle body are mounted to the vehicle or the fairing body, to be housed inside or behind the vehicle or the fairing body and to be deployed from the housing position to the deployed positions in front of, on the sides of or above the vehicle or the fairing body surfaces;

and wherein, when the vertical axis wind turbines with the opening or cutouts method are deployed from inside the vehicle body, the fairing body or the fairing with u-shape grooves or channels, to the deployed position above the vehicle body, the fairing body or the fairing with u-shape grooves or channels base surfaces through the horizontal surface openings or cutouts, the single blade open facing the wind blades are above the horizontal or the base surfaces and exposed to the wind and the vertical axis wind turbines are mounted to the vehicle body, the fairing body or fairing with u-shape grooves or channels on the horizontal plane and the shield is defined by the vehicle body, the fairing body or the fairing with grooves or channels horizontal or base surfaces in front of the openings or cutouts;

and wherein, when the vertical axis wind turbines with the opening or cutout method are deployed from inside the vehicle body, the fairing body or the fairing with u-shape grooves or channels to the deployed position on the sides and the vertical surfaces running in the front to the back direction of the vehicle or fairing's body or on the side walls of the u-shape grooves or channels through the side or the vertical surfaces opening or cutout on the vehicle or the fairing body sides or vertical surfaces, or the side walls of the u-shape grooves or channels, the single blade open facing the wind are outside and on the sides of the side surfaces or the vertical surfaces of the vehicle or the fairing body, or the side walls surfaces of the u-shape grooves or channels and exposed to the wind, wherein the vertical axis wind turbines are mounted on vertical plane and the shield is defined by the vehicle or the fairing body side surfaces or vertical surfaces running in the front to the back direction, a n-shape bump sides surfaces, an inverted symmetry unimodal n-shape bump side surfaces, a symmetric unimodal u-shape inner walls surfaces or a u-shape grooves or channels side walls surfaces in front of the openings or the cutouts;

and wherein, when the vertical axis wind turbines with the opening or cutout and the half shield method are deployed from inside the vehicle body, to the deployed position on the sides or the vertical surfaces running in the front to the back direction of the vehicle body through the side or the vertical surface opening or cutout on the vehicle body side or vertical surfaces, a portion of the blades section are outside and on the sides or the vertical surfaces of the vehicle body and exposed to the wind, wherein the vertical axis wind turbines are mounted on vertical plane and the shield is defined by the half shields making an acute angle with the vehicle body sides or vertical surfaces or with the n-shape bump side surfaces;

and wherein, when the vertical axis wind turbines and the shields method are used, from inside the vehicle body, to the deployed position above the vehicle body surfaces through the horizontal surface openings or cutouts, the blade section and the shields height greater than or equal to the height of the blade section are outside, above and exposed to the wind and the vertical axis wind turbines are mounted to the vehicle body on the vertical plane, and wherein the same setup is able to happen in the horizontal plane;

and wherein, when the wind turbines are deployed from inside the vehicle body to the deployed position in front of the vehicle body through a front opening or cutout on the vehicle body, the vertical axis wind turbines with the shields method or with the u-shape grooves or channels method in front are on a tray system and are all in front of the vehicle body and the vertical axis wind turbines are mounted on vertical plane;

and wherein when the vertical axis wind turbines are mounted to the vehicle body and functioning via the openings or cutouts method and the opening or cutout are on the vehicle or the fairing body vertical surfaces, the vertical axis wind turbines are mounted to the vehicle or the fairing body on the vertical plane, except when the shield is positioned in front of the vertical axis wind turbine, in that case the vertical axis wind turbines and the shield are mounted on the plane perpendicular to the surface opening or cutout plane;

and wherein when the vertical axis wind turbines are mounted to the vehicle body with the openings or cutouts method and the opening or cutout are on the vehicle or the fairing body horizontal surfaces, the vertical axis wind turbines are mounted to the vehicle or the fairing body on the horizontal plane, except when the shield is positioned in front of the vertical axis wind turbine, the vertical axis wind turbines and the shield are mounted on the plane perpendicular to the surface opening or cutout plane;

and wherein the openings or the cutouts are adaptable to be openable and closable openings or cutouts;

and wherein the openings or cutouts are large enough to allow the blades to spin through or spin in and out of the openings or the cutouts as the wind pushes against the single blade open facing the wind to spin the vertical axis wind turbines, when the vertical axis wind turbines are deployed;

and wherein the vertical axis wind turbines with the opening or cutout method, with the opening or cutout and the half shield method, with the shield method or with the behind vehicle are able nonretractable or deployable and retractable mounted to vehicle body or the fairing body;

and wherein when nonretractable, the vertical axis wind turbines while using the opening or cutouts method, with the opening or cutout and the half shield method, with the shield method or with the behind method stay fixed at the various deployed positions, whether the vertical axis wind turbines are generating energy or not;

and wherein when deployable and retractable the vertical axis wind turbines with the opening or cutout method, with the opening or cutout and the half shield method, with the shield method or with the behind method are deployed to the various deployed positions and retracted back to the housing positions by an operator or a driver pushing a button or flip a switch;

and wherein when deployable and retractable the vertical axis wind turbines are completely housed inside the vehicle body, the fairing body, the n-shape bump, the inverted symmetry unimodal n-shape bump, the symmetric unimodal u-shape inner walls or inside the u-shape grooves or channels land walls, or completely houses behind the vehicle or the fairing body, when retracted;

and wherein a portion of the vertical axis wind turbines with the opening or cutout method, with the opening or cutout and the half shield method, or with the shield method or with the behind method remains inside and below or behind the surface level of the vehicle or the fairing's body at all times, whether the vertical axis wind turbines are deployed;

and wherein the openable and closable openings or cutouts covers are open and closed by a motor;

and wherein the vertical axis wind turbine with the opening or cutout method, with the opening or cutout and the half shield method, with the shield method, with the behind method, with the shield method on a movable or rotatable portion or base, or with the shield method on a tray system are deployed to the various deployed positions and retracted back to the housing positions by a motor;

and wherein the operator or the driver pushes the button or flips the switch that sends a signal to a custom programmed computer control box that delays the deployment of the vertical axis wind turbines with the opening or cutout method, with the opening or cutout and the half shield method, with the shield method, with the behind method, with the shield method on the movable or rotatable portion or base, or with the shield method on a tray system motor, when the vertical axis wind turbines systems are being deployed to the deployed positions to generate energy, wherein the custom programmed computer control box delays the retraction or the close of the openable and closable openings or cutouts covers motor, when the vertical axis wind turbines systems are being retracted to the housing positions, or the operator or the driver pushes two separate buttons or flips two separate switches, one to open the openings or the cutouts covers and another button to deploy the vertical axis wind turbines systems to the deployed positions a first time, and a second time to retract the systems back to the close and the housing position;

and wherein when the operator or the driver push the button, the motor gear is connected to a pivot gear, a sliding rod with a tooth or a chain that are directly connected or indirectly connected to the vertical axis wind turbine systems through connecting rods or the motor gear is connected to a sliding rod with teeth that is connected to a lifting box that is next to the vertical axis wind turbine systems, the pivot gear, the sliding rod with a tooth, the chain or the lifting box move the vertical axis wind turbines with the opening or cutout method, with the opening or cutout and the half shield method, with the shield method, with the behind method, with the shield method on the movable or rotatable portion or base, or with the shield method on the tray system or with the u-shape grooves or channels method on the tray system individually or interconnectedly to the deploy positions and back to the housing positions;

and wherein the openable and closable openings or cutouts covers, and the vertical axis wind turbines with the opening or cutout method, with the opening or cutout and the half shield method, with the shield method, with the shield method, with the behind method, on a movable or rotatable portion or base or with the shield method on the tray system are locked at the housings positions or the deployed positions until the operator or the driver pushes the button, flip the switch again or until the operator or the driver next input received by the control box;

and wherein the vehicle body and the fairing body configuration types that have extra surfaces on the vehicle body and the fairing to shield, house, carry and use more vertical axis wind turbine systems with the various mounting, nonretractable or deployable and retraction methods are;

the movable or rotatable portion or base, a contour curve sides, the n-shape bump, an extended or elongated single or multiple level stairs front vehicle, the fairing's with opening or cutout or gap, the fairing with u-shape grooves and channels, an even side or vertical surface openings or cutouts, an even side or vertical surface openings or cutouts having a different areas and heights arrangement, an even side or vertical surface openings or cutouts with half shield, an even side or vertical surface openings or cutouts with half shield having a different areas and heights arrangement, a lowered or depressed areas, a normal, non extended or non elongated single or multiple level stairs front vehicle, the tray push out in front system, the inverted symmetry unimodal n-shape bump, the u-shape grooves or channels, a symmetric unimodal u-shape, the horizontal surface openings or cutouts, the horizontal surface openings or cutouts having a zig zag arrangement, the horizontal surface openings or cutouts with half shield, the horizontal surface openings or cutouts with half shield having a zig zag arrangement, a set of n-shape bumps, a set of n-shape bump having a zig zag arrangement, a behind the cabin system and a mixture of the methods and the configurations on a vehicle body vertical or horizontal surfaces are configured so that the vertical axis wind turbines don't interfere with each other's performance, and don't obstruct the operator or the driver view and keep the vehicle body aesthetically pleasing;

and wherein some of the vertical axis wind turbines that are used are a compressed vertically orientated vertical axis wind turbine system having a blade section on the top and a generator section on the bottom;

a double stack permanent magnet on a single rotor to make a double generator vertical orientated vertical axis wind turbine system;

a horizontal orientated or lying vertical axis wind turbine system with a blade section in the middle and a generator section on both sides or ends;

and wherein the electric energy generated by the vertical axis wind turbines from the vehicle forward movement is used to power the vehicle or its components, or the electric energy is stored for future use.

2. The methods of claim 1, further comprising a front, sides and back areas of a vehicle body configured or contoured to have contoured curve front, curve sides and curve back that form extra vertical walls and surfaces on the vehicle front, sides and back areas, to shield, house, carry and use more vertical axis wind turbines with the opening or cutout method or with the opening or cutout and the half shield method on the contoured curve areas surface;

and wherein the contour curves are a contour curve in or a contour curve out;

the contour curve in areas are a reduction in the vehicle body width on the horizontal plane of the vehicle front hood area, sides, back trunk area or others areas of the vehicle body that form an L-shape on the vehicle body on the contour areas when viewing the vehicle from the front or the back, forming the extra vertical walls or surfaces on the vehicle body to have the opening or cutout method on the contour curve in wall surfaces or to have the openings or cutouts with the half shield method on the contour curve in wall surfaces to generate energy on the contour curve in area of the vehicle body without increasing the vehicle body cross section, and wherein the contour curve out areas are an increase in the vehicle body width on the horizontal plane of the vehicle body that form a bump on the vehicle body to house the generator section of at least one vertical axis wind turbine with the opening or cutout method above the bump or with the opening or cutout and half shield method above the bump to generate energy on the contour curve out area of the vehicle body, wherein the vertical axis wind turbine generator section diameter is equal to or greater than the blade section diameter;

and wherein the contour curves are the curve in sides, curve down sides, curve in upper, multi levels curve, multi elevation contour curve, straight curve in, angular curve in, sallow curve in, front curve in, rear curve in and the curve out, wherein all of the above curve types are reduction in width on horizontal plane of the vehicle body, on the configured or contoured body section except the curve out which is an increase in width on horizontal plane of the vehicle body on the configured or contoured body section, wherein the difference between the contour curve in types are the curve in location on the vehicle body, curve in direction or the curve in angle;

and wherein the contour curve in or curve out areas width increase or decrease smoothly and fuse, fade or level out to the vehicle body surface level at where the contour curve areas end;

and wherein the contour curves have various sizes, designs and angles.

3. The methods of claim 1, further comprising a front and sides of a vehicle body both configured to have a single or a multiple level stairs front and side, that forms extra surfaces on the vehicle body to shield, house, carry and use more vertical axis wind turbine with the opening or cutout method on the surfaces, with the opening or cutout and the half shield method on the surfaces or with the shield method on the different horizontal surface levels of the single or the multiple level stairs front vehicles;

wherein the front length of both the single or the multiple level stairs front vehicle body is extended or elongated to have the single or multiple level stairs front and sides, wherein a top levels are less in length than the level immediately below the top level; wherein each level of the single or the multiple level stairs front vehicle are adaptable to have different width than level immediately above or below it, with the lower level being wider than the level immediately above the lower level, and wherein the single or the multiple level stairs front vehicle is able to have contoured curve in sides with the stairs front, to have the vertical axis wind turbines with the opening or cutout method on the side surfaces or with the opening or cutout on and the half shield method on the side surfaces of the contour curve in sides instead of the stair sides;

and wherein the extended or elongated single or multiple level stairs front vehicle have space between front tires and the front end of the vehicle, the back tires and the back end of the vehicle, to have the vertical axis wind turbines with the opening or cutout method on the side surfaces between the tires and the front or the back end of the vehicle;

and wherein the single or the multiple levels stairs front vehicle extensions or elongations types are extended front, a push back cabin front or a lower elongated front vehicle;

and wherein, the lower levels height increases to the height of the level immediately above the lower levels at varying angles or curve angles;

and wherein the single or the multiple levels stairs front vehicle has various sizes, designs and angles.

* * * * *